(12) United States Patent
Farb

(10) Patent No.: US 8,188,611 B2
(45) Date of Patent: May 29, 2012

(54) FLOW DEFLECTION DEVICES AND METHOD FOR ENERGY CAPTURE MACHINES

(76) Inventor: Daniel Farb, Beit Shemesh (IL)

(*) Notice: Subject to any disclaimer, the term of this patent is extended or adjusted under 35 U.S.C. 154(b) by 606 days.

(21) Appl. No.: 12/307,748

(22) PCT Filed: Mar. 18, 2007

(86) PCT No.: PCT/IL2007/000348
§ 371 (c)(1),
(2), (4) Date: Jan. 7, 2009

(87) PCT Pub. No.: WO2008/010200
PCT Pub. Date: Jan. 24, 2008

(65) Prior Publication Data
US 2009/0290972 A1 Nov. 26, 2009

Related U.S. Application Data

(60) Provisional application No. 60/807,828, filed on Jul. 20, 2006, provisional application No. 60/826,927, filed on Sep. 26, 2006, provisional application No. 60/864,792, filed on Nov. 8, 2006.

(51) Int. Cl.
*F03D 17/06* (2006.01)
(52) U.S. Cl. ............. 290/44; 290/55; 415/208.1; 415/1; 60/398

(58) Field of Classification Search ........... 415/1, 208.1, 415/3, 164; 290/44, 55; 60/398
See application file for complete search history.

(56) References Cited

U.S. PATENT DOCUMENTS

| 4,047,832 | A | * | 9/1977 | Sforza | 415/1 |
| 4,111,594 | A | * | 9/1978 | Sforza | 415/1 |
| 4,289,444 | A | * | 9/1981 | Monk et al. | 415/4.2 |
| 4,609,328 | A | * | 9/1986 | Cirrito | 417/55 |
| 2010/0034649 | A1 | * | 2/2010 | Taylor | 415/208.1 |
| 2010/0129193 | A1 | * | 5/2010 | Sherrer | 415/1 |
| 2011/0110797 | A1 | * | 5/2011 | Cho et al. | 417/65 |

OTHER PUBLICATIONS

H. Grassman et al., "A Partially Static Turbine—First Experimental Results", Renewable Energy 28, pp. 1779-1785, 2003.

* cited by examiner

*Primary Examiner* — Gary F. Paumen
(74) *Attorney, Agent, or Firm* — Mark M. Friedman

(57) ABSTRACT

The flow of fluid into energy capture machines is crucial for determining the amount of energy extracted, particularly in the field of renewable energy resources. The current invention describes devices and methods for applying the physics of flow to energy capture machines, most commonly wind and water turbines, by enhancing the flow into the energy capture component by the appropriate placement of various objects called flow deflection devices (FDD). FDDs can make a highly significant improvement in power output.

33 Claims, 77 Drawing Sheets

Cross section of outer FDD

Figure 7 Configurations A, B1, B2

Figure 8 Computer Modeling Input

Figure 10 Discretization

A sample mesh of the symmetry plane (green), the ground (red) and the WDD (blue)

Figure 13 Areas of acceleration

Figure 15 Effect of inner diameter cont.

Figure 16 Effect of WDD shape

Figure 17 Size Effect

Figure 18 Effect of inclination angle

Figure 19 Frame and Tarpaulin

The WDD with a NACA 4424 airfoil cross-section

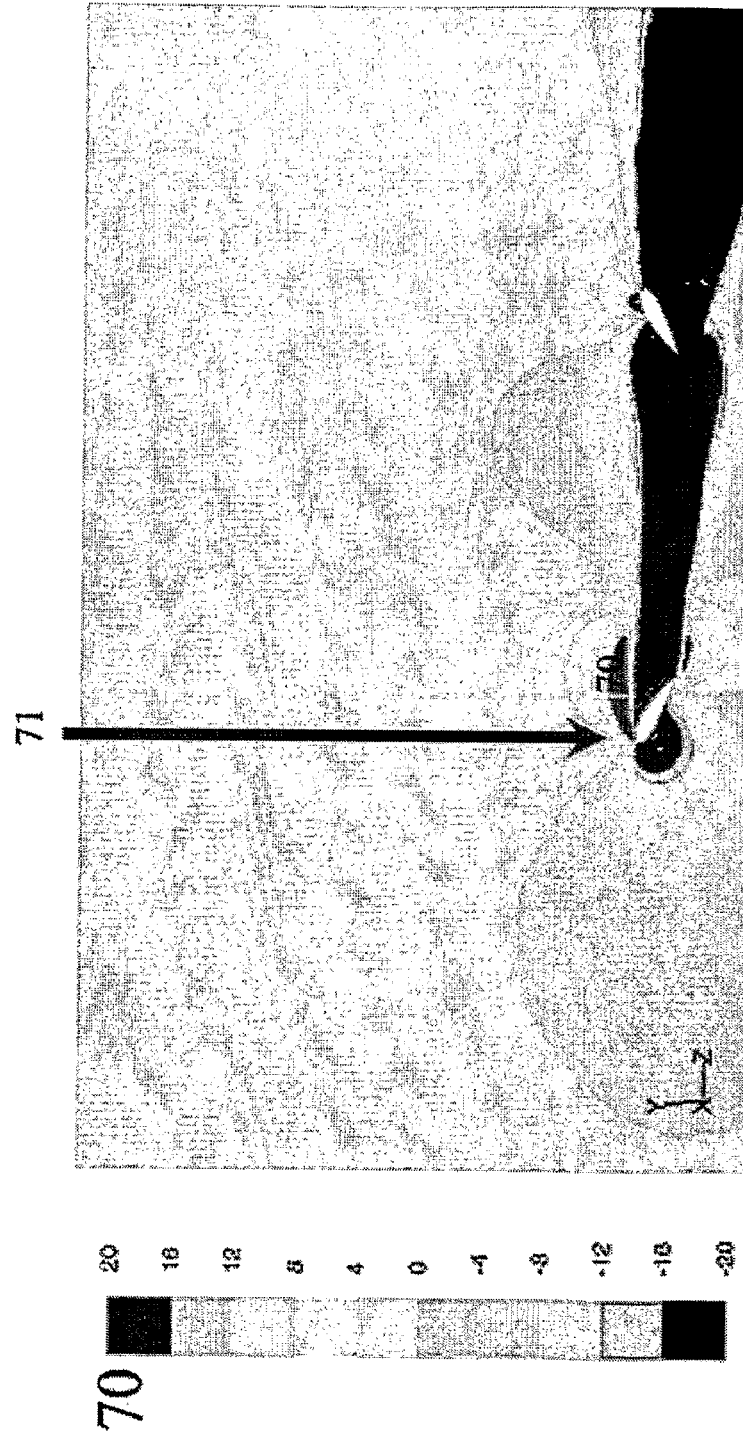
Figure 23 Inner Airfoil Doughnut Velocity

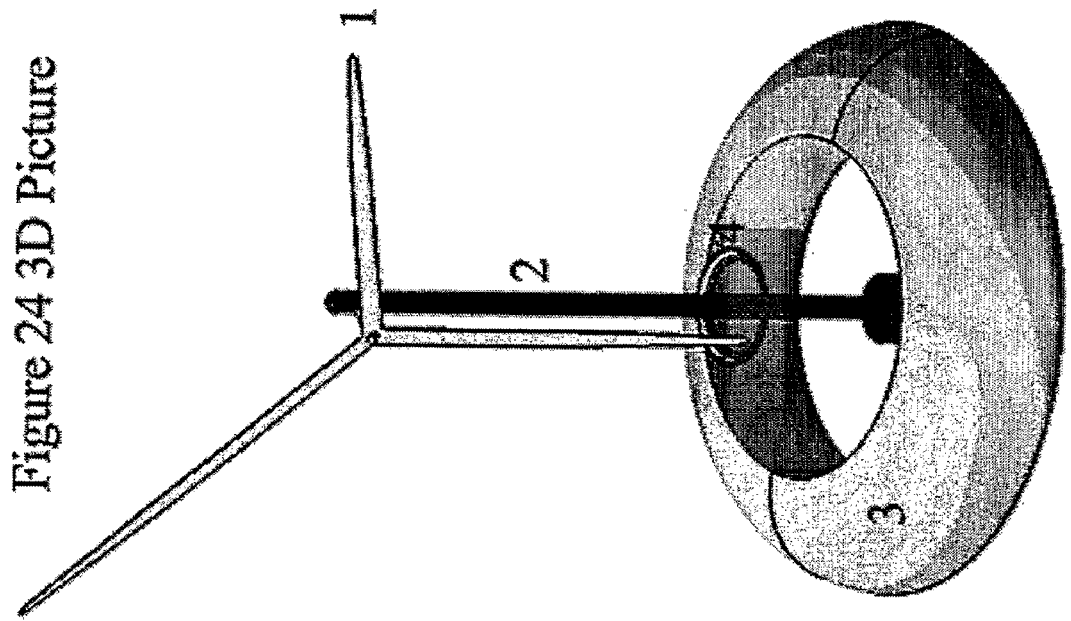

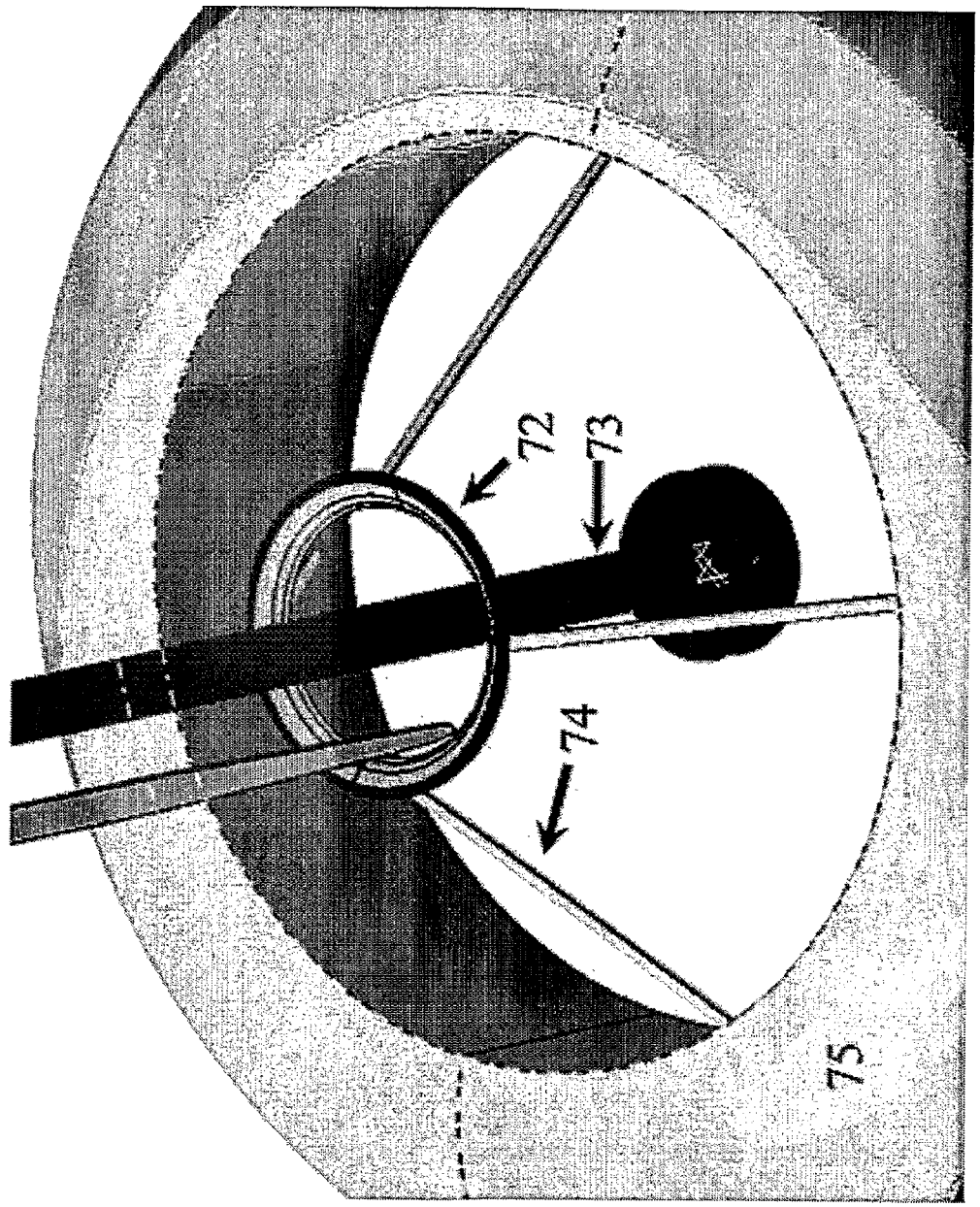
Figure 25 Inner FDD Not Attached to Tower

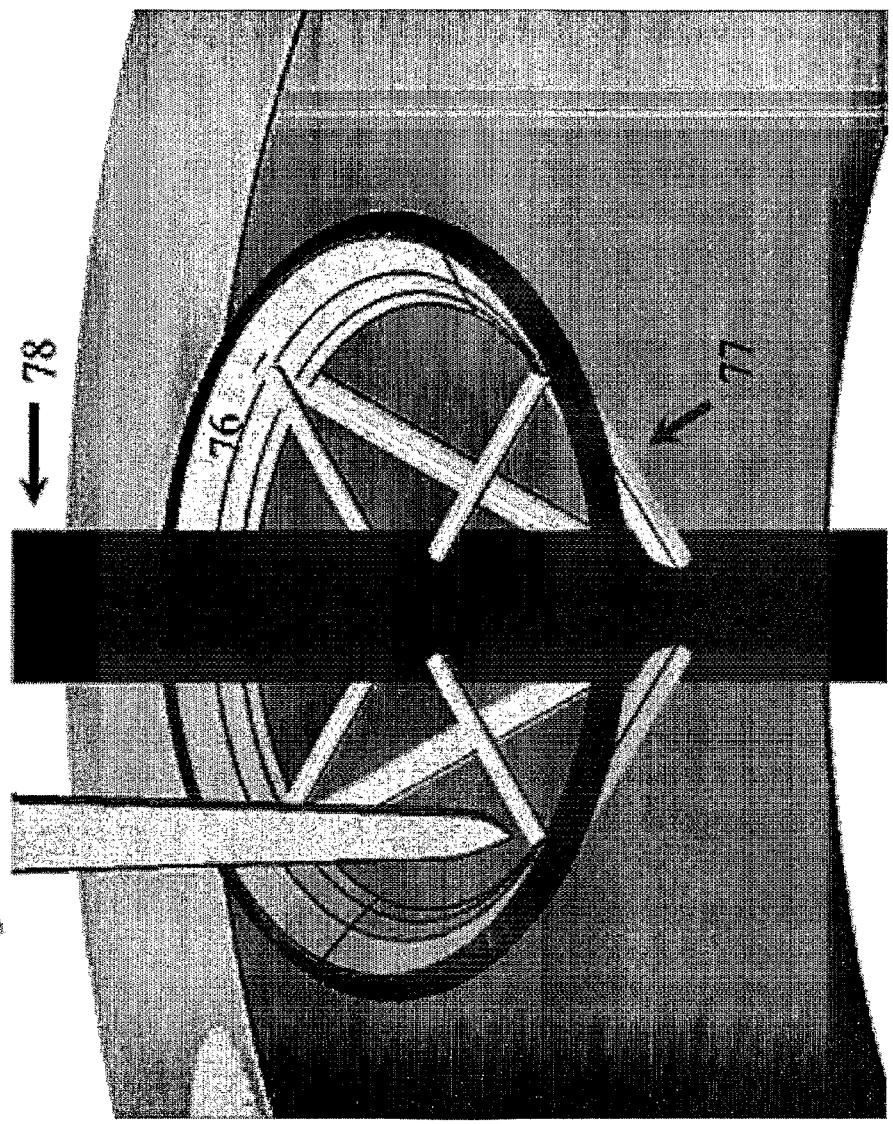
Figure 26 Inner FDD Attached to Tower

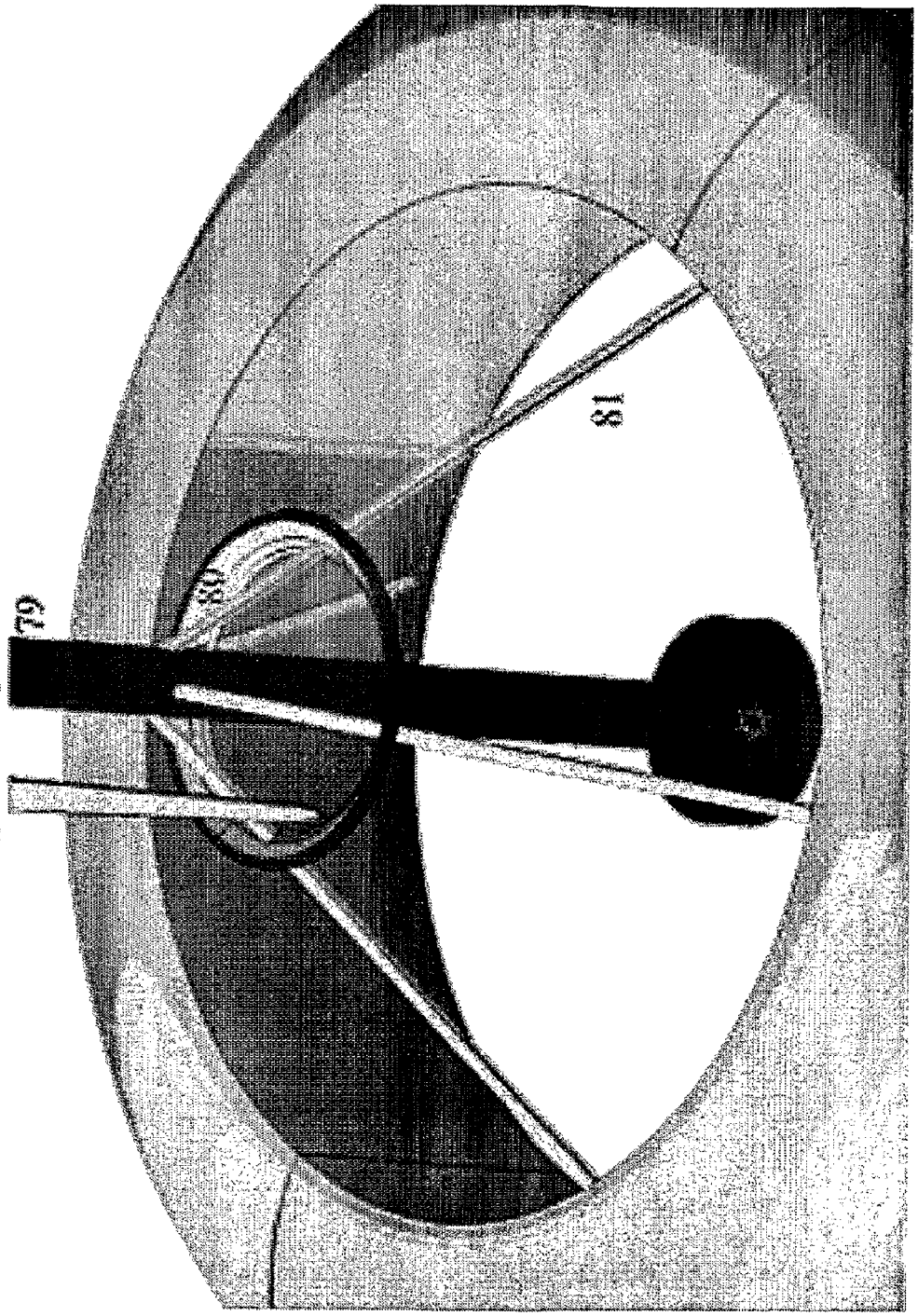
Figure 27 Hybrid Attachment

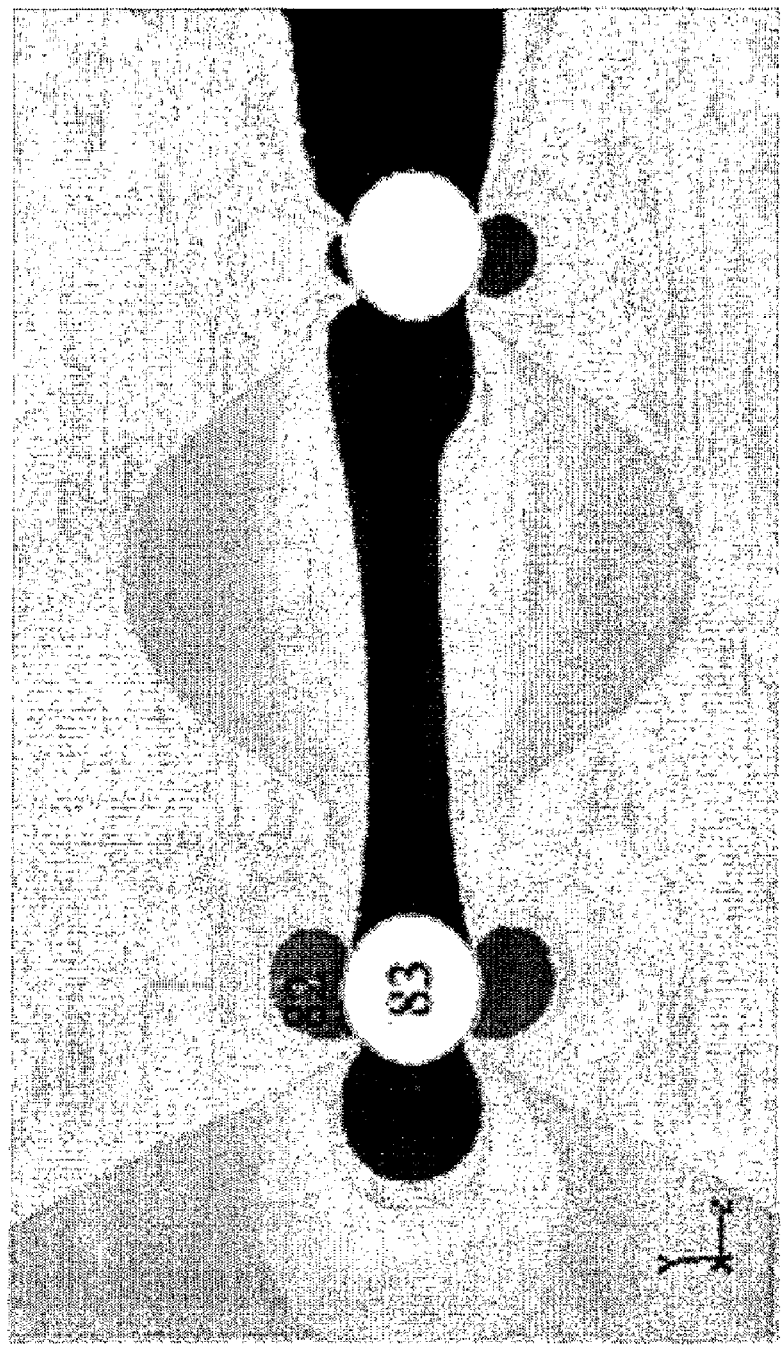
Figure 28 Velocity Increase Graph for a Sphere

Figure 29 Velocity Graph for Foil and Sphere
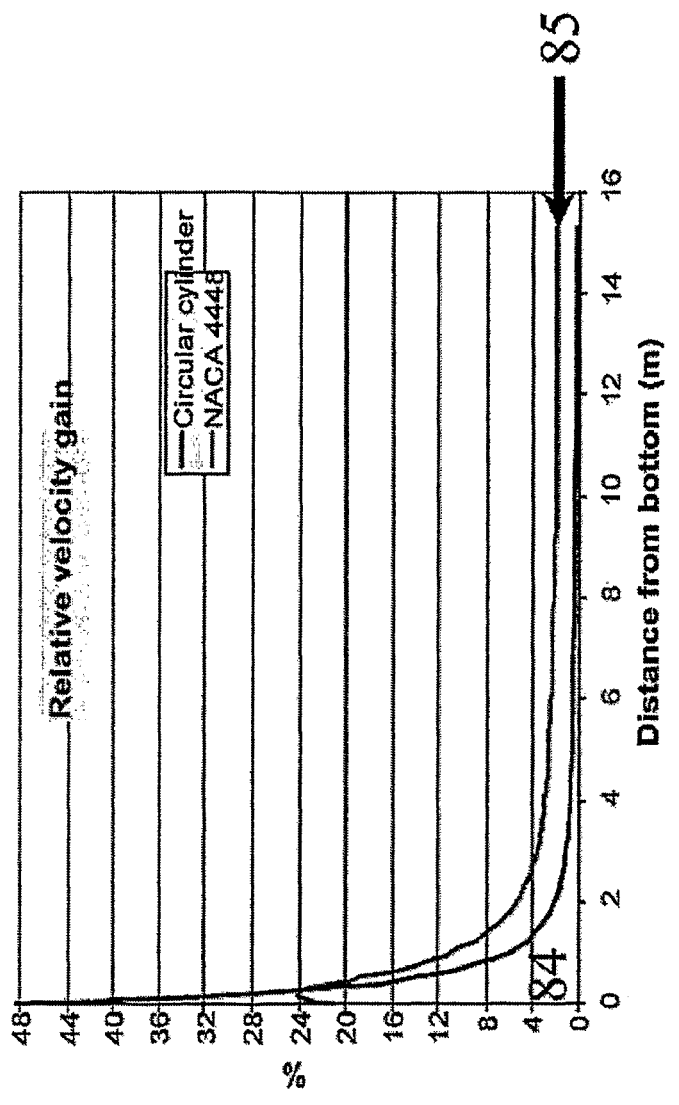
The relative velocity gain along the symmetry line of the blade rotation plane (X=0, Z=-2.45m).

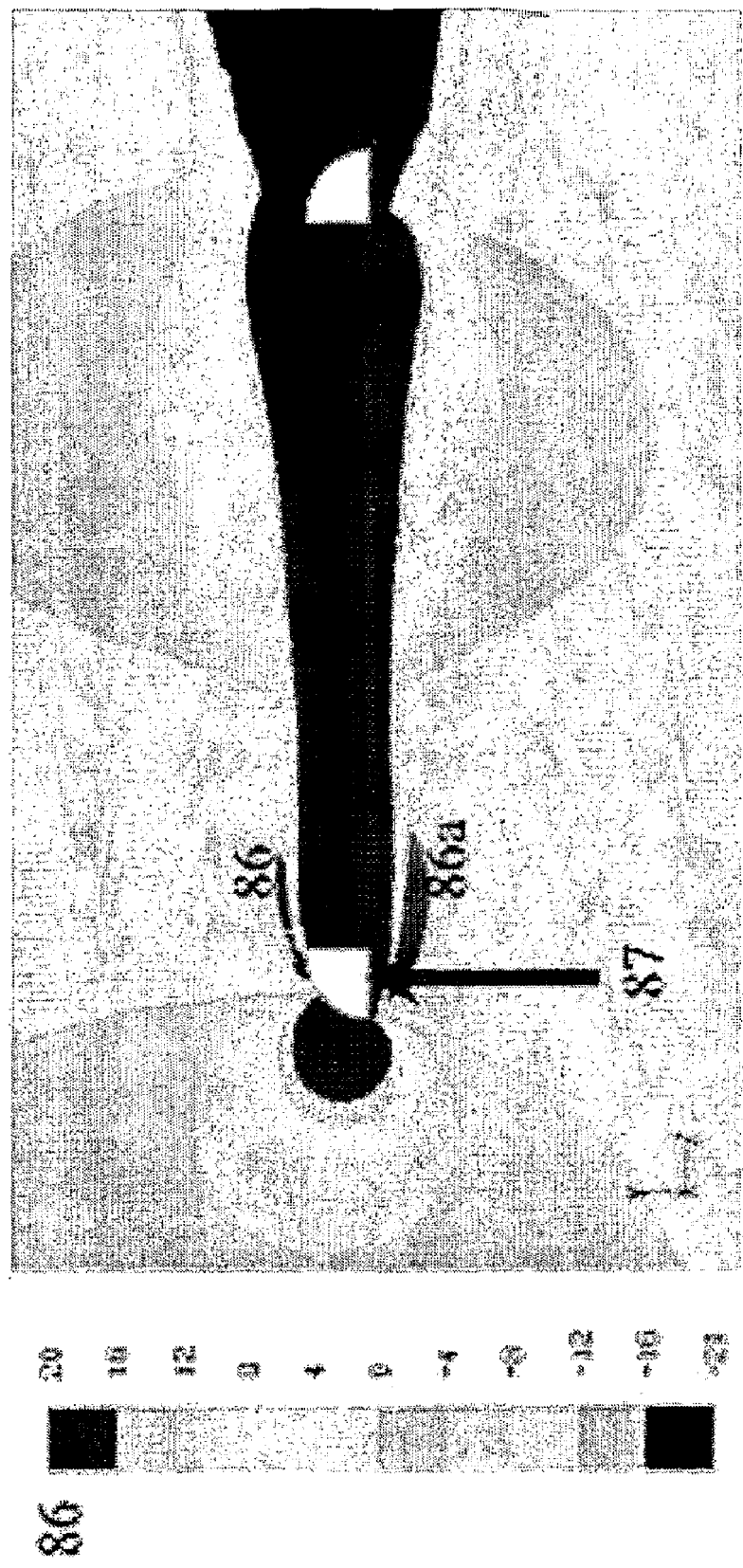
Figure 30 Velocity Increase Graph for a Quarter Sphere

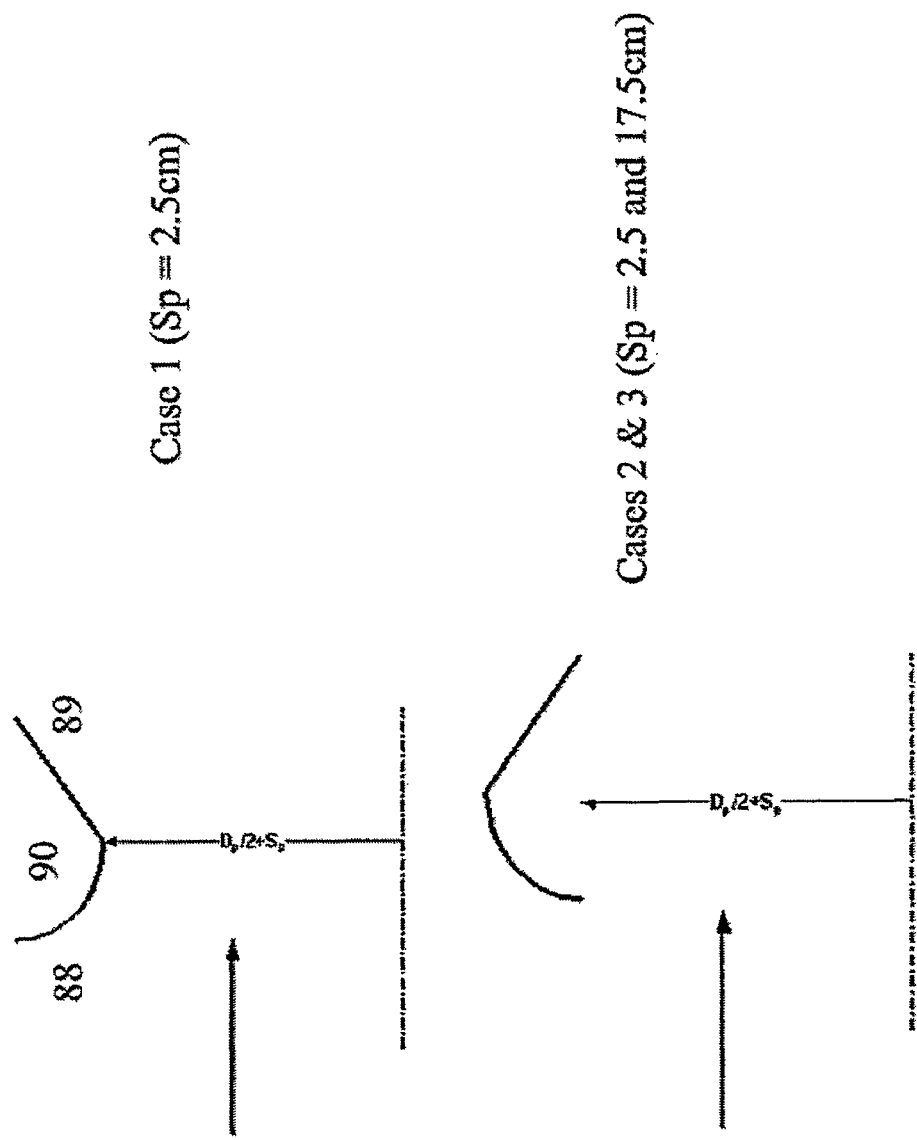

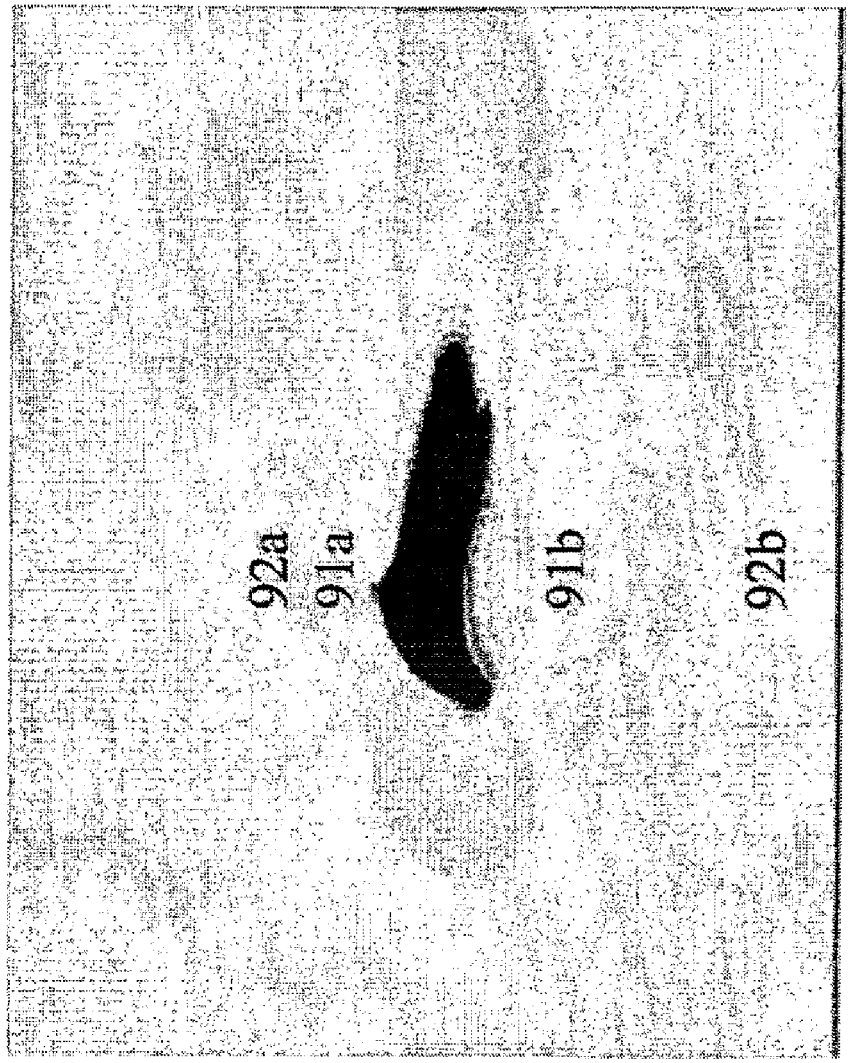
Figure 32 Outline WDD Result

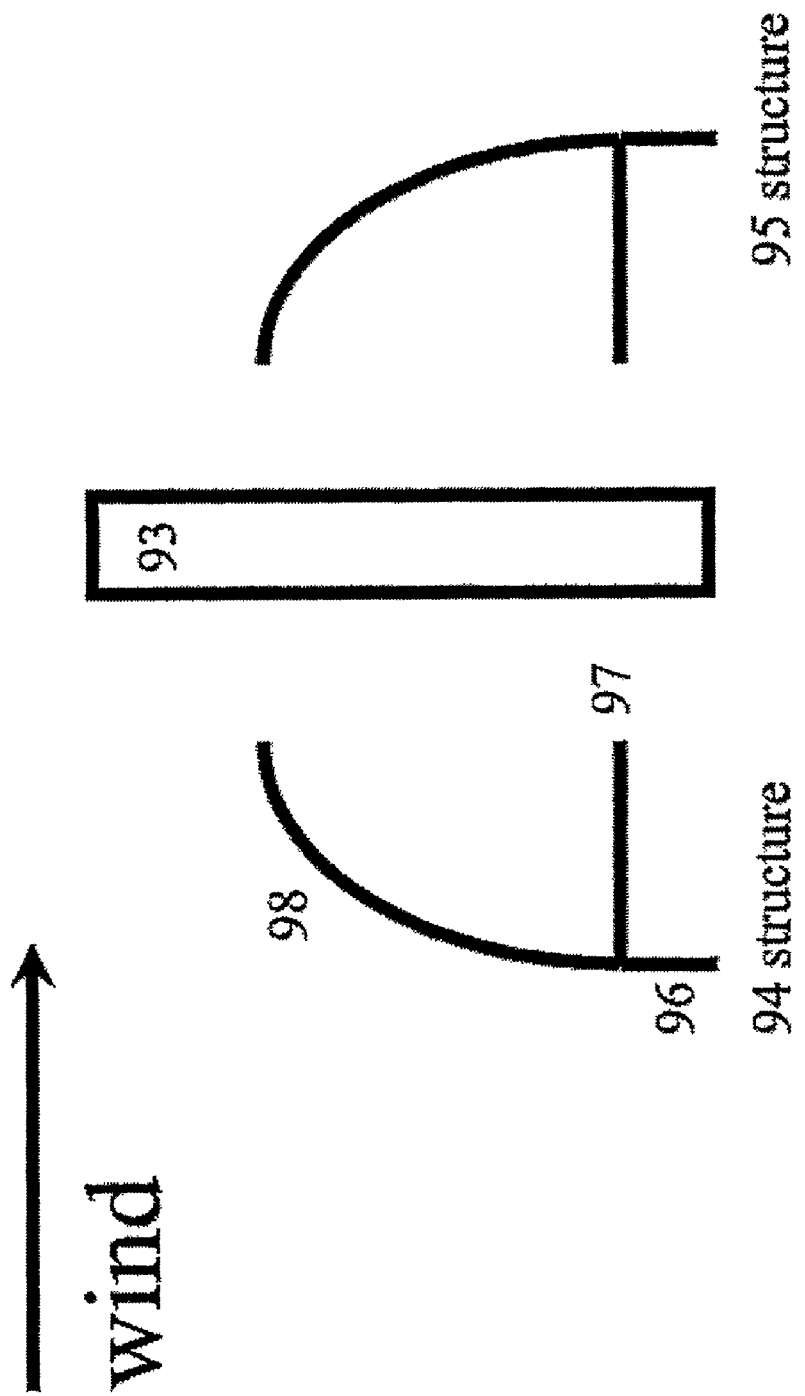
Figure 33 Large FDD Outline

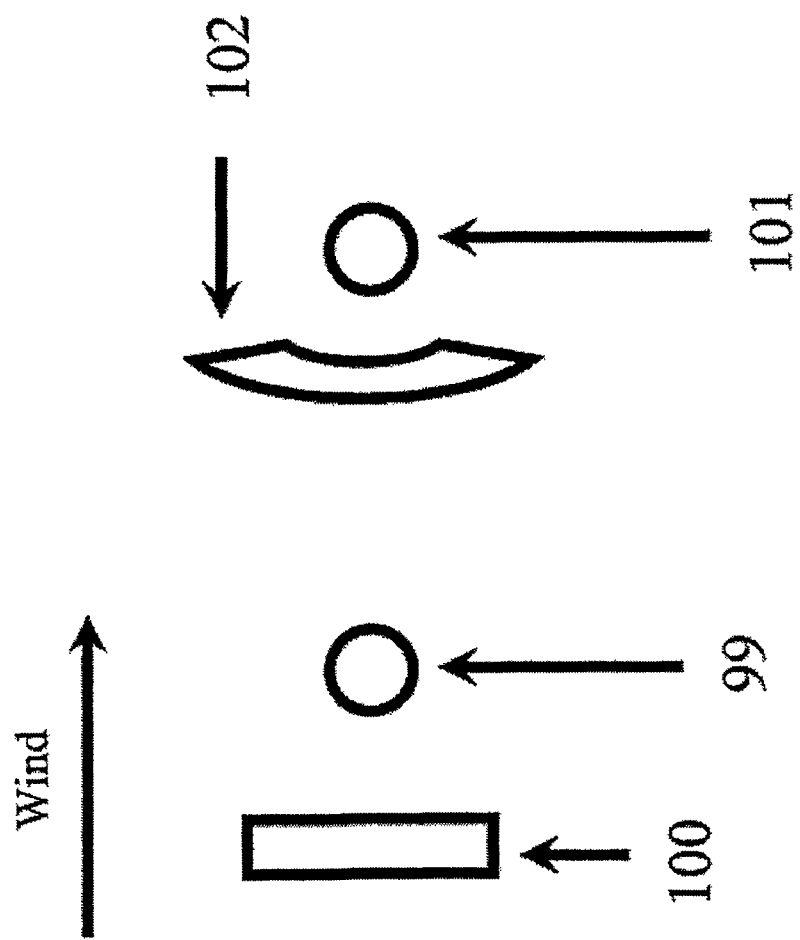
Figure 34 Superior View of Tower and FDD

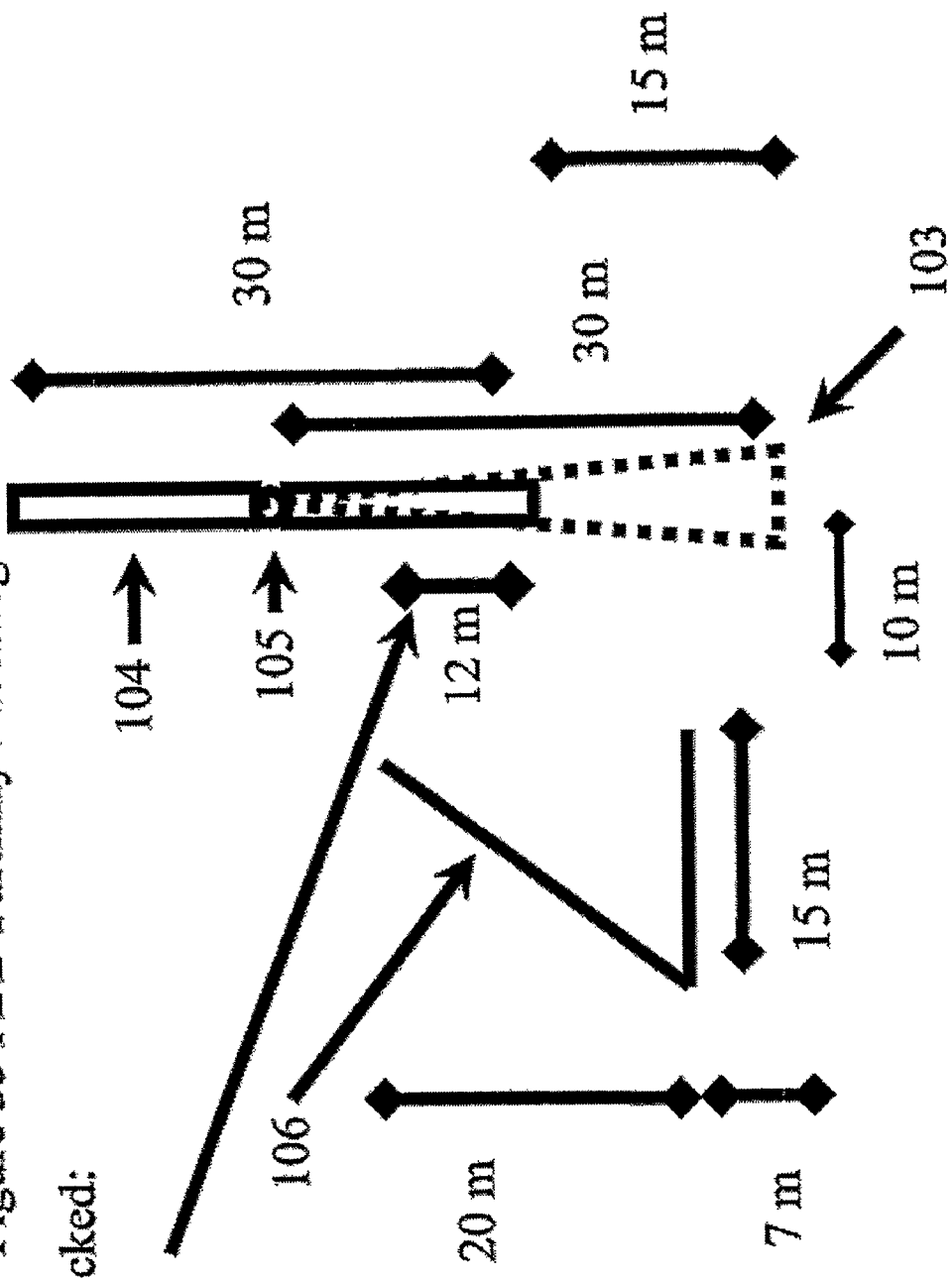

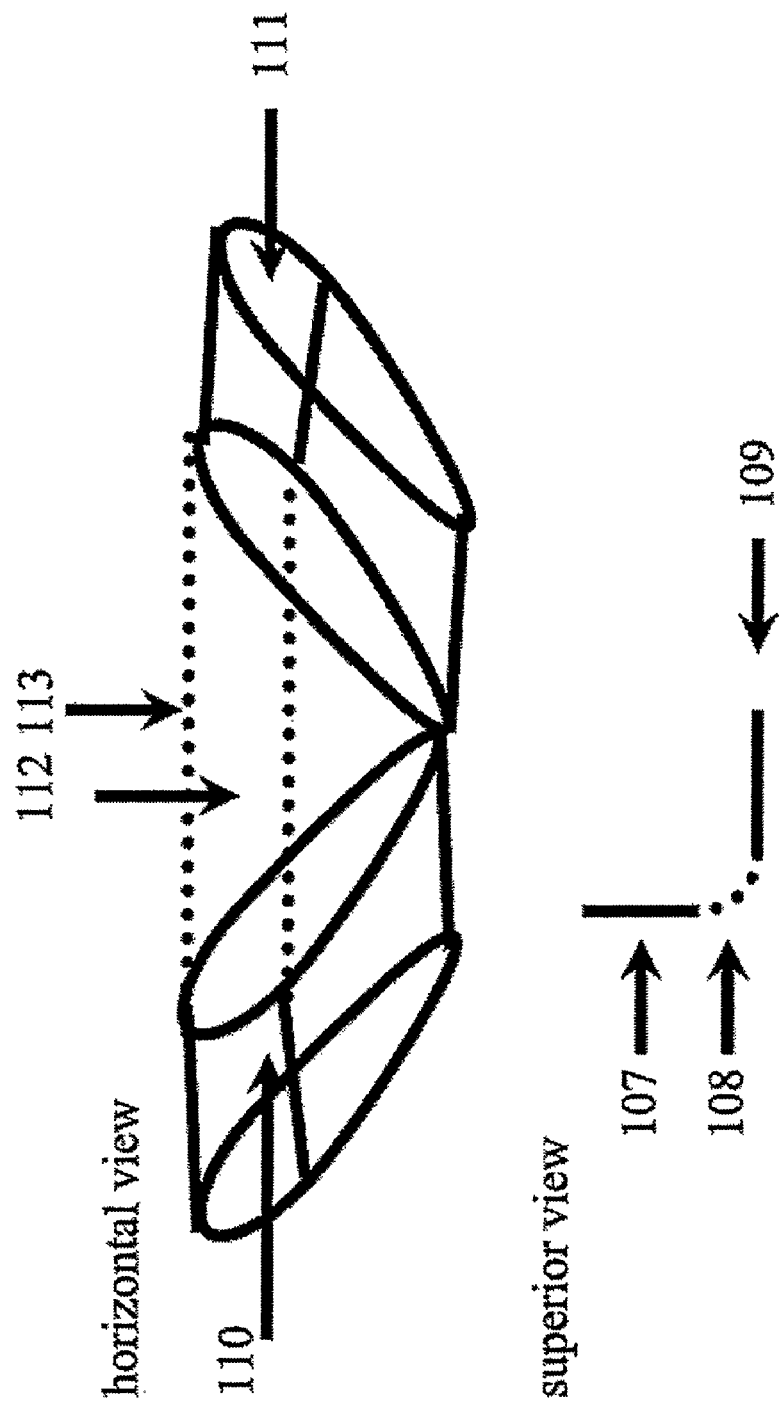
Figure 36 Rectangular Foil Ring

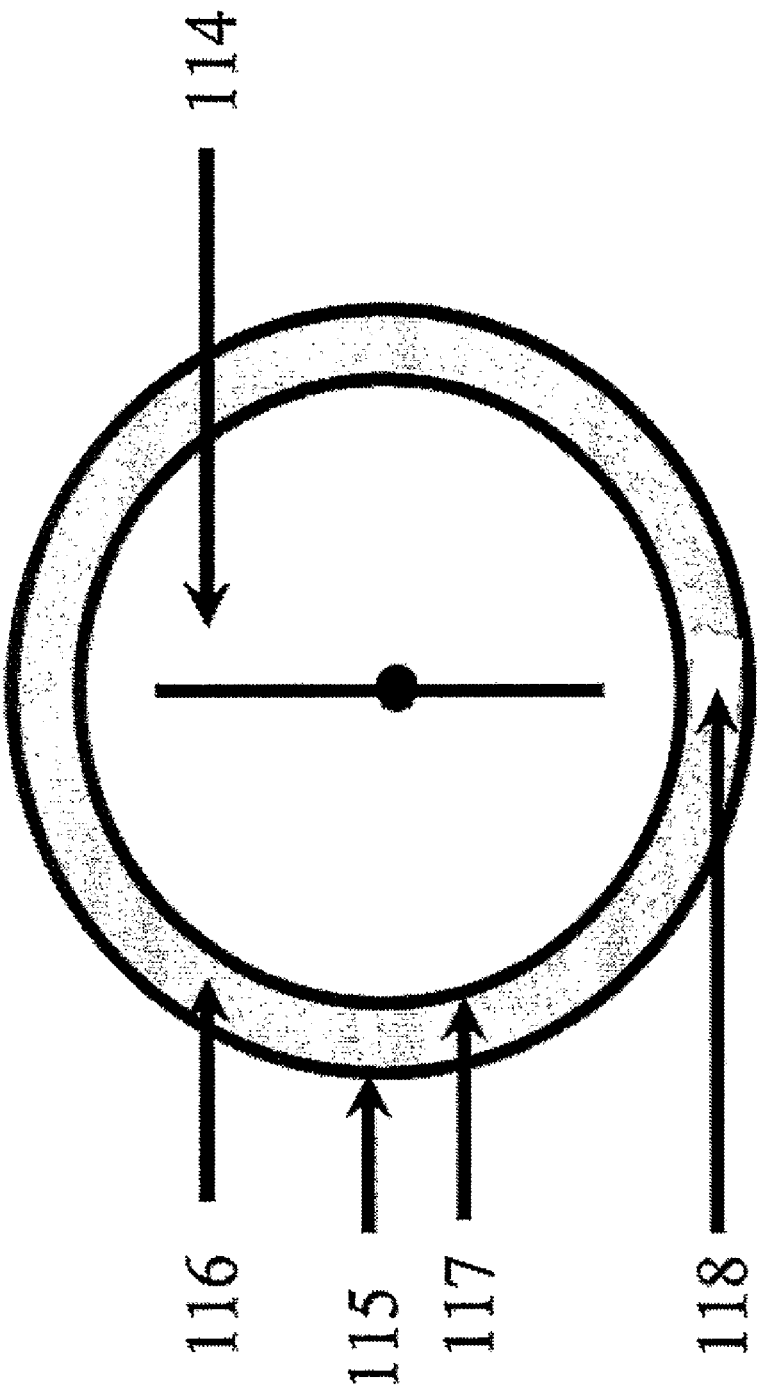
Figure 37 Small wind WDD sections

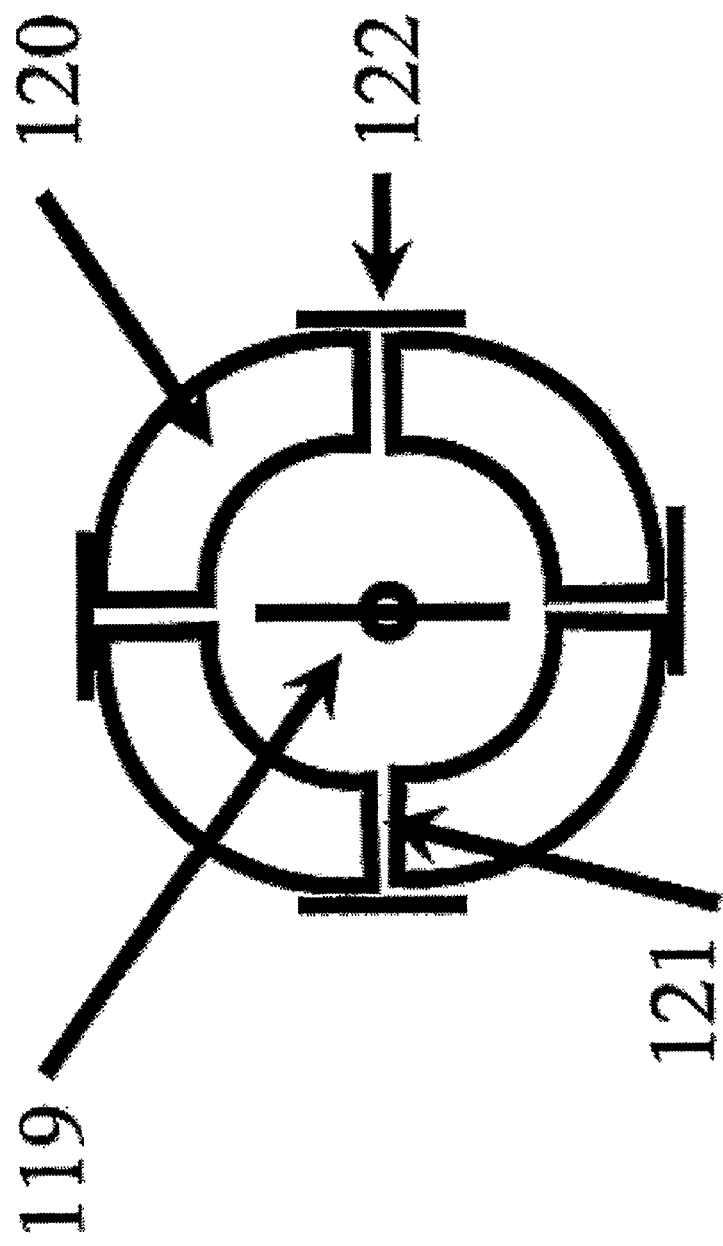
Figure 38 Small Turbine Wind Release Sites

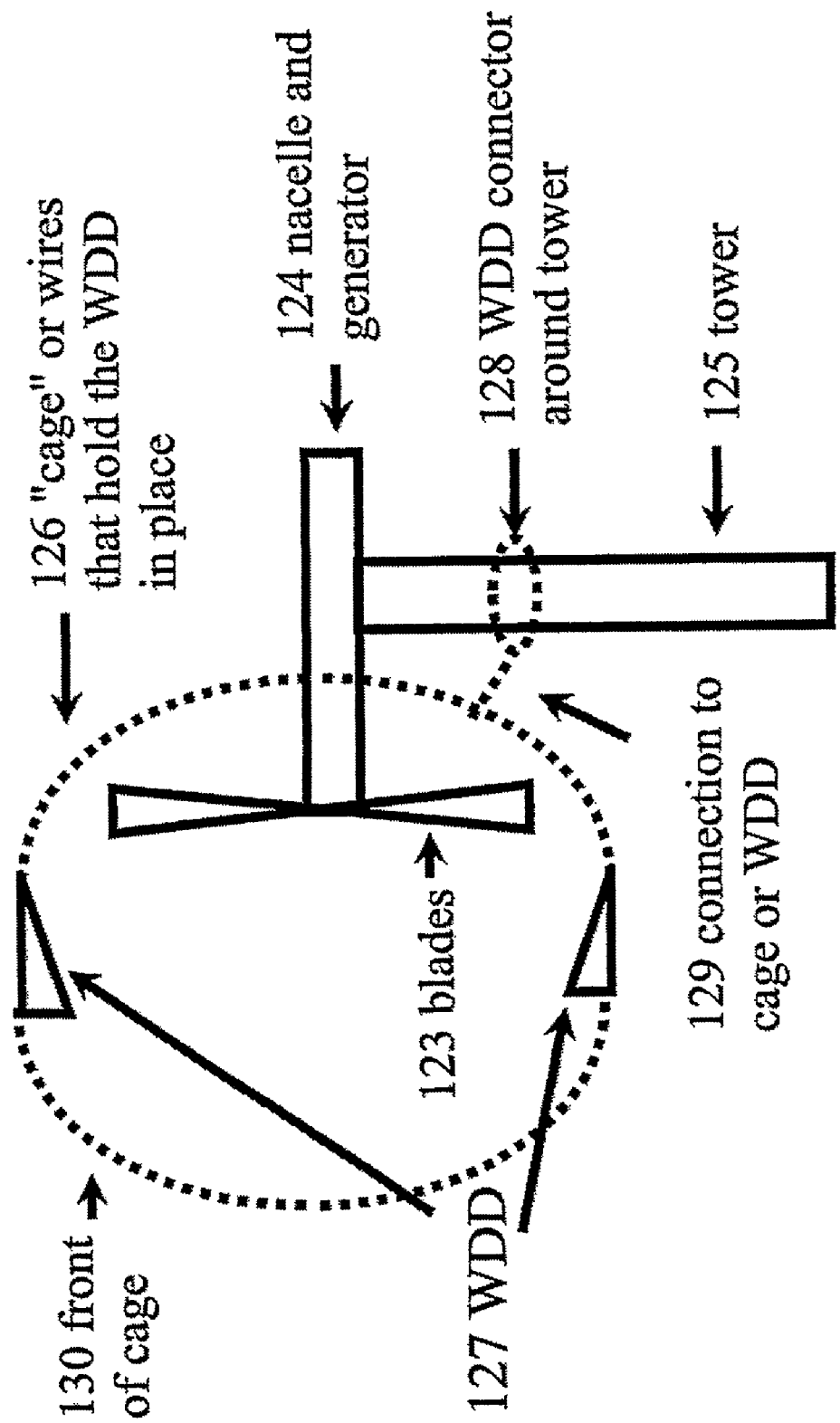
Figure 39 Small wind turbine with 360 degree WDD

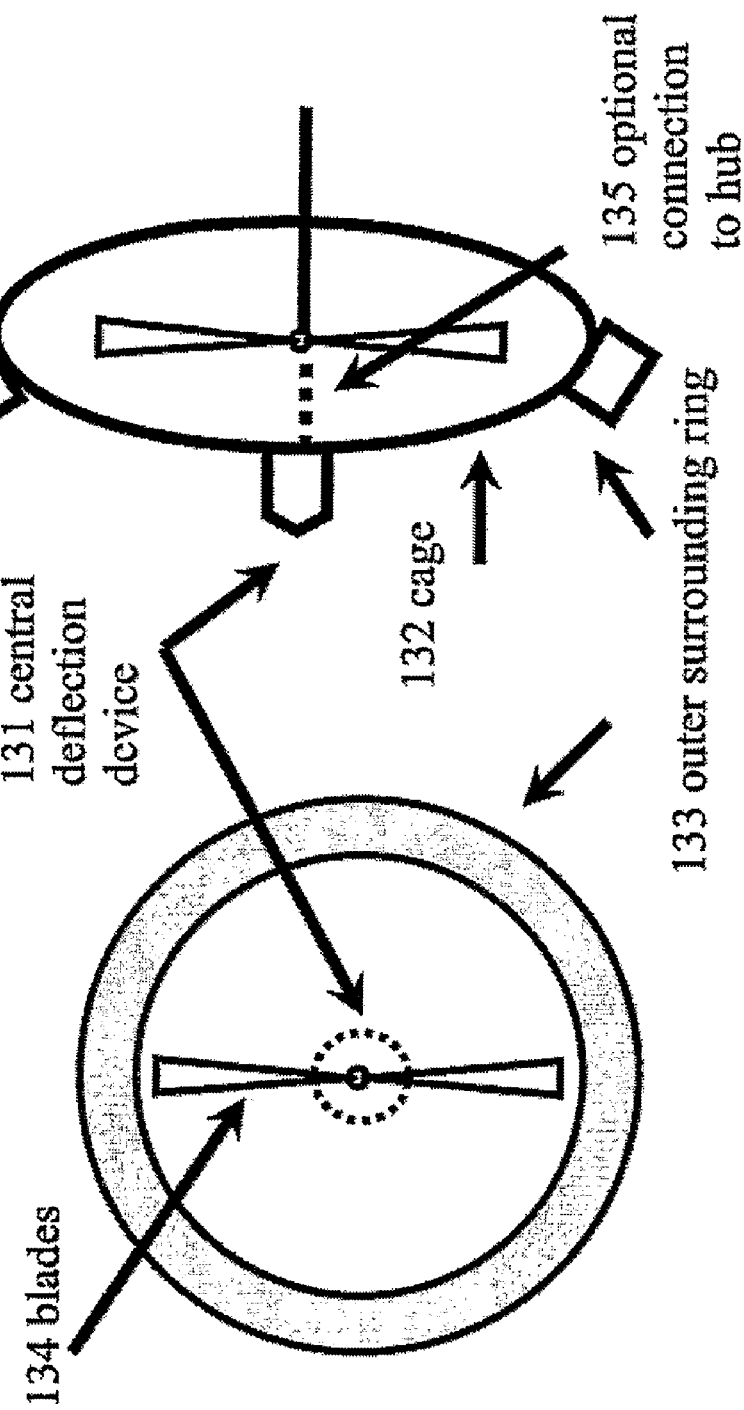
Figure 40 Turbine surrounded by surrounding ring with deflection device in center on cage
a. front view
b. cross-section
131 central deflection device
132 cage
133 outer surrounding ring
134 blades
135 optional connection to hub

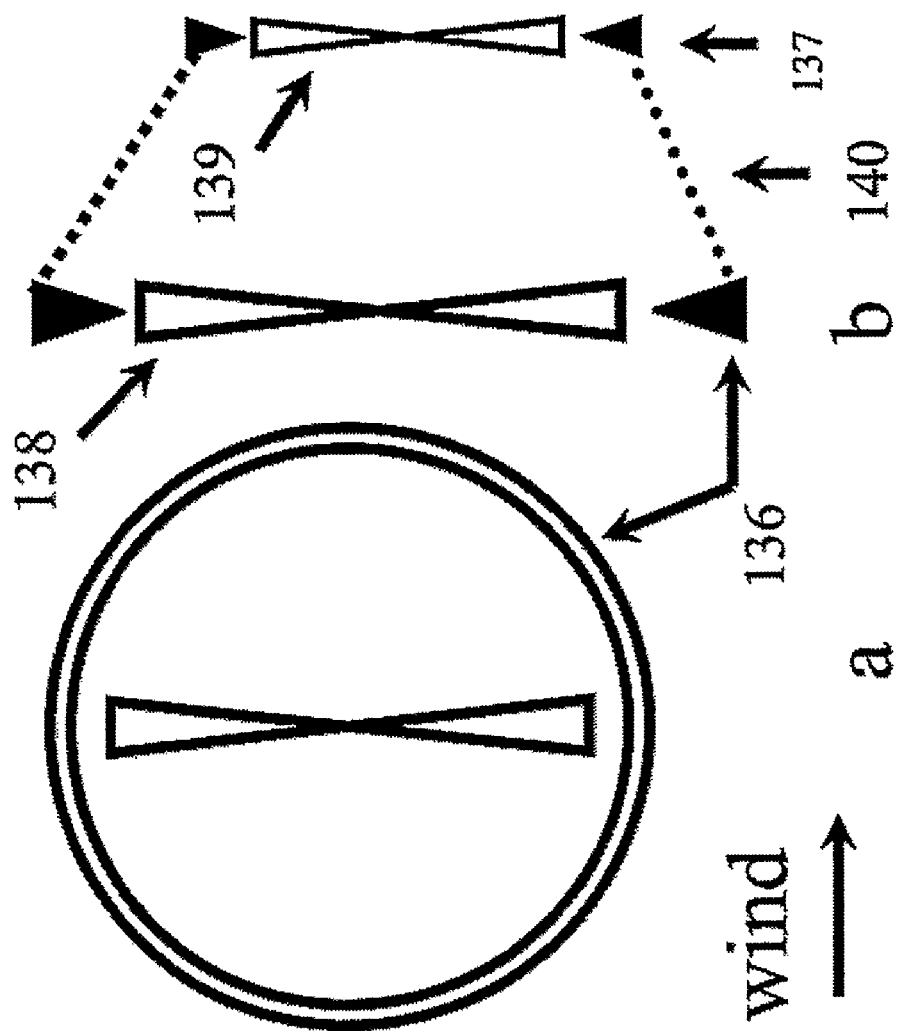
Figure 41 Double Turbine Design

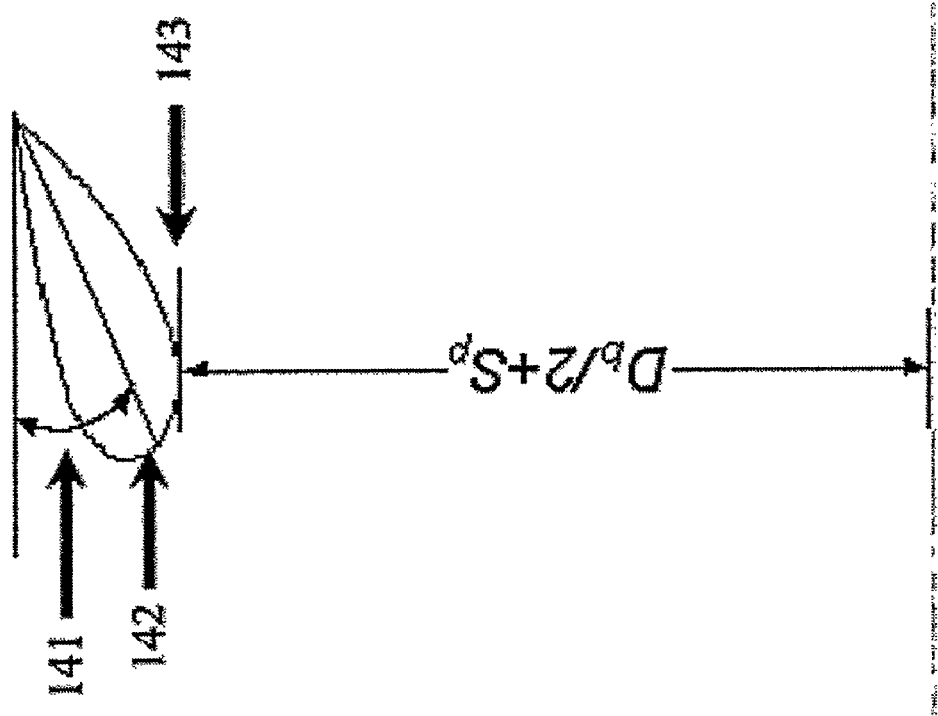

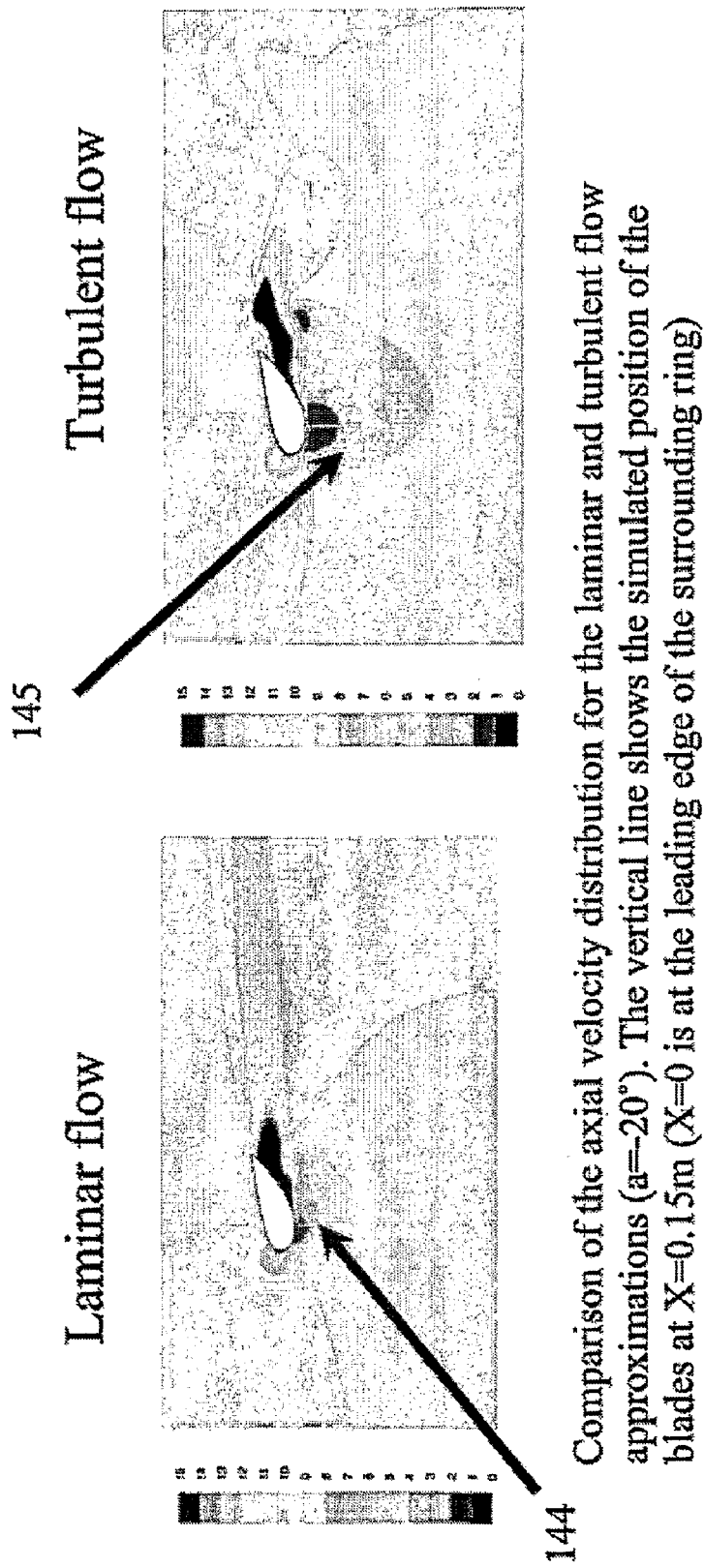
Figure 43 Laminar and Turbulent Flow Around a Foil

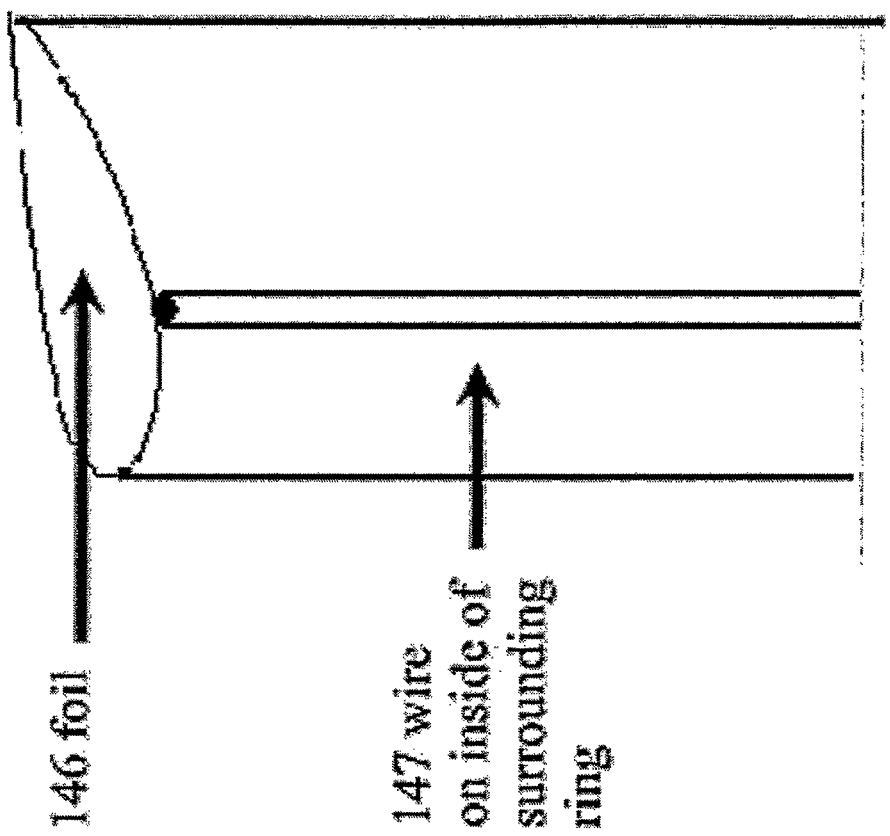

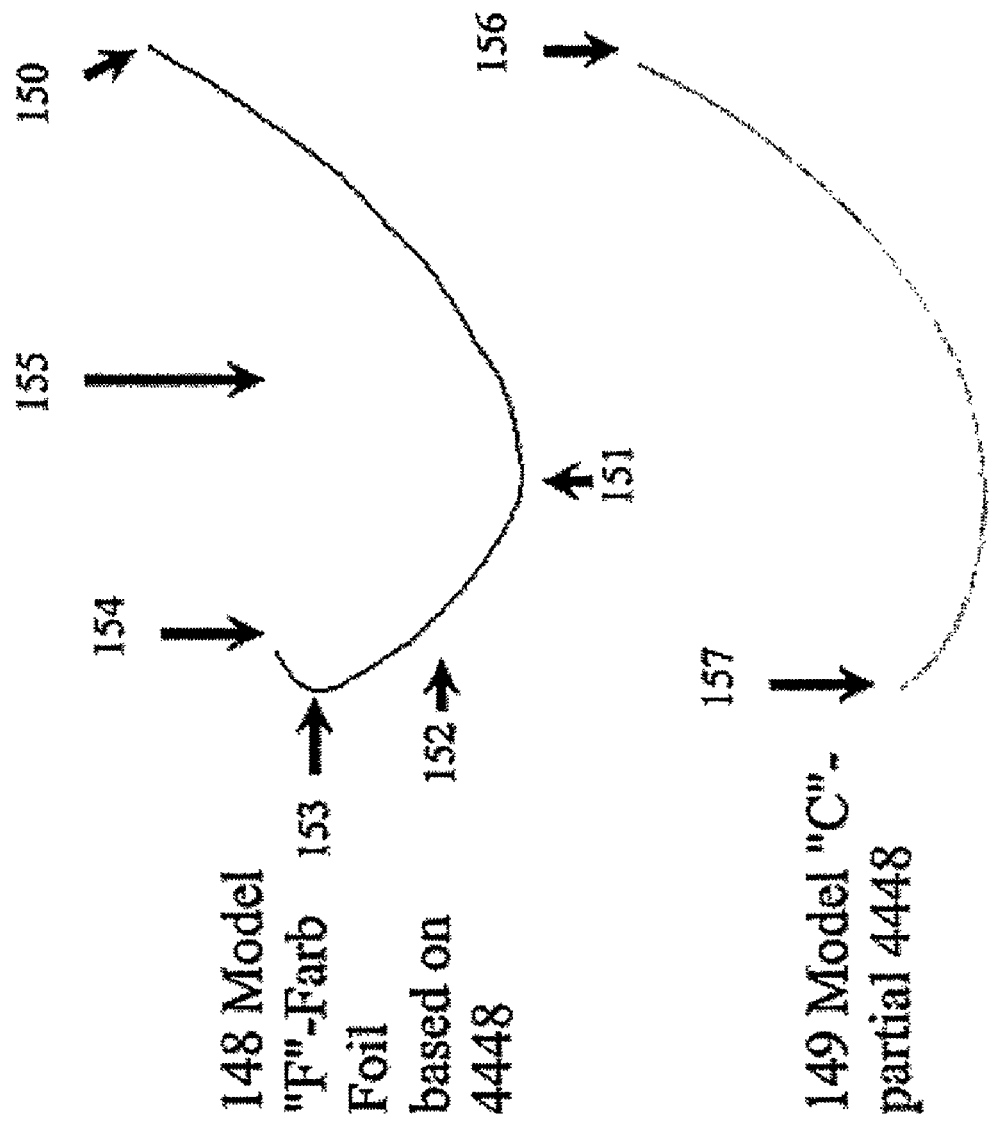

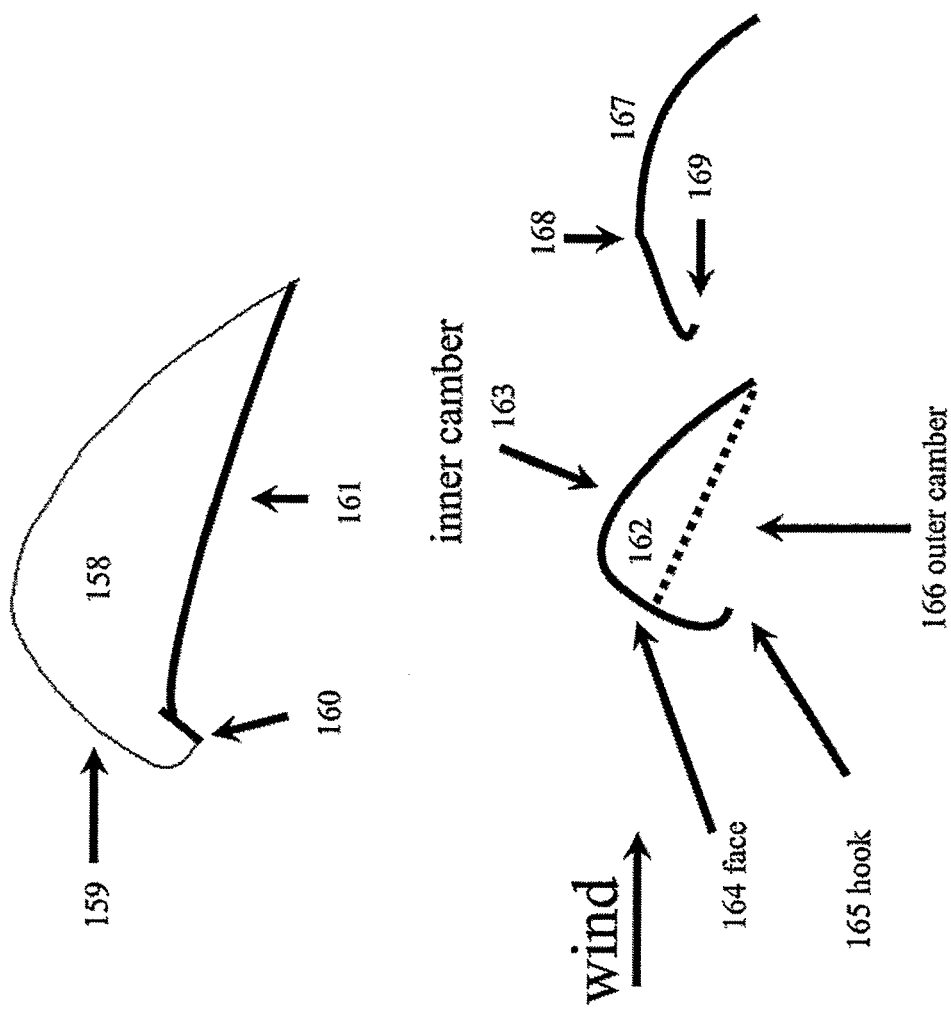
Figure 46 Farb Foil Variant

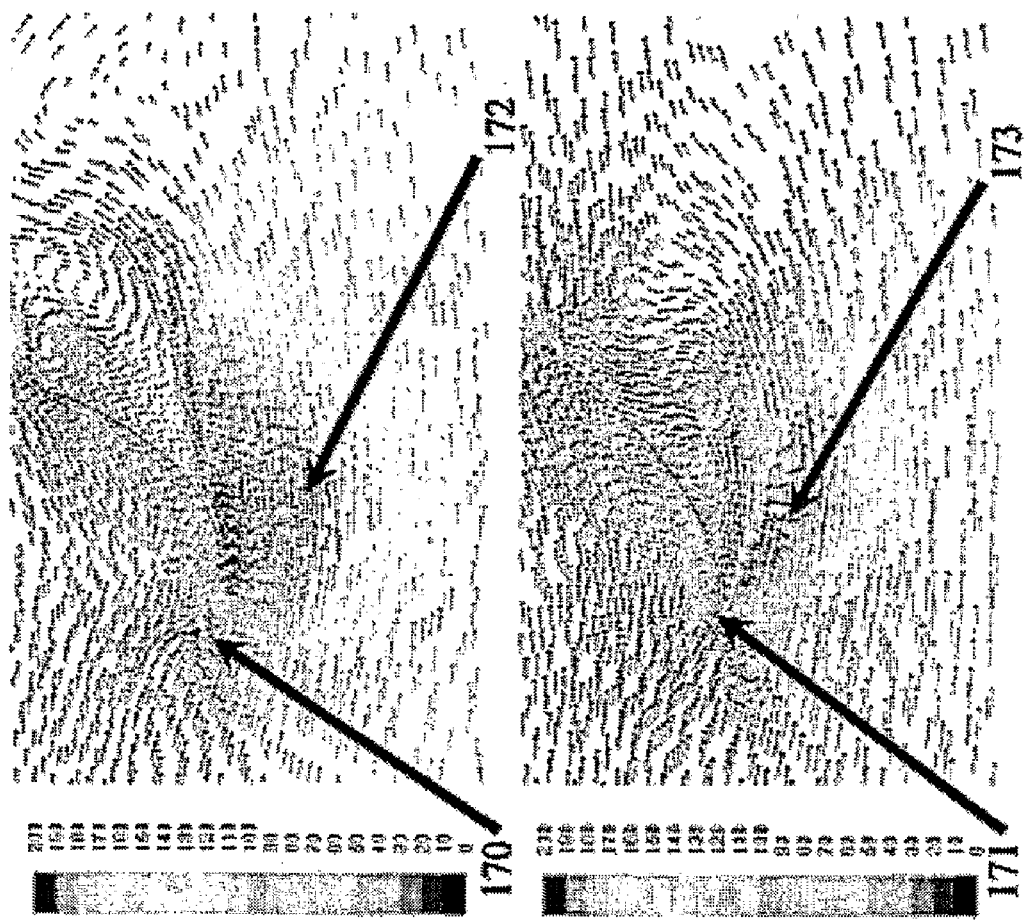
Figure 47 Partial Foil Outline Flow Pictures

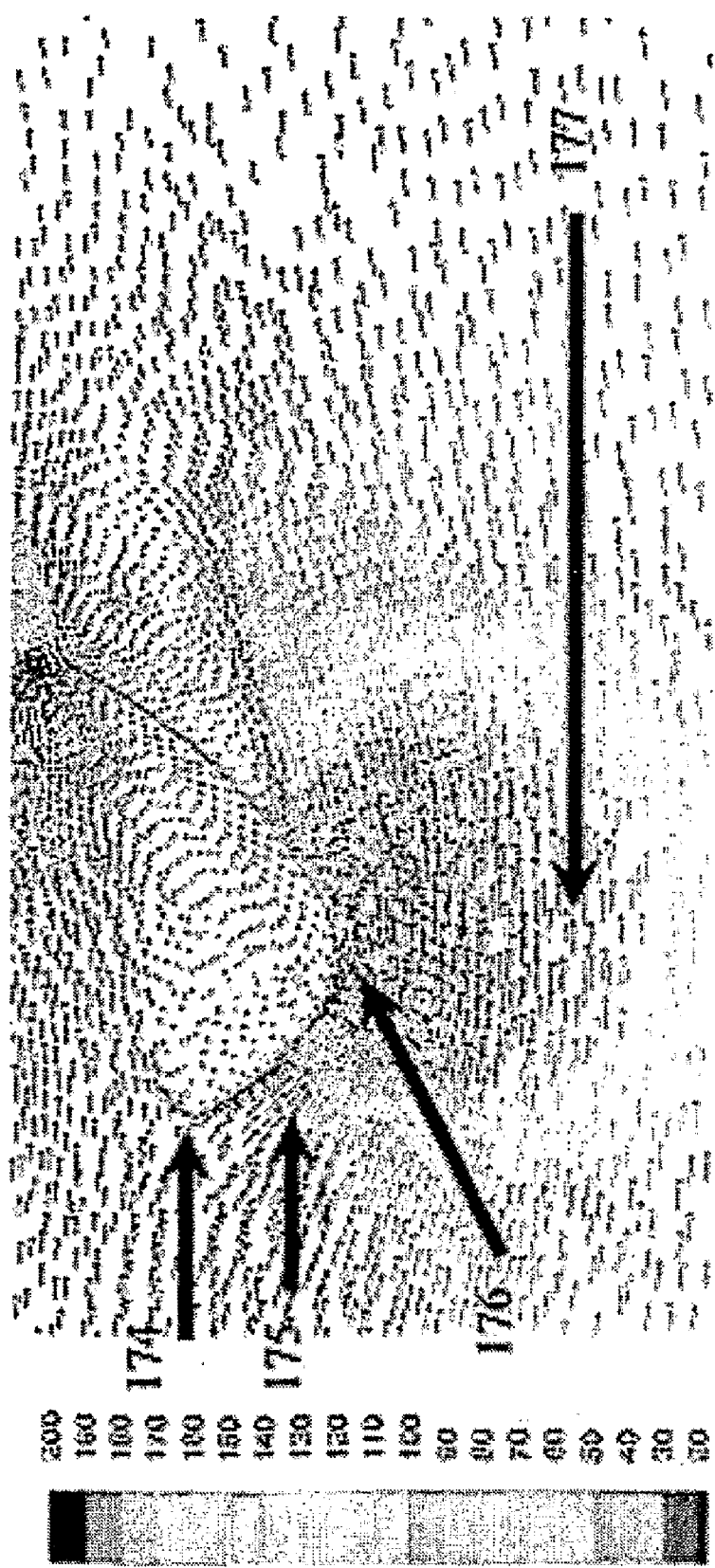
Figure 48 Farb Foil Outline Flow

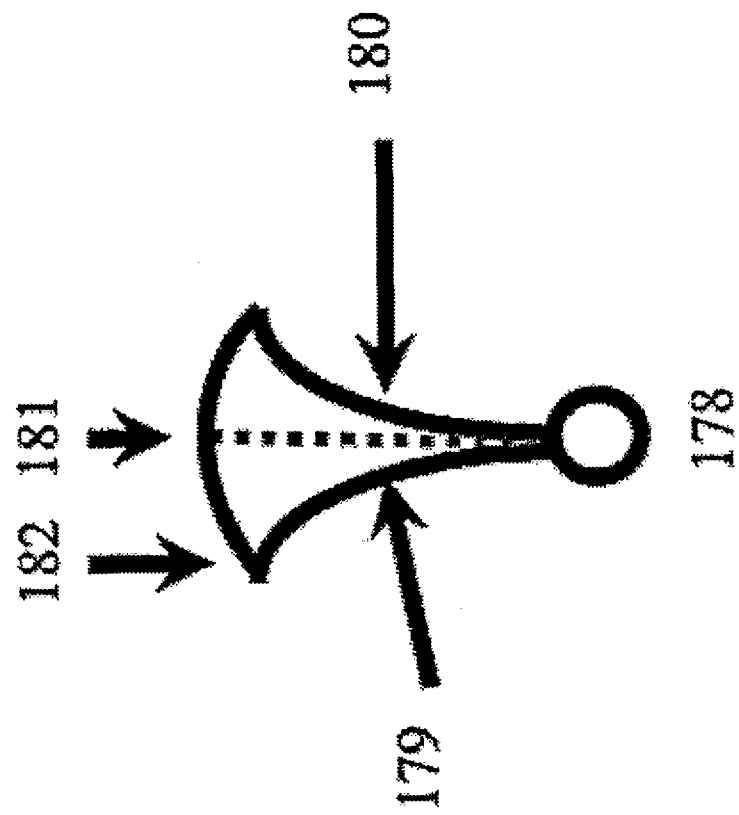
Figure 49 Small wind turbine blades

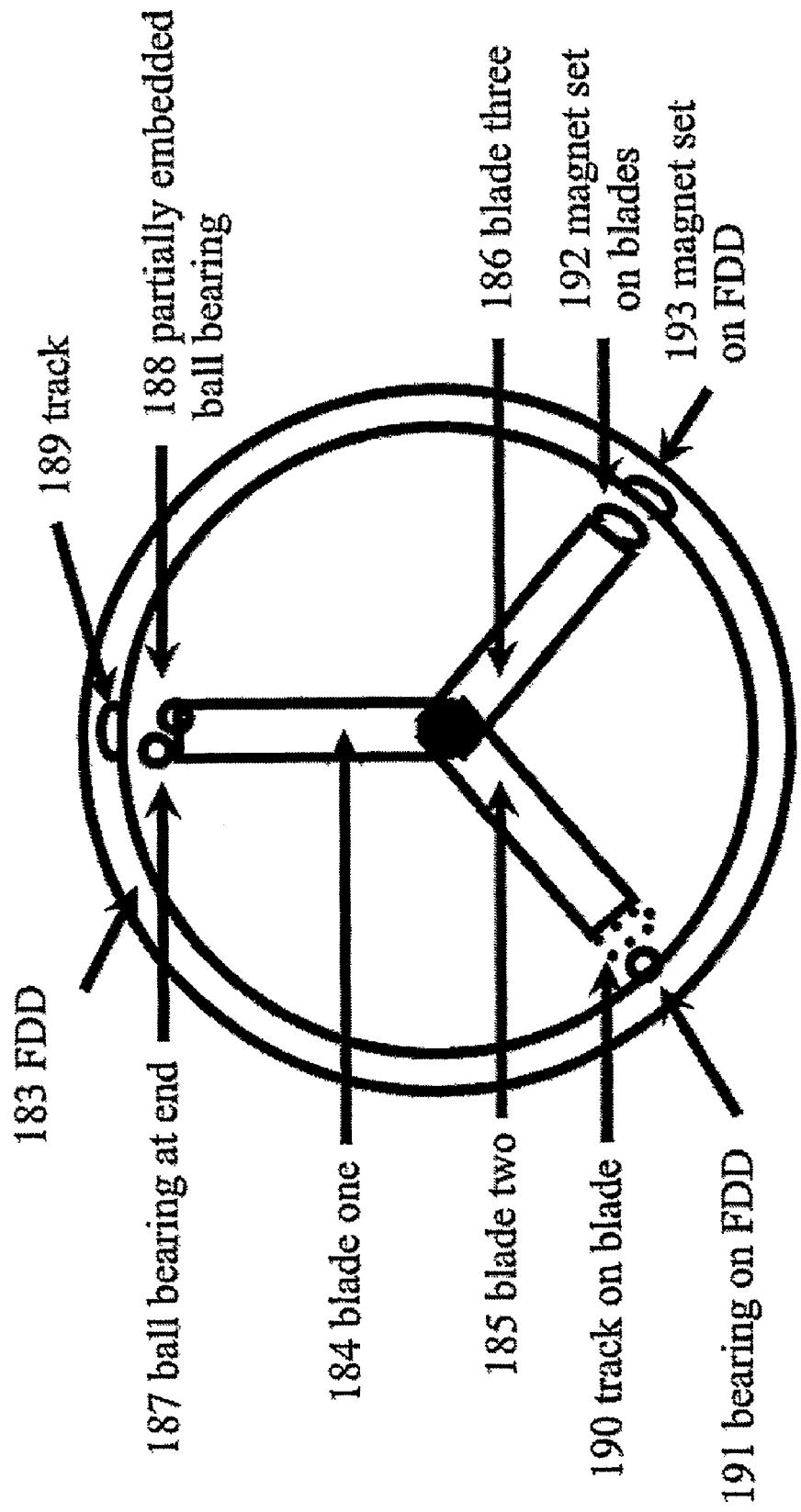
Figure 50 Blades and Bearings

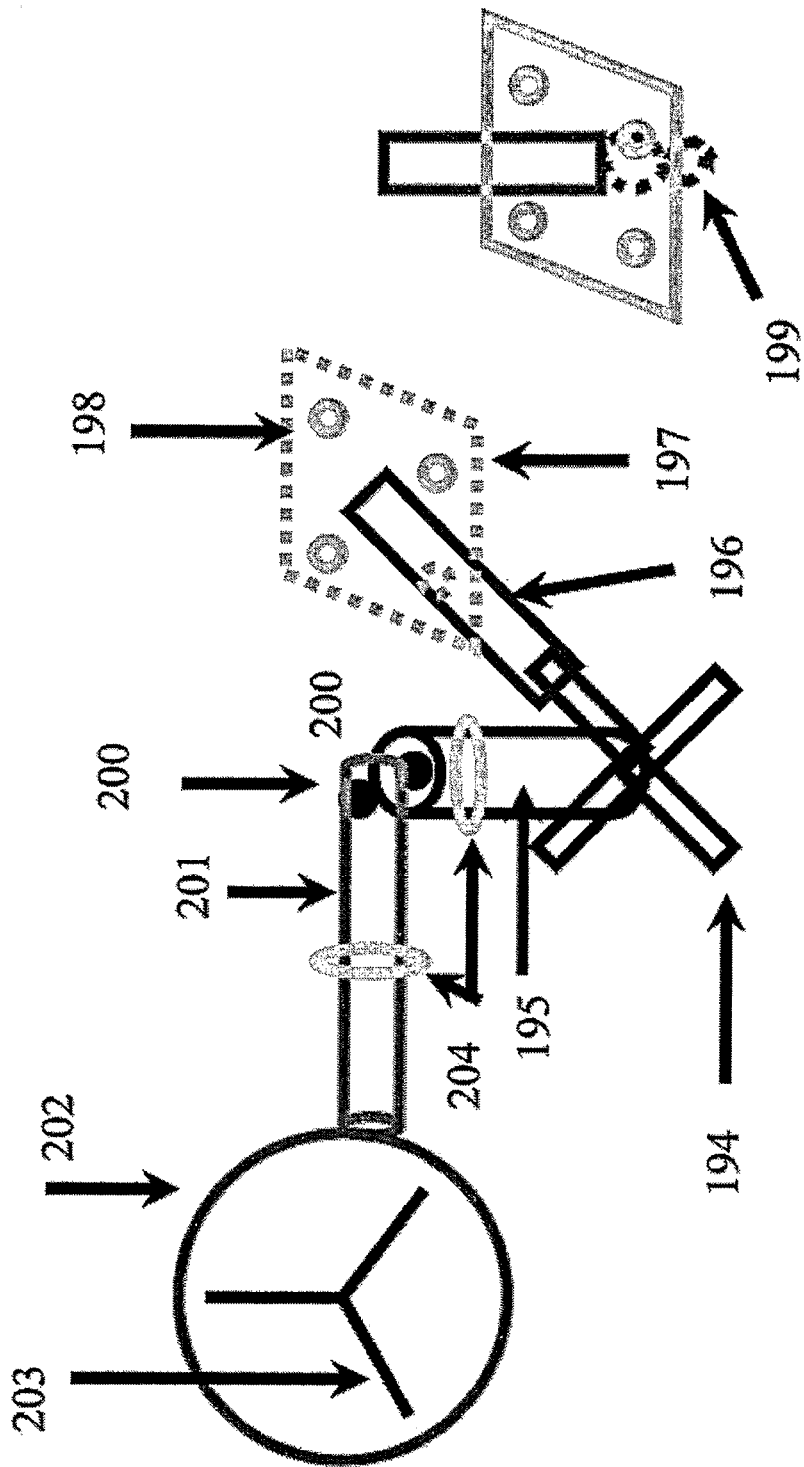
Figure 51 Small Wind Turbine Assembly

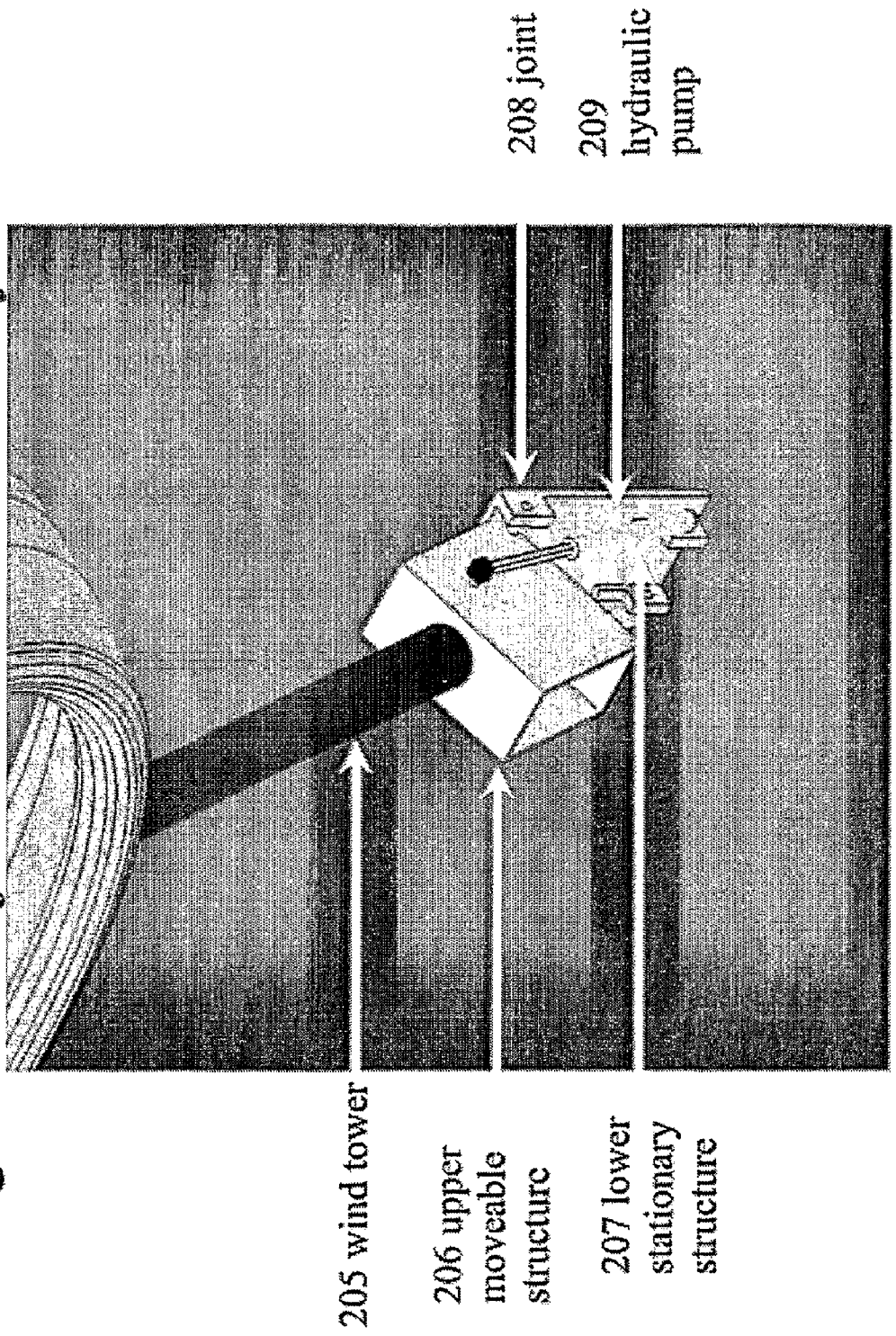
Figure 52 Adjustable Tower With Hydraulics

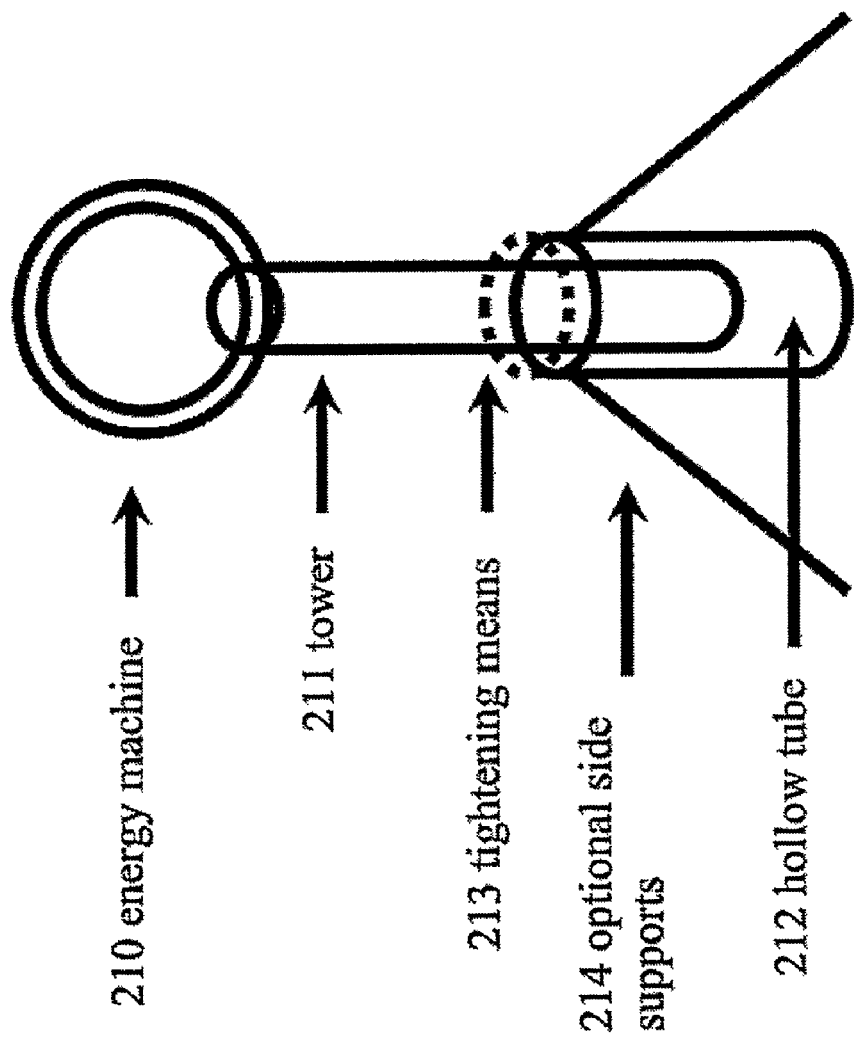
Figure 53 Retractable Tower

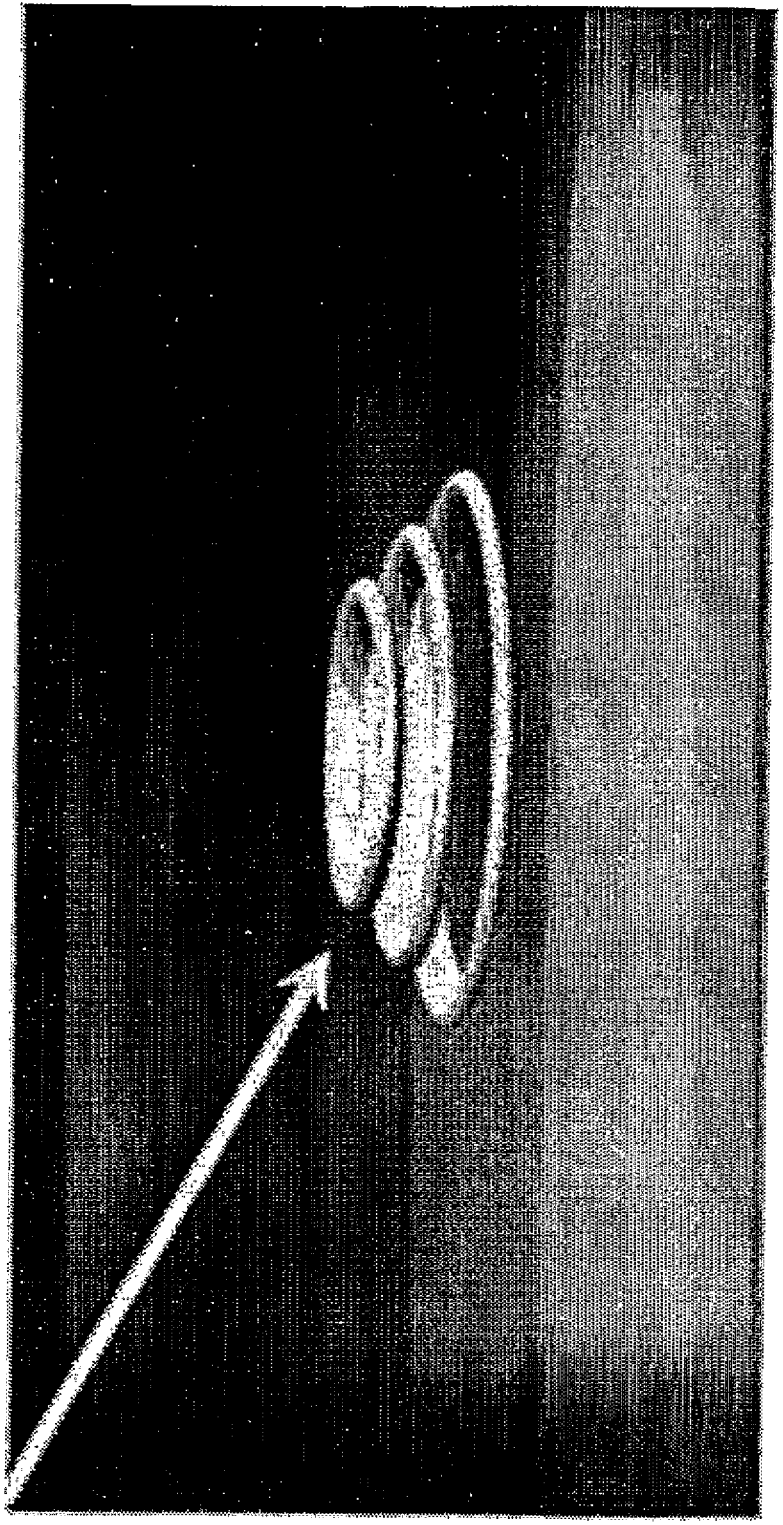
Figure 54 Airfoil Cascade
215

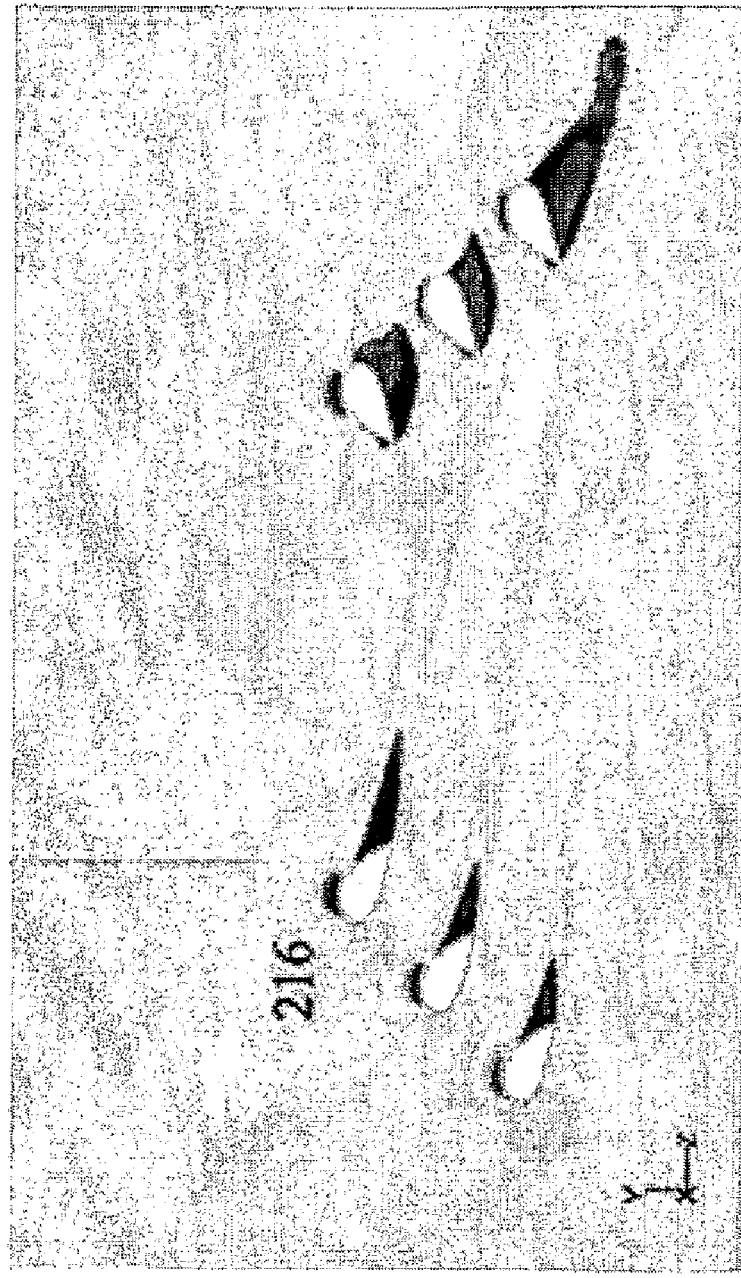
Figure 55 Cascade Velocity Distribution
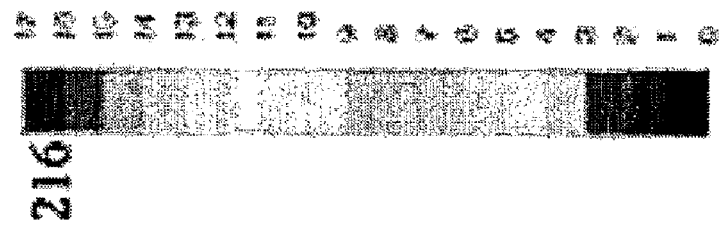

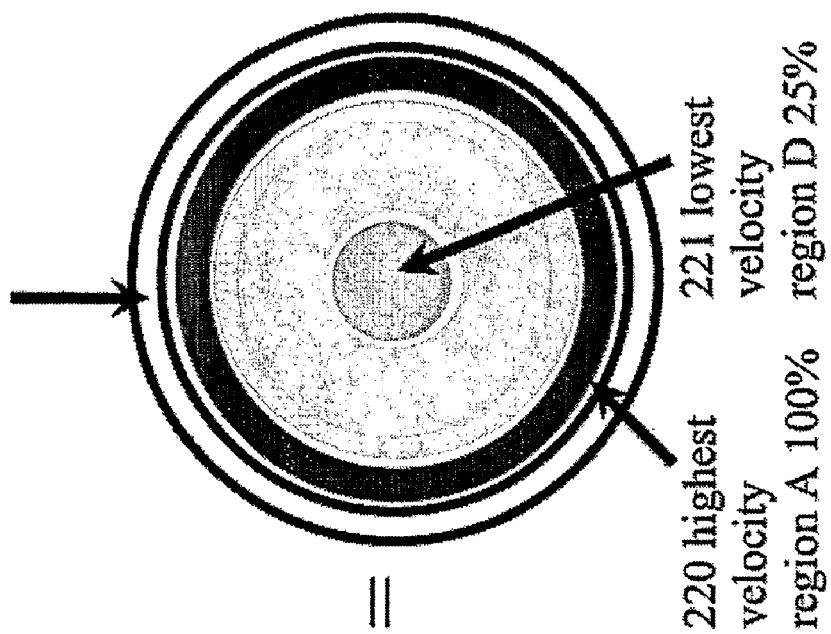
Figure 56 Addition of Flow Velocities

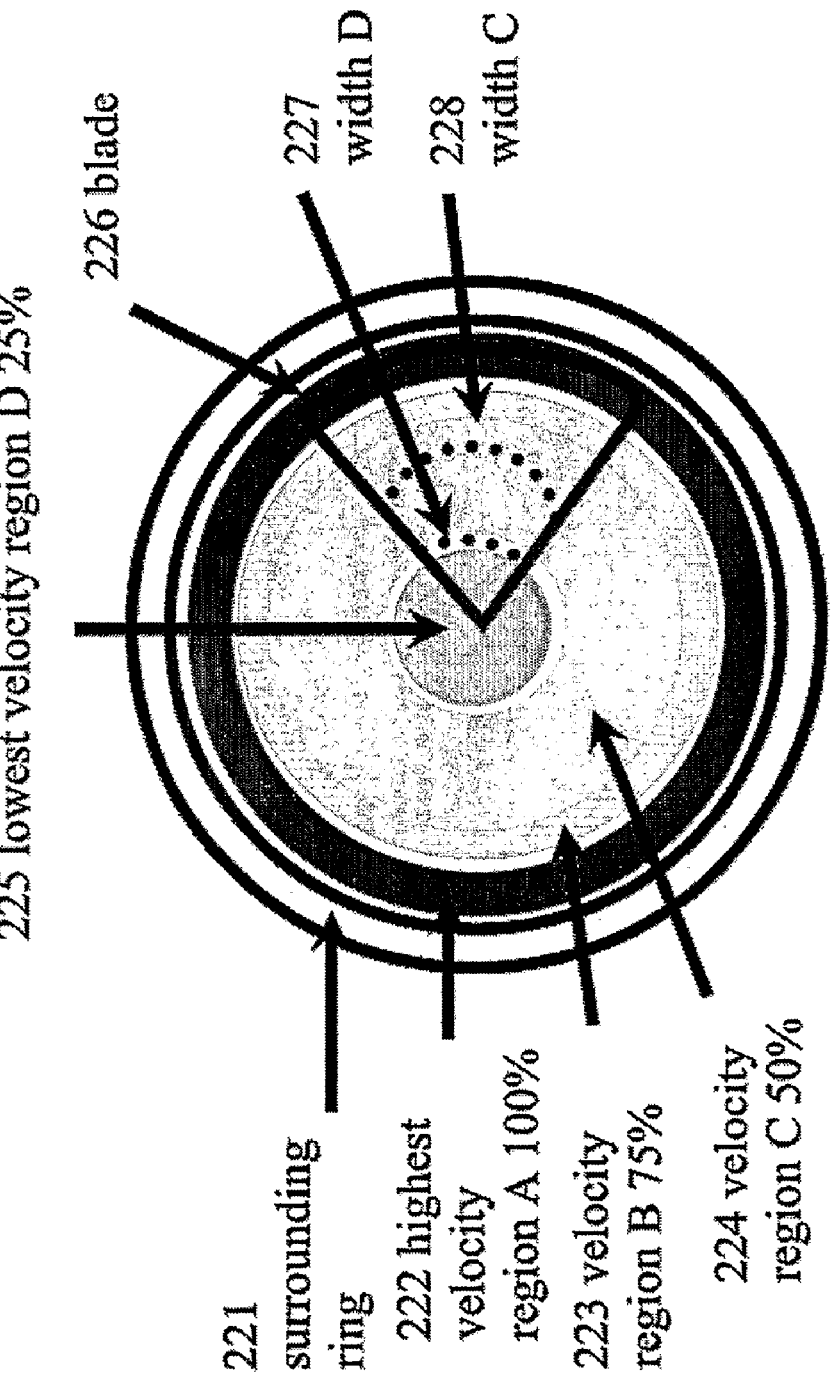
Figure 57 Surrounding Ring Velocity Mapping

Figure 58
Outline 4448 surrounding ring
Axial Velocity Gain by Radial Position
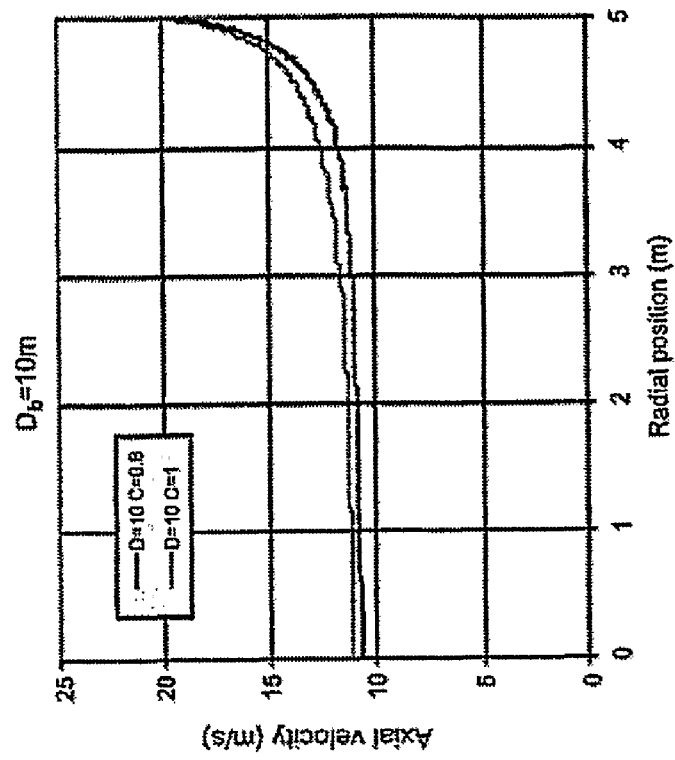
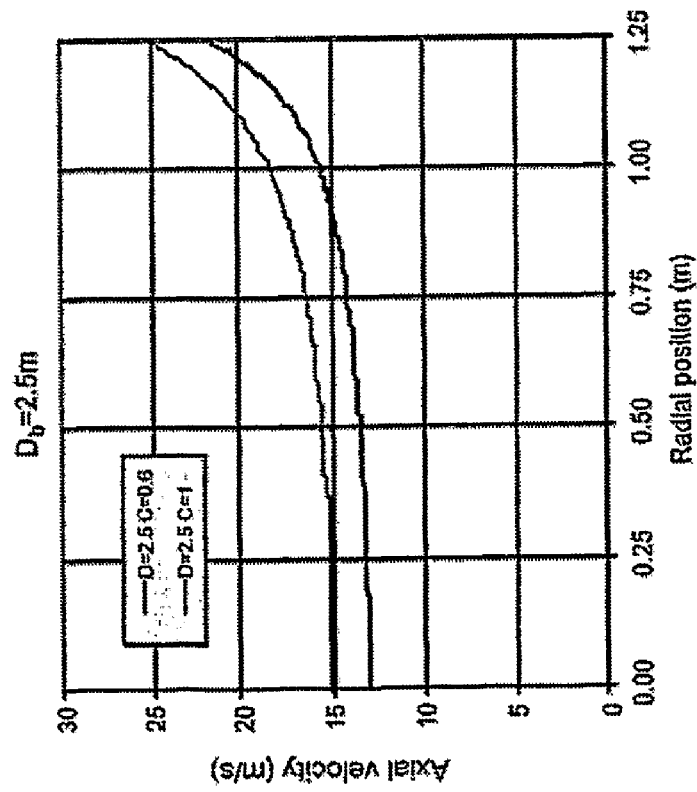

*Figure 59*
Outline Farb Foil
Axial Velocity Gain by Radial Distribution
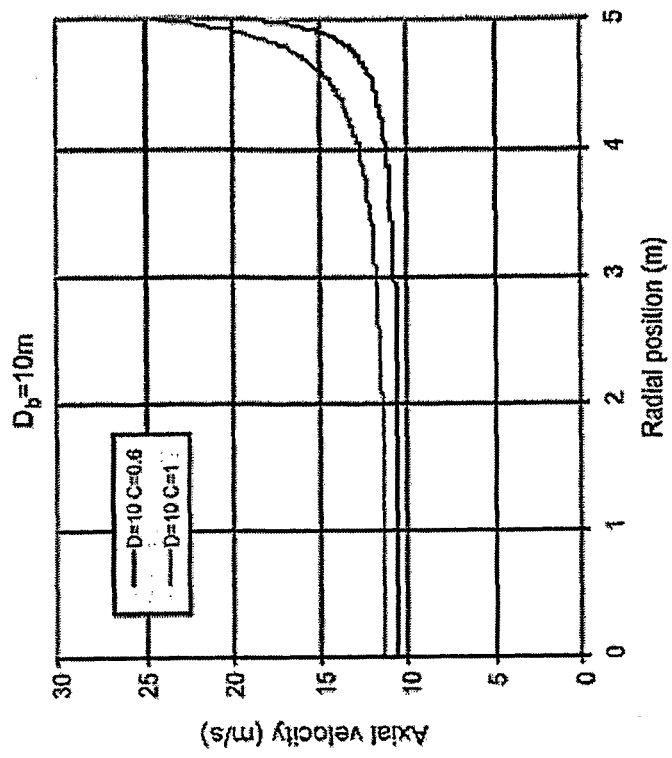
232
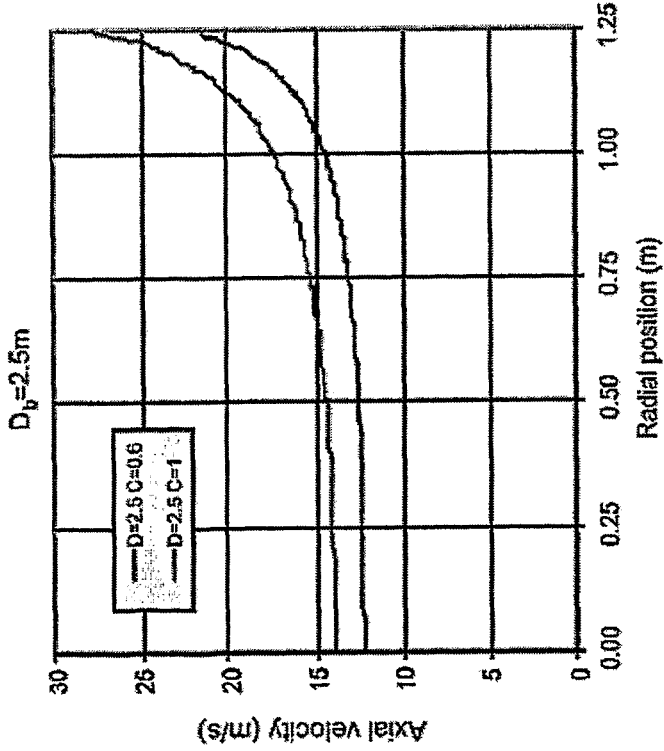
231

Surrounding Rings
Power Gain by Axial Position

Figure 62 FDDs and Vertical Axis Turbines

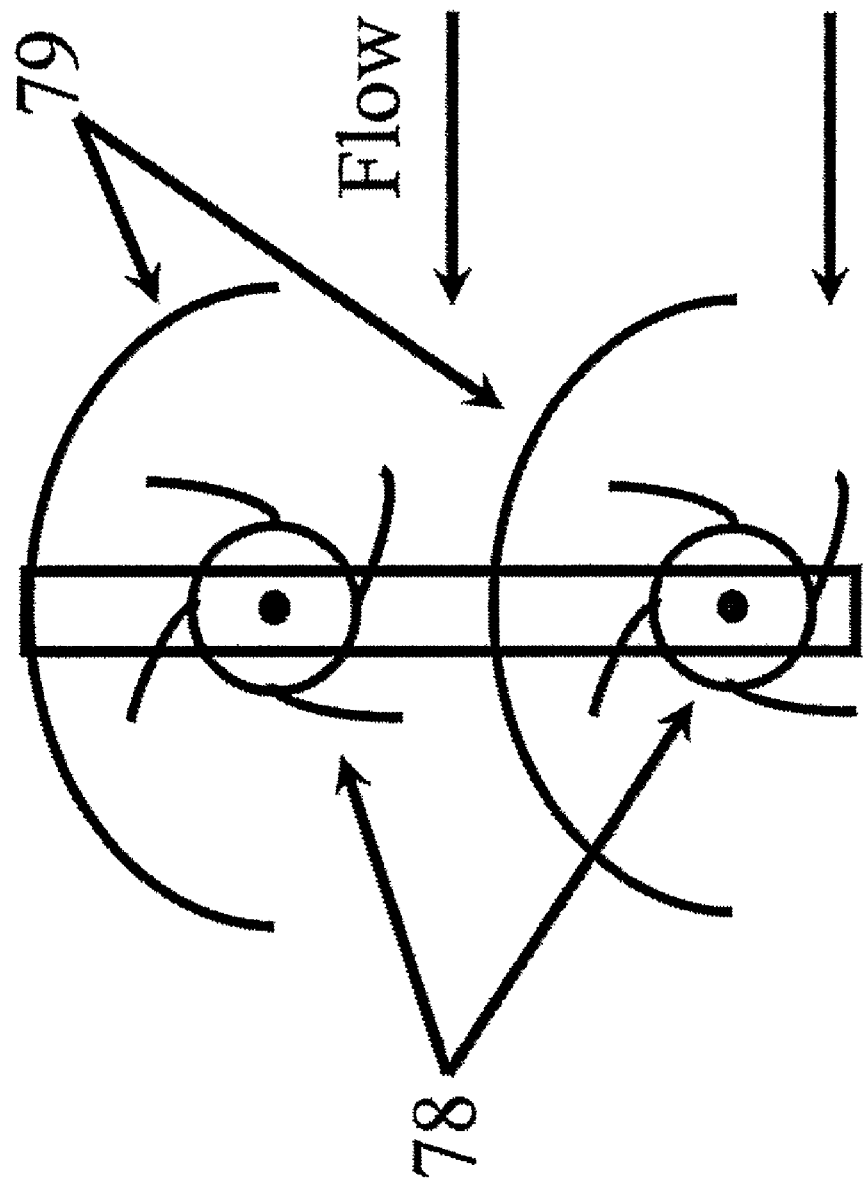

Figure 74 Bernoulli's Principle $$\frac{v^2}{2} + gh + \frac{p}{\rho} = \text{constant}$$

v = fluid velocity along the streamline
g = acceleration due to gravity on Earth
h = height from an arbitrary point in the direction of gravity
p = pressure along the streamline
ρ = fluid density In an ideal fluid, with no work being performed on the fluid, an increase in velocity occurs simultaneously with decrease in pressure or gravitational energy.

Figure 75 Navier Stokes Equation $$\rho \frac{D\mathbf{v}}{Dt} = \nabla \cdot \mathbb{P} + \rho \mathbf{f}$$

ρ is the fluid density,
v is the velocity vector,
and f is the body force vector.
The tensor represents the surface
forces applied on a fluid particle Navier-Stokes equations are a dynamical
statement of the balance of forces acting
at any given region of the fluid.

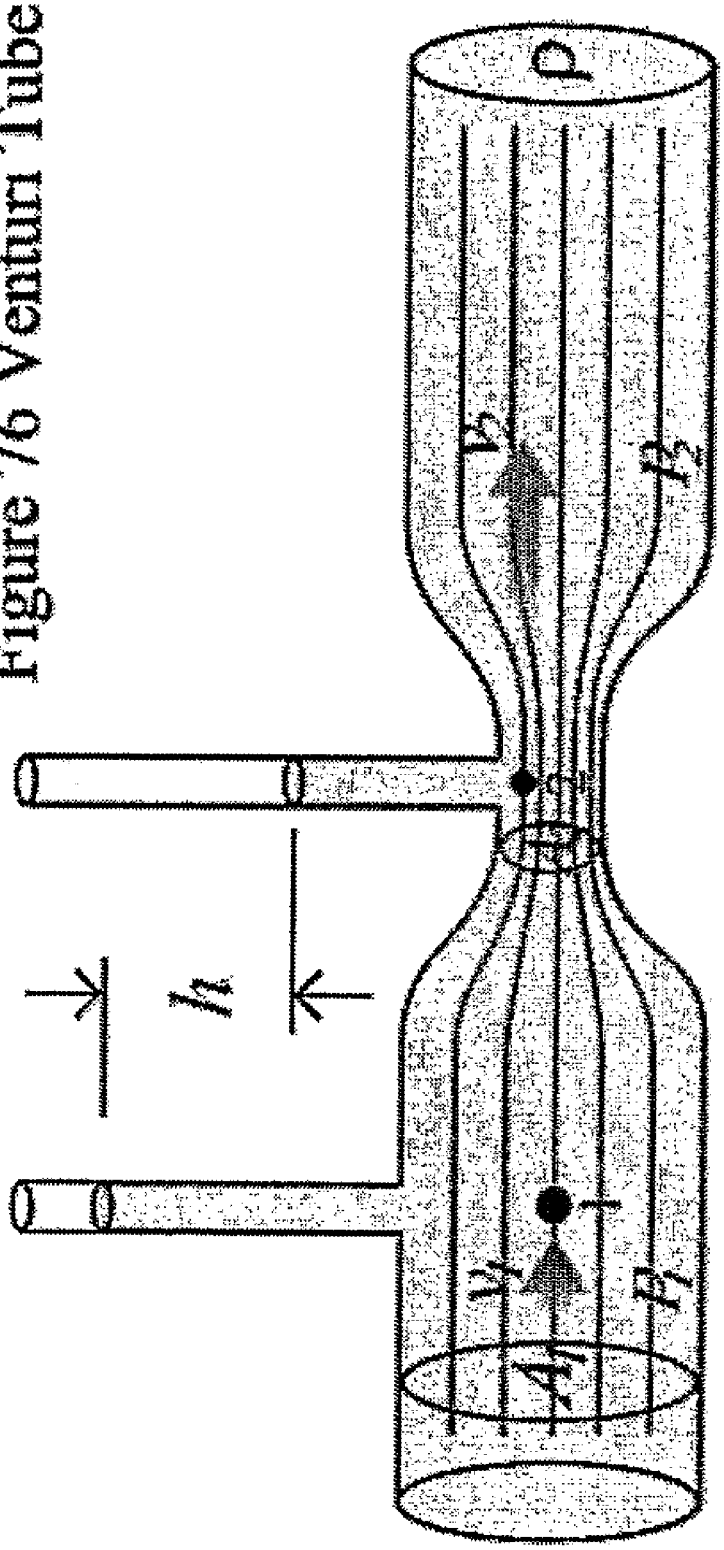
Figure 76 Venturi Tube
From Wikipedia

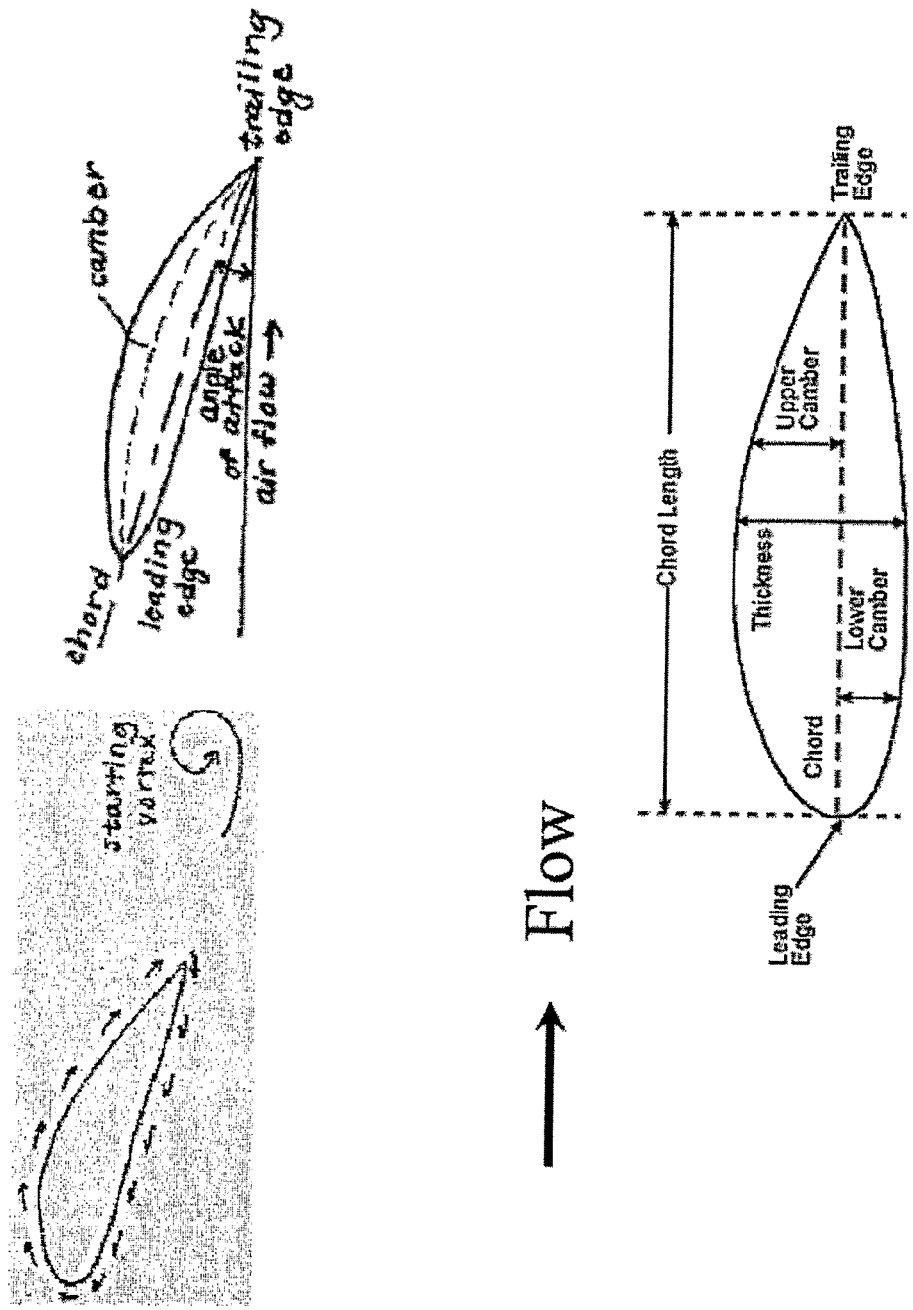
Figure 77 Airfoil Pictures
First 2 illustrations from http://web.mit.edu/2.972/www/reports/airfoil/airfoil.html

FLOW DEFLECTION DEVICES AND METHOD FOR ENERGY CAPTURE MACHINES

RELATED APPLICATIONS

This patent application is a U.S. National Phase Application of PCT/IL2007/000348 filed on Mar. 18, 2007, and also claims the benefit under 119(e) of U.S. Provisional Patent Application No. 60/807,828 filed Jul. 20, 2006, U.S. Provisional Patent Application No. 60/826,927 filed Sep. 26, 2006, U.S. Provisional Patent Application No. 60/864,792 filed Nov. 8, 2006, the contents of which are incorporated herein by reference.

FIELD AND BACKGROUND OF THE INVENTION

The present invention relates to devices and methods for improving the performance of energy capture machines. This patent is based largely on provisional patents by the same author noted above.

Definitions and Abbreviations

Flow Deflection Device (FDD) is any object that affects the flow, and is used here to indicate the flow into an energy capture machine. Since many of the models shown later in this discussion involve wind, the term Wind Deflection Device (WDD) may also be used for the specific case of wind flow. The same principles apply to both terms. Terms for different fluids such as air, wind, water, liquid, gas, etc. are all interchangeable in terms of the fluid dynamics to a large extent and are considered interchangeable in this patent. Even though the word "fluid" is often associated with water, it is used technically to refer to liquids and gases.

The terms "functionally adjacent," "functionally contiguous," etc., indicate that a structure has a positive, measurable, functional effect on the flow into the target object or turbine. An FDD has to have such an effect to be called an FDD.

An FDD is easy to conceptualize in its ideal form as a ring-shaped structure, but the whole ring is not always necessary or desirable. An interrupted FDD means that the FDD of whatever shape, such as a ring, has areas of discontinuity—for example, to enable release of high-pressure air in hurricanes. An incomplete FDD means that the structure may not make a complete shape or ring—for example, if the turbine only points in one direction, there is no need for certain kinds of FDD to encircle the turbine—or may have a design pattern that is incomplete, for example, partially hollowed out. We have been unable to find in prior art any examples of interrupted or incomplete FDDs.

By "ring" or "partial ring", we indicate usually a circular portion or all of a circular arrangement around a center but also include structures with straight parts or edges. For example, a square surrounding a wind tower can be referred to as a "ring" in his application, even if it only partly "surrounds" the tower. In some cases, we will use the term "non-ring" to emphasize the point that a partial surrounding can occur with many non-circular objects, because, with turns at the edges, it could form a ring—a surrounding structure.

An "outline shape" or "outline foil" means that the shape functions to improve fluid flow based on its surface, as if it had minimal thickness, and the thickness is only present to hold its shape in place. It is by definition hollowed out. We have found no examples of outline foils in prior art.

It is important to emphasize that the current invention of an FDD is NOT a Venturi tube (see FIG. 76). A Venturi tube has an opening, constriction, and an opening at the end. The edges and the rest of the structure are of little interest in the case of a Venturi tube. Some prior art patents that make use of "shrouds" to surround a wind turbine are really Venturi tubes, or big collectors and diffusers. The current invention differs from them in any of several ways, the most common being that the shape of the leading edges are important in the current invention but not in a Venturi tube, that the size of the Venturi tube is usually large in the direction of flow, often larger than the turbine, and highly dependent on the amount of flow directly captured whereas that of an FDD can be much smaller and the shape can direct flow beyond its size, and that the effects of the current invention are based on flow circulation and principles of physics such as the Navier Stokes equation other than just the use of Bernouli's principle in the Venturi tube. Shrouds are well known in the aircraft industry, where they surround the blades and the engine. Since the current invention is definitely an advance on the idea of surrounding both structures completely, we use the word "shroud" to refer to prior art enclosing structures that are usually large, have sharp leading edges, and that have an obvious collector and/or diffuser, whereas the current invention uses the term "surrounding ring" to indicate an at least partial surround of an energy capture machine with an aerodynamic shape that is not a mere Venturi tube. All uses of FDD or WDD in this invention exclude a Venturi tube.

The term "x-axis" is used primarily to set an orientation, so that it is not necessarily parallel to the plane of the earth. The y and z axes are perpendicular to the x axis, and, by convention, the y axis is vertical, but here it can refer to an orientation perpendicular to the x axis.

We will refer to different sizes of wind turbines. There are two general types of wind turbine markets: large and small wind. Large wind refers to utility size turbines with blade diameters of roughly 30-100 meters, and small wind to turbines that may be for private and sometimes a smaller scale utility use, of roughly 2-10 meters. Medium size turbines are roughly 10-30 meters. The distinctions are useful later in explaining the inventions that are practically appropriate for different size turbines.

One problem of current art wind turbines is the failure to operate at low speeds. The current invention provides devices and methods for addressing this problem, and at the same time improves the capture of energy at higher speeds.

There is a widely recognized need for, and it would be highly advantageous to have, a more efficient and cheaper method of obtaining energy from wind and other fluid flows.

Similarly, machines that obtain energy from fluid flows also operate minimally at low speeds and only capture a part of the energy in the fluid.

We define the "energy capture component" of an energy capture machine as the part that receives the energy, such as the blades of a turbine. This would clearly exclude the housing and generator. It is also meant here to exclude, for example, a rod that holds the blades but moves with it, because the rod is not the part that receives the energy.

We need to provide some background on fluid dynamics, since we will discuss airfoils and airfoil-like objects.

A "chord" is the straight line extending from the leading edge to trailing edge of the wing. The "angle of attack" is the angle between direction of flow and the chord. The fluid flow first hits the "leading edge" of a wing and last contacts the "tailing edge." Airfoils, used equivalently here with the terms "foil" and "wing," reduce pressure and increase speed in the area where the wing is "cambered" (thicker above or below the chord) or inclined towards the airflow. In the usual example of an airplane wing, the reduced pressure and increased speed is superior to the wing. Some of these shapes are illustrated in FIG. 77.

We use here an "airfoil" or "airfoil shape" as including any of the following subsets: interrupted airfoil shape, partial airfoil shape, outline airfoil shape, hollow airfoil shape, incomplete airfoil shape. In some cases a circulation FDD is also included.

The Coanda effect is the tendency of fluid to adhere to curved surfaces as it flows past. The current invention uses this principle to direct fluid flow in association with FDDs and turbines.

Generally, the trailing edge of an airfoil is where vortices occur as the interrupted fluid streams meet. This is bad for energy capture machines, since at these points the velocity of flow can be negative. Part of the aim of FDDs is to reduce these vortices in the area of the blades or other energy capture mechanisms and to direct the positive velocity to a precise position. This precise positioning for various types of FDD is an innovative feature of the current invention.

Increasing the angle of attack results in flow separation as the fluid particles no longer follow the contour of the wing. So in general a large angle of attack results in release of the fluid particles from closeness to the wing. This may be bad for airplanes at high angles of attack, but one of the innovative points of the current invention is that it can be very good for large energy capture machines. Manipulation of the angle of attack and distance from the energy capture object, such as the blades, can make a large difference in the energy captured at specific points.

"Blades" are sometimes used interchangeably with "energy capture component" although blades are really a subset of energy capture components of energy capture machines. Another example of an energy capture component would be a paddle wheel.

A conical shape is considered a subset of a concave shape for the purposes of this invention.

Types of flow can be laminar or turbulent at the boundary layer adjacent to a wing. Laminar flow results in slowing of the fluid molecules by creating a drag on particles above them. In turbulent flow, fluid molecules close to the wing move faster because they mix with faster flowing fluid above. One of the innovations of the current invention is the enforcement of fluid flow for surrounding rings.

It has been recognized that there are two components of the behavior of air near a wing, an obstacle effect (based mostly on forcing air to take a different path as explained by the Bernoulli principle—FIG. 74) and a circulation effect (of increasing the velocity of the air above a wing due to the pressure differences induced by the wing shape and by the behavior of the air particles, as explained by both the Bernoulli principle, the Kutta principle, and the Navier Stokes equation—FIG. 75). His discussion is simplifying a number of aerodynamic principles for the sake of making a point.) These are relevant to us since the current invention is the first to clearly apply the distinction between the two in energy capture machines. The obstacle effect is mostly dependent on the size of the obstacle; the circulation effect is mostly dependent on the shape presented to the oncoming fluid. Both occur in any FDD. We use the terms "inner FDD" to refer to a turbine's smaller FDD that applies mostly a circulation effect to the blades or other energy capture component, and "outer FDD" to refer to a larger, more obstacle-type structure, when the FDDs have a central y axis in relation to an x-axis direction of flow. The terms "inner" and "outer" may be used even if only one is present. Both types may be referred to as the "large doughnut" and "small doughnut" as they will generally be ring-shaped, but they may also be a partial ring. In summary, we refer to outer FDD=outer doughnut=obstacle or obstruction FDD and inner FDD=inner doughnut=circulation FDD=inner foil-like shape as groups of synonymous concepts.

No application of the effect of airfoils and other FDDs has been made for large wind turbines.

Some work has been done on the use of structures near small wind turbines, and we will distinguish what has been patented before as basically Venturi tubes from the current invention. Such previous patents basically involve the use of a collector on the way in and/or a diffuser on the way out. That can be seen in FIGS. 63-69. It is well known that narrowing a flow of fluid results in higher velocity. That is NOT the current invention, although that concept has some application here.

Patents FR2857063 and WO2004099607, basically the same patent, as shown in FIG. 667, are the closest to the current invention's use of FDDs near small wind turbines. There are a number of crucial points of difference: (1) Their patents state that the blades should be in the center of the shroud. Our data show that to be rarely true. The center or middle is rarely the best location, but that is what they claim. (2) Structure 13 in their diagrams shows interior support structures that attach to a hub in front of the blades. The current invention, by contrast, works also with turbines that have the blades in front of the hub. It is a disadvantage to make the support structures large and place the support structures interiorly and in front of the blades because they interfere with the motion of the wind. (3) In addition, the current invention does not require support structures that separate the shroud from the blades. (4) Their patents show their wing covering half the body of the turbine's generator. The current invention avoids that; at that extent, their wing is simply functioning as a Venturi tube. In fact, they state explicitly that they wish to create a Venturi effect. (5) Their patents are self-contradictory. They place the blades far in from the leading edge, but state that they should be placed upstream of the hydrodynamic forces. "The turbine is mounted on a rotational axis that is located upstream of centre of resulting aerodynamic forces generated on the shroud, by axial wind, in the direction of the wind." The description of location is additionally vague. "Centre of forces" is indefinable. In addition, we do not care about forces on the shroud, but on the turbine. (6) They describe only a complete helix. The current invention also allows for interrupted and incomplete structures, particularly to deal with high winds. (7) WO 2004099607 refers to a their invention as a "diffusing circular shroud" in which the object is to increase velocity by diffusing the wind—the other side of a collecting tube. It is not flow deflection.

Our data show clearly that upstream of the "hydrodynamic forces" is not a good location. The location at x=−0.4 meters in the table below is proportionately not helpful. Here, 0.00 is the leading edge. This data shows percentage variations in power output in 10 meter per second wind with different blade diameters Din with a NACA 4448 airfoil of 0.6 meters chord length at different angles of attack, so the ideal position, which varies at different angles of attack, is between 0.25 to 0.45 of the chord length—not upstream, and not the center. For the parameters shown, at an angle of attack of 30 degrees, which is approximately the most effective, the optimal ratio of the blade location to the chord length is 0.25. As we will see later, the optimal location depends on the shape.

| X (m) | $D_{in}$ (m) | | |
|---|---|---|---|
| | 10 = –0° | 2.5 = –30° | 2.5 = –40° |
| –0.40 | 5 | 40 | 34 |
| 0.00 | 14 | 147 | 141 |
| 0.05 | 18 | 186 | 180 |
| 0.15 | 26 | 255 | 226 |
| 0.25 | 28 | 215 | 184 |
| 0.35 | 22 | 161 | 149 |
| 0.40 | 19 | 142 | 138 |
| 0.45 | 17 | 125 | 128 |
| 0.50 | 15 | 110 | 119 |
| 0.55 | 13 | 95 | 110 |
| 0.60 | 12 | 81 | 101 |
| 0.65 | 11 | 68 | 92 |
| 0.75 | 9 | 46 | 74 |

An article by H. Grassman et. al. in 2003 described the use of a shroud with blades. The blade diameter was 0.56 meters and the shroud was 1.1 meters in length. The shroud collects and narrows with no attention paid to velocity as a function of blade location, but rather to the velocity as if it were simply speeded up from a Venturi tube. In another article they state the model of a shroud being located 1.3 times the radius of the propeller from the axis of the propeller and elsewhere say that a large spacing between the shroud and the blades is mandatory. This proves that they are working simply with a Bernoulli-type Venturi effect or at least a different invention, because our inventions increase the flow disproportionately at close range to the FDD (as shown in FIGS. 58, 59, 60, and 61), rather than a global increase in velocity, which is typical of a Venturi tube. When they do talk about apposing a wing to the turbine, they talk about only one bended side in the wing, and that one facing the turbine—in other words, a Venturi tube with a solid depth. Our FDD foil shapes use both upper (inner) and lower (outer) cambers to be fully effective at circulating the air. Another issue is that the blades they use are all small, less than 2 meters in diameter. The size of their structure is impractical for most uses. They have no way of dealing with the extremely high velocity created in high winds. They say that their work is an outgrowth of a patent by Grumman. We suppose that is U.S. Pat. No. 4,075,500, which is definitely a Venturi tube type of shroud, as discussed already.

Other prior art comes from the inventor's prior patent applications. PCT IL07/000003 entitled "Conversion of Ocean Wave Energy into Electrical Power" (FIGS. 70-73) contains inventions regarding the use of FDDs with turbines on the surface of ocean waves, FDDs affecting wave characteristics, FDDs adjacent to paddle wheels, and broad claims related to FDDs.

That patent describes the use of a local wave FDD to accelerate the speed of the wave into the surface paddle wheel and a set of two basically horizontal ramp-like FDDs for each vertical structure that are joined to form a leading edge facing the oncoming wave that slopes upwards till a point that does not allow the waves to break on them. In the context of an energy farm, they form basically an obstruction-type structure that speeds up the wave on a global basis, in addition to its effect on the height of the wave above the water surface. These two structures are also described as being useful with other energy capture methods in the water. The local FDD is generally of a fixed location in respect to the energy capture component whereas the ramp FDD is generally intended to adjust position according to wave conditions. The local FDD is intended to be wing-like or airfoil-like and be located inferior to, functionally contiguous to, and parallel to the axis of the paddle wheels.

The two types of devices are also applied to underwater wave capture. The ramp FDD is also applied to buoy energy capture devices.

The ramp is advantageous in two ways: It adds kinetic energy to the area of the surface paddle wheels by an obstructive effect to water flow, and it enables the better capture of existing kinetic energy by revealing the true height of the wave.

Neither wave FDD is ring shaped. The ramp FDD may be attached to a support structure or a separate support structure. The local FDD may be attached to the surface generation apparatus or to a separate one.

The PCT also describes a stack of underwater paddle wheels with hoods that deflect the flow to the one above. The PCT does not describe a number of innovations described in the current invention, such as outline shapes, angles of attack, methods of calculation, use with blades, and many others.

BRIEF DESCRIPTION OF THE DRAWINGS

The invention is herein described, by way of example only, with reference to the accompanying drawings, wherein:

FIG. 23 is a computer model of the effect of inner doughnut shape on wind velocity.
FIG. 24 is a 3D picture of the inner and outer doughnuts.
FIG. 25 is an illustration of the inner FDD not attached to the tower.

FIG. 26 is an illustration of the inner FDD attached to the tower.

FIG. 27 is an illustration of the inner FDD attached both to the tower and to a surrounding structure, whether the outer FDD or the ground.

FIG. 28 is a computer model of the effect of a sphere on wind velocity.

FIG. 29 is a velocity graph comparing a foil and a sphere.

FIG. 30 is a computer model of the effect of a quarter sphere shape on wind velocity.

FIG. 31 illustrates two cases of outline FDDs.

FIG. 32 is a computer model of the effect of an outline thick half-foil shape on wind velocity.

FIG. 33 is a large FDD structure outline.

FIG. 34 is a superior view of a wind tower and FDDs.

FIG. 35 shows the effect of partially blocking a wind turbine.

FIG. 36 is an FDD whose superior view is basically rectangular.

FIG. 37 shows the parts of a small wind FDD.

FIG. 38 shows a construction of release sites.

FIG. 39 shows the construction of a surrounding ring around a small wind turbine.

FIG. 40 shows a central FDD on a small wind turbine.

FIG. 41 is a double propeller design.

FIG. 42 is a picture of the geometry of a tilted airfoil in a surrounding ring.

FIG. 43 is a flow diagram of laminar and turbulent flow.

FIG. 44 is a diagram of one method of enforcing turbulent flow.

FIG. 45 is a picture of two outline foil models.

FIG. 46 is a picture of some Farb Foil variants.

FIG. 47 is a picture of two flow diagrams of outline foils.

FIG. 48 is a flow diagram of a Farb Foil.

FIG. 49 is a diagram of turbine blades adapted to the present invention.

FIG. 50 is a diagram of turbine blades with adaptations to a surrounding ring at the end.

FIG. 51 is a model of a small wind turbine tower assembly.

FIG. 52 is a diagram of a wind tower attached to a hydraulic pump.

FIG. 53 is a picture of a retractable wind tower.

FIG. 54 is a 3D model of an inner FDD cascade.

FIG. 55 is a computer model of the effect of a closely clustered inner FDD cascade on wind velocity.

FIG. 56 shows the concept of adding flow velocities to make a flow map,

FIG. 57 is a picture of the relationship of flow velocities to blade shape.

FIG. 58 is a radial velocity distribution for a 4448 foil outline.

FIG. 59 is a radial velocity distribution for a Farb foil.

FIG. 73 is a picture of prior art.
FIG. 74 shows Bernouli's principle.
FIG. 75 shows the Navier Stokes equation.
FIG. 76 shows a Venturi tube.
FIG. 77 shows pictures of airfoils.

DESCRIPTION OF THE DRAWINGS

The present invention is of a series of devices and methods that affect flow into an energy capture machine of any type.

The present invention successfully addresses the shortcomings of presently known wind and other turbine configurations by adding a FDD structure, with either an x axis or y axis, depending on the size of the turbine and the desired effect, functionally adjacent to the turbine blades. A wing-like structure causes the Bernoulli principle to take effect by increasing the velocity of airflows superior to the upper camber of a wing. This greater velocity increases the effective fluid speed to the turbine. This and other uses of shapes cause Navier Stokes equations and Coanda effects to take place in the circulation of the fluid particles.

Most of the illustrations of concepts here use the propeller blade wind turbine as a model, because it is the most common type of renewable energy turbine, but the concepts shown here apply to other turbines, other types of wind turbines, and other media of flow aside from wind. An illustration of one does not exclude another.

Figure 1:
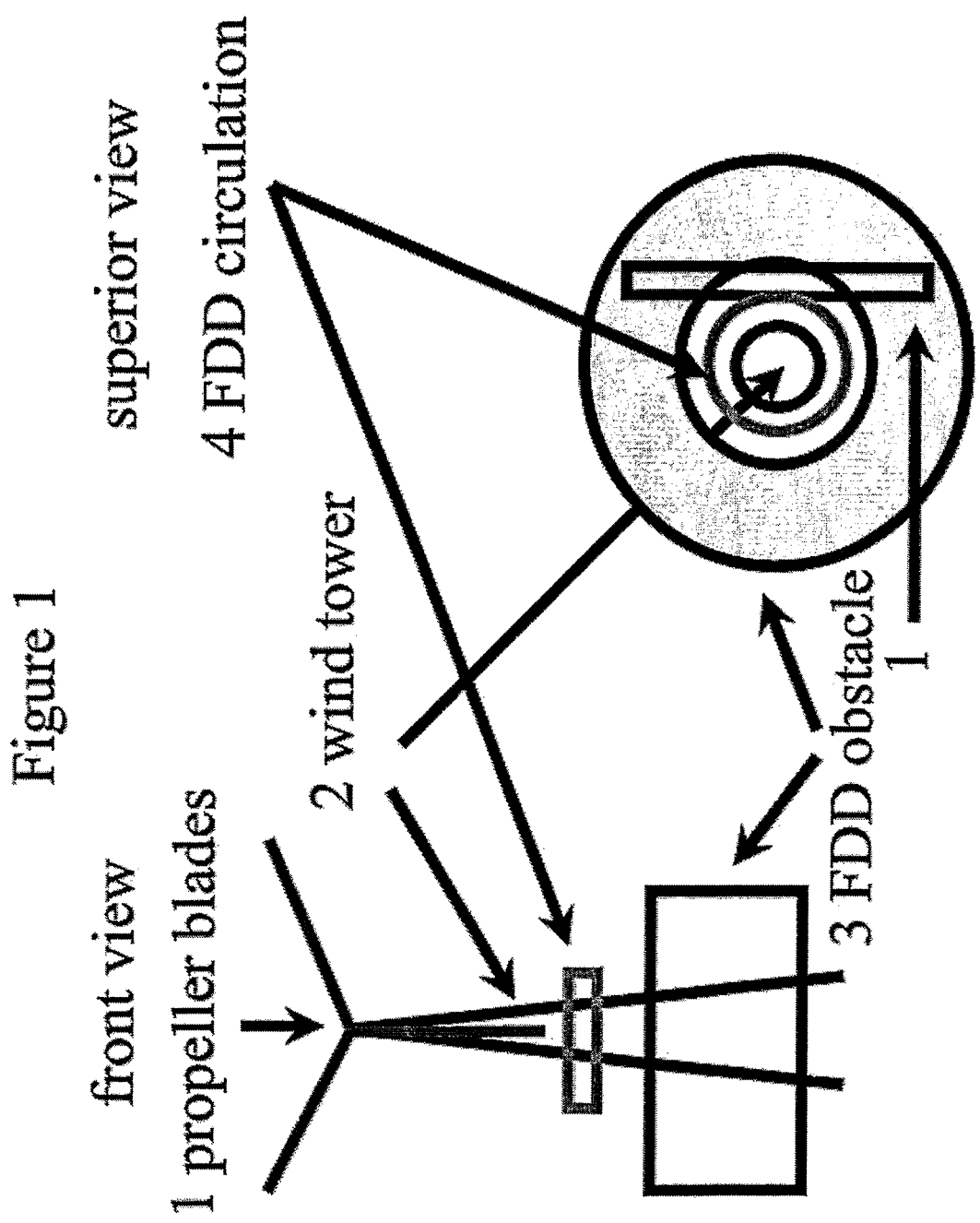
FIG. 1 is a large wind tower with two rings.

FIG. 1 illustrates the concept of altering the flow into the blades (1) of a large wind turbine by using an FDD structure (3) that does not surround the blades. Another way of defining it is that the FDD has a y axis orientation where the fluid flow is in an x axis. The FDD surrounds the wind tower (2), or in other embodiments, the supporting structure of an energy capture machine. It can also be defined as having a central axis that is perpendicular to the direction of flow, or that the diameter of the structure is parallel to the surface of the earth. The reason for this concept is practicality. Large turbines are often 80 meters in diameter and rotate on the axis of the wind tower. It would be difficult to build and coordinate an 80-meter diameter surrounding ring for such a large moving structure although doing so is included in the current patent because it can be done. It would be also possible, and this is part of the current invention, to build a moving FDD around the tower to coordinate with blade orientation. The front view in the figure shows an FDD inferior to the blades of a turbine by being positioned inferior to, in functional contiguity to, and outside the perimeter of, the blades on a wind turbine. (The term "inferior to" is used to orient the reader, but any structure at a right angle to the plane of the blades in any side or superior orientation is included in the invention. In addition, as will be seen, they can be inferior to the center of the blades, but actually blocking part of them.) The location outside the perimeter is obviously necessary, depending on the distance from the FDD to the tower, in a rotating turbine to prevent collision of the FDD and the blades. A non-moving turbine will be discussed later and, clearly, will not require a ring around the turbine center, but a partial ring or other structure with an axis not perpendicular to the direction of flow may be possible.

In other embodiments, the flow substance can be any fluid other than wind.

In other embodiments, the FDD may be on any side of the blades; this is simply the most practical because it easily fits on the central wind tower. But the FDD need not necessarily be connected to the tower. It could be on a separate structure in another embodiment. Additionally, the FDD, in another embodiment, can be less than a 360-degree doughnut. That less than 360-degree doughnut can also rotate towards the wind around the wind tower or energy capture machine if the wind turbine rotates towards the wind. The figure here shows the ideal. In addition, a turbine owner may decide that it is economically practical to erect the FDD only on one side, where the fluid flow consistently comes from. That FDD is also included in the current invention.

In various embodiments, the wind tower shape can vary, and the attachment means of the FDD structure would vary accordingly. The method of adjusting the shape of the FDD to create functional contiguity to the turbine blades and/or to avoid contacting the turbine's moving parts is part of the current invention.

The FDD may be wing-shaped. A wing-shaped structure is defined as a structure with an upper camber, and the upper camber is placed facing the perimeter of the plane of the operation of the blades.

The FDD as shown may be either very large and create primarily an obstacle or obstruction effect or small and create primarily a local circulation effect. The apposition of either one alone to the energy capture component is an innovation of the current invention, and so is the use of at least two with the same energy capture machine. If there are two of the same type, we will refer to them as a cascade. If there are two of different types, as will be discussed, that act primarily on the principle of obstructing fluid flow or on the principle of locally circulating fluid flow, we will refer to the generally larger type as an obstacle or outer doughnut, and the generally smaller as a circulation or inner doughnut. The current invention discloses the use of either the obstacle or circulation doughnut individually with the energy capture machine, or the use of at least one of two types together, or the use of at least two, out of one of the two types, together. In general, the obstacle doughnut will be distinguished by a large internal volume, real or projected. In general, the obstacle FDD fractions best if it presents a convex surface to the fluid flow and the circulation FDD functions best if it presents an airfoil or airfoil-like surface to the fluid flow.

The FDD of less than 360 degrees may, in one embodiment, synchronize with the direction of the wind and the position of the blades using a wind direction sensor and control mechanism. That wind sensor may be the same one that the wind turbine uses. The devices and methods of synchronizing the wing to the wind turbine are part of the current invention.

FIG. 24 is a 3D view of FIG. 1 with similarly numbered parts.

Figure 2:
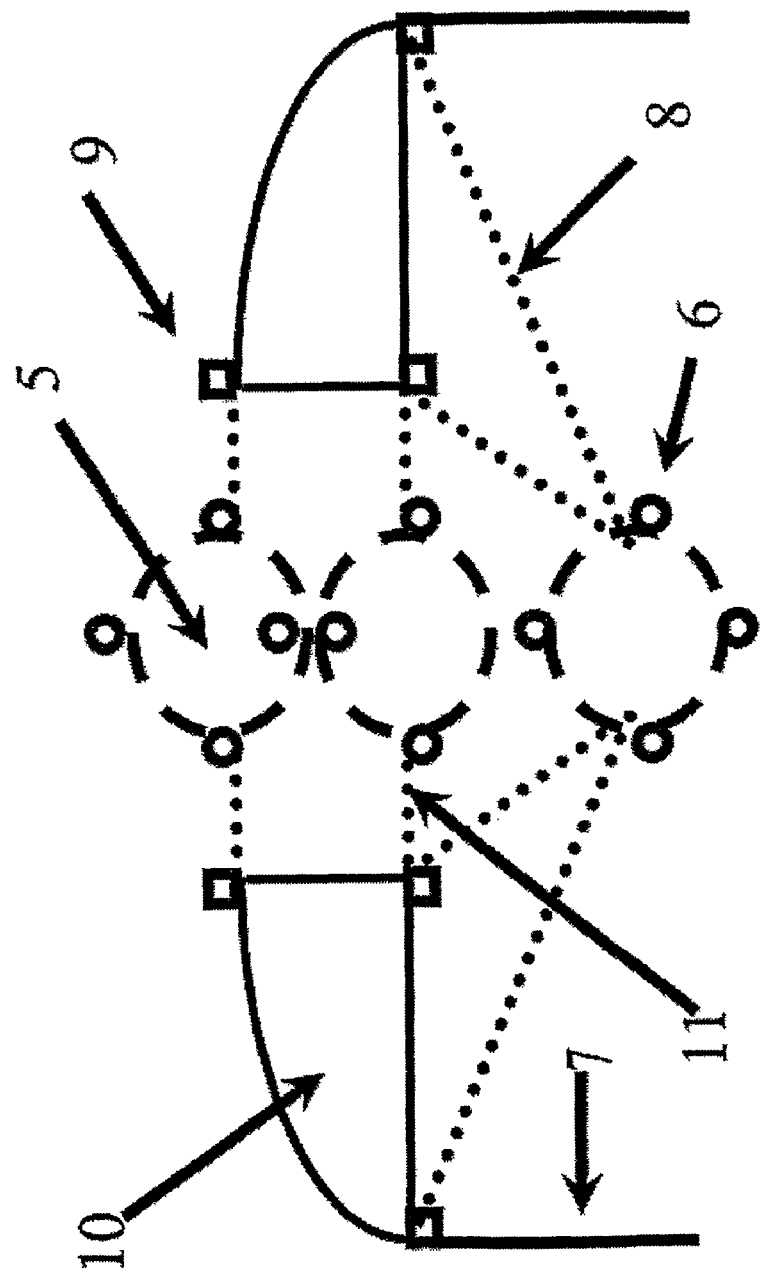
FIG. 2 is a ringed structure surrounding a wind tower.

The bottom section of FIG. 1 is illustrated in more detail in FIG. 2. FIG. 2, which shows ways of constructing an FDD around a wind turbine, would ideally be constructed in a modular manner; the figure shows the essential elements. The interior to the dashed lines, Part (5), represents the central wind tower, shown here as circular. The dashed lines represent means to attach the wind tower to the FDD, part (10). Such means could include bolts, bands, girders, screws, and so on. In this embodiment, a convex half-wing (10) fully encircles the wind tower. In effect, this is a full wing with a gap in the center—useful for accessing the outside of the wind tower. In other embodiments a "full wing"—defined as a wing whose leading and trailing edges are not separated in the center—is provided. Parts (8), in dotted lines, represent attachment means from the wings to the tower directly or to the rings encircling and tightened around the tower. Parts (11) in dotted lines represent the attachment means at different levels. Other embodiments can use different attachment means and can be customized using the principle of taking an FDD and placing it functionally contiguous to the blades. At least one level of attachment means is required. It is recommended that at least three different horizontal levels of attachment be used, if the FDD is attached only to the tower, in order to prevent the FDD from moving up and down. Part (7) represents the means of connecting the FDD to the ground. Part (9) shows attachment means on the FDD to the supporting structure.

The ideal embodiment of the FDD shown here is lightweight, hollow, and plastic or metal. In some embodiments, the FDD may be solid. In some embodiments, the FDD may have a rigid frame connected by tense material such as nylon or Kevlar. In the current invention, any flexible material, even thick metal foil, is included in the term "tense material." In some embodiments, the inner vertical support of the wing is not crucial and the wing would not have any totally enclosed areas.

Parts (9) and (6) illustrate attachment means of the wing in one set of embodiments. Parts (9), the small squares, represent attachment points that are part of the FDD. A supporting means can be attached there. Said supporting means could be of any appropriate material, such as rope, nylon, plastic, or metal, and can be tightened, snapped, or fixedly attached. Parts (6), the small circles, represent attachment points to the wind tower directly or indirectly through an encircling band in one embodiment. Said band, in one embodiment would have multiple sites for placement of bolts or screws to attach it to the wind (or other) tower.

In one embodiments parts (9) and (11) and similar attachment means need have minimal if any extension from the wind tower. It is the ideal embodiment to have a space because it is lighter and enables easier access to the wind tower.

The extent of the FDD should ideally be such that the majority of the path of the blades or energy capture component is superior to the upper level of the FDD.

Figure 3:
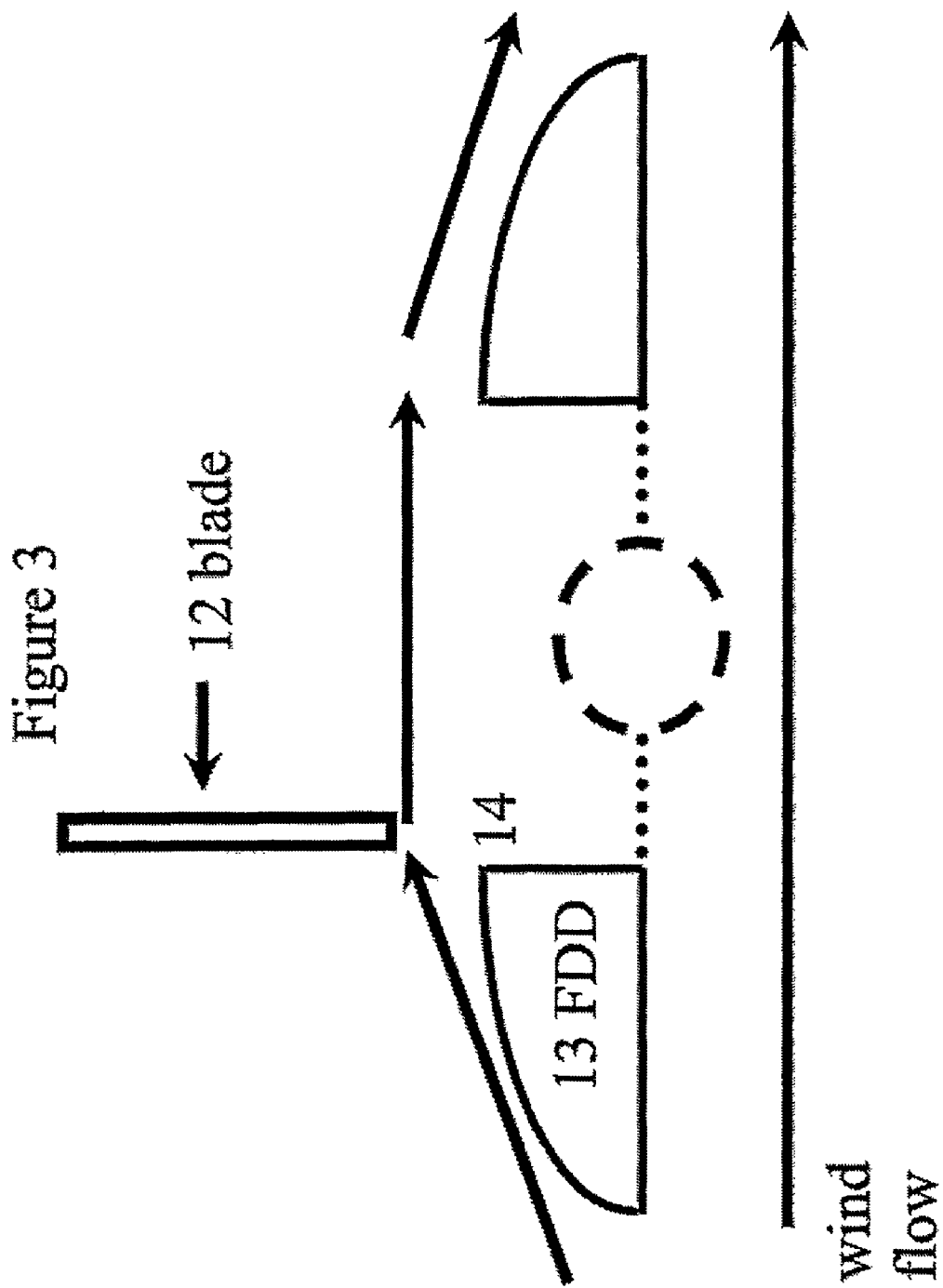
FIG. 3 is an illustration of the Bernoulli principle on an FDD on a wind tower.

FIG. 3 illustrates how the current invention, in one of its many embodiments, here of an obstacle FDD, works. According to the Bernoulli principle, air velocity increases superior to the wing (13) shown here in cross-section. FIG. 3 shows the wind coming from the left, accelerating over the wing structure and imparting greater force to the blade (12) superior to the wing. The blades (12) are shown here as interior and superior to the innermost edge (14) of such an FDD. The reason is that space is required for the acceleration of the wind over the wing-like obstacle FDD.

In whatever shape or embodiment the invention ultimately has, the pieces can be produced in smaller modular pieces that easily attach together.

Figure 4:
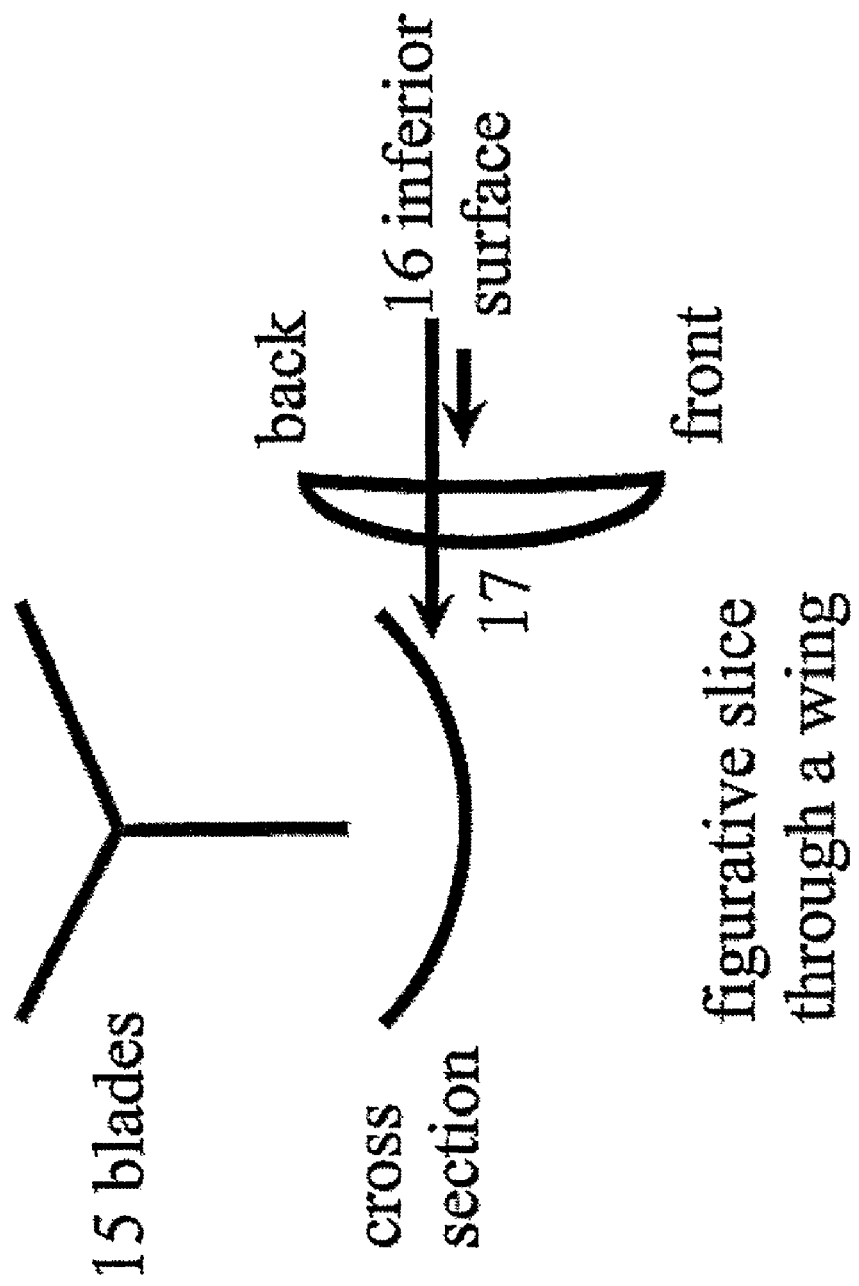
FIG. 4 is a curved, incomplete FDD.

FIG. 4 illustrates one embodiment of a wing FDD that can move in synchronization with the propeller blades or that can be used with a fixed-direction turbine. It also illustrates the use of an incomplete circle FDD. The arc illustrates a cross-sectional slice through a surrounding ring that is curved upward, in this embodiment, in an angle of arc similar to that of the blades (15) but always peripheral to them. The wing does not need to be curved upward in all embodiments. The wing itself is shaped so that the area facing the interior of the arc has an upper camber (17) and the exterior is its surface (16). In another embodiment, the cross-section is parallel to the ground throughout its inferior surface. This illustrates the use of a partial circumference FDD. The FDD shown here can also be used with smaller size turbines.

Figure 5:
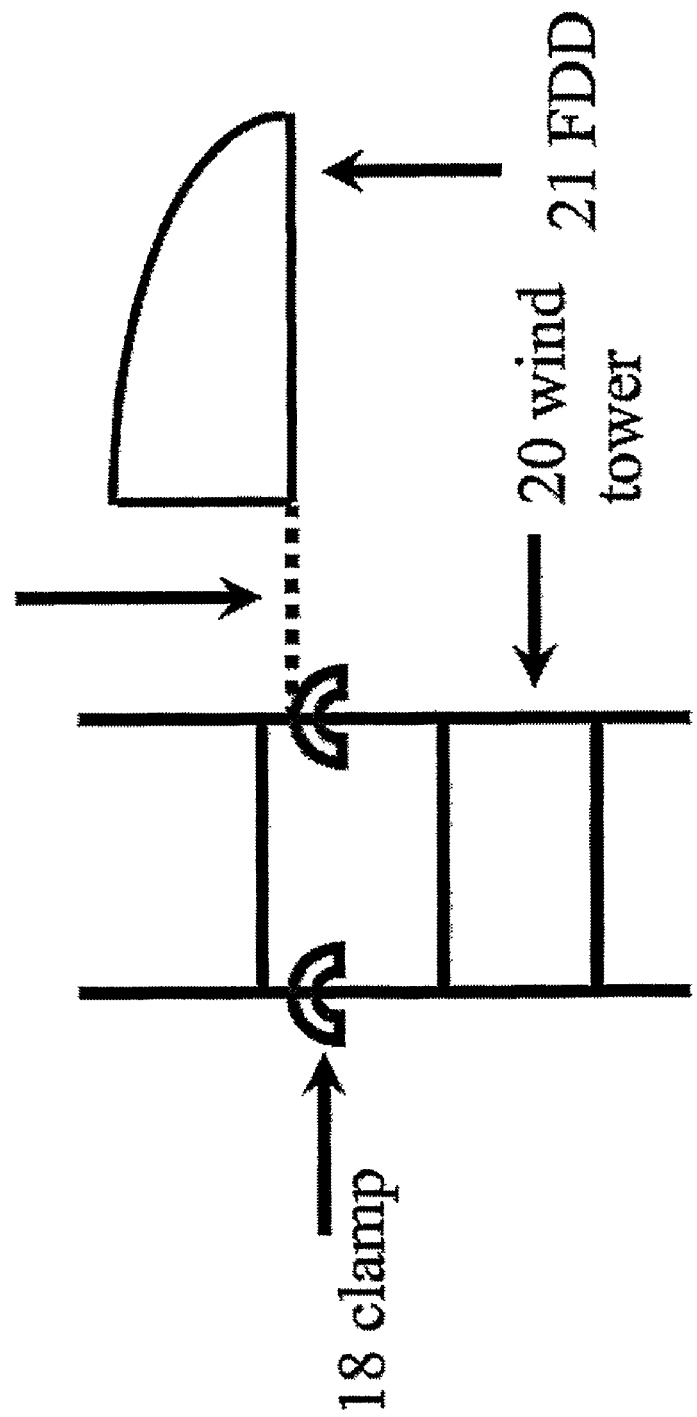
FIG. 5 is a wind tower made of beams with an FDD.

FIG. 5 illustrates how the current invention would work with a wind tower (20) constructed of beams. Clamps as an example of attachment means (18), optionally with holes for drilling screws or bolts, would be one means of attachment to the beams. The clamps are attached to at least one structure

(19) (fixedly, if the wing is fixed; non-fixedly, if the wing moves in synchronization with the blades), which then connects to the FDD (21).

Figure 62:
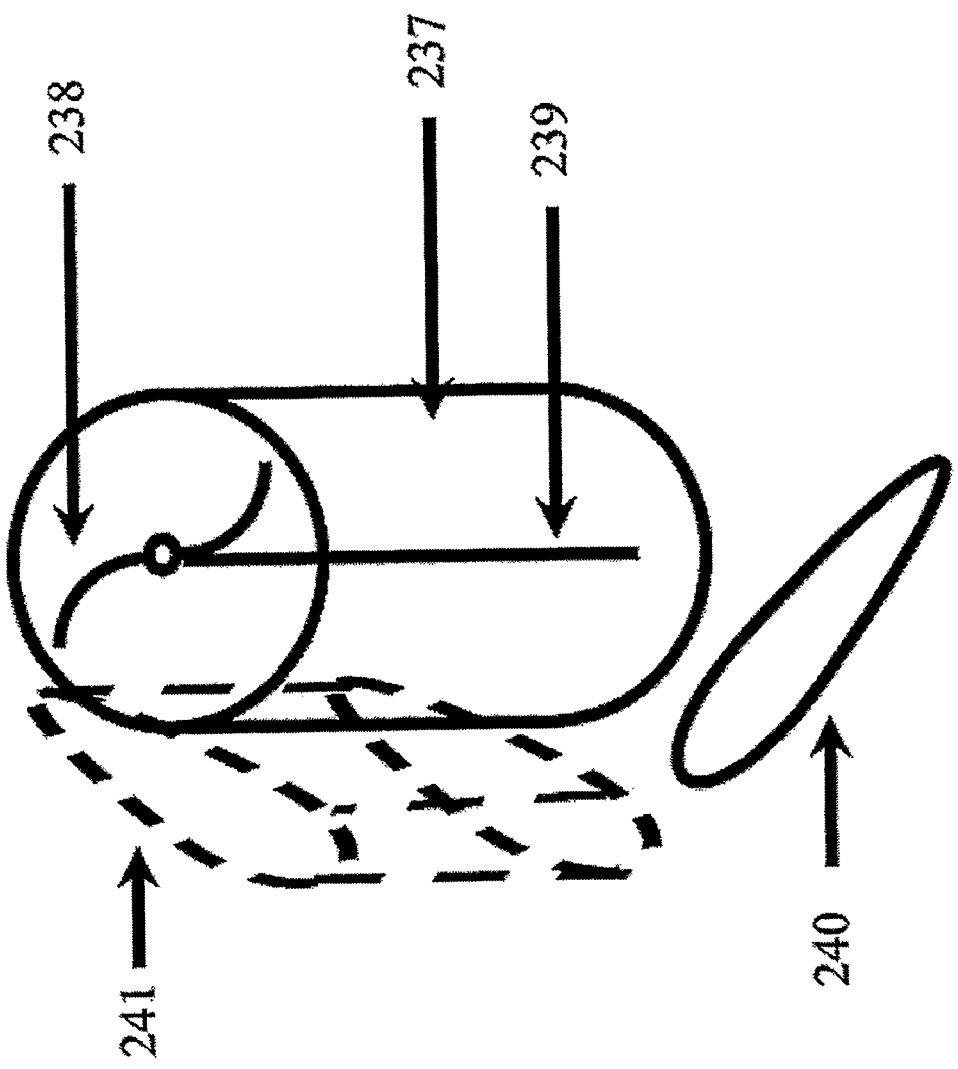
FIG. 62 is a picture of a vertical axis turbine.
Figure 63:
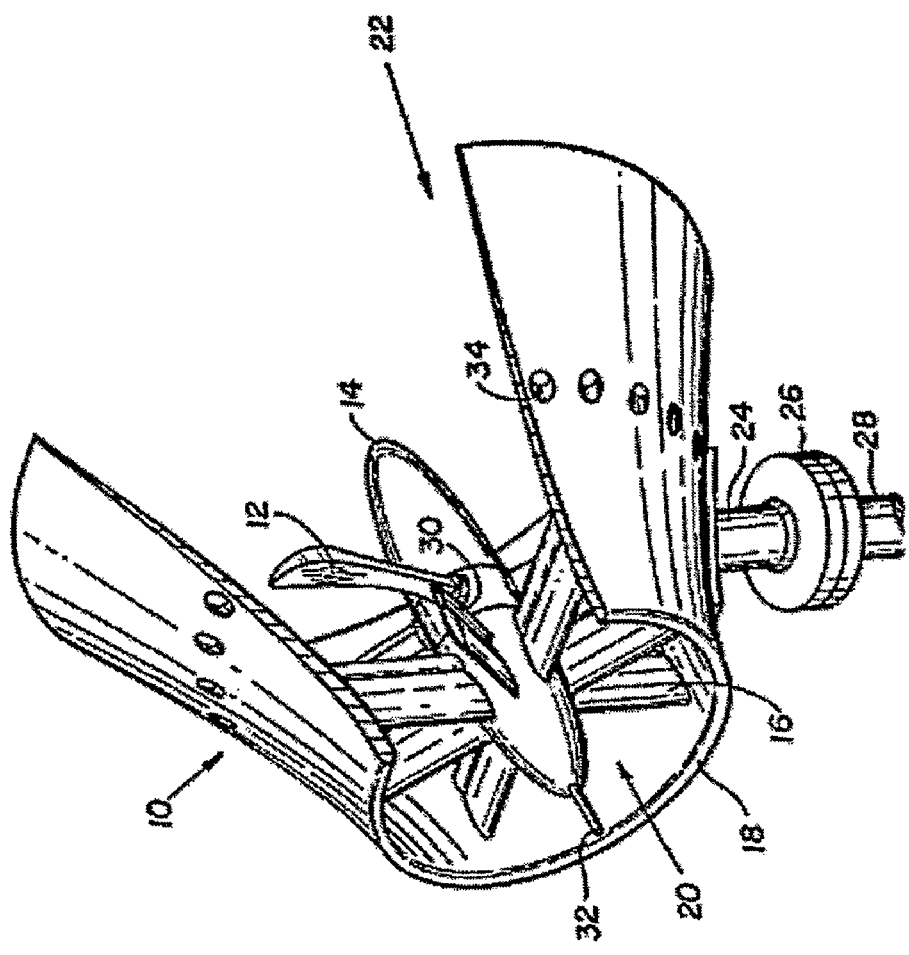
FIG. 63 is a picture of prior art.
Figure 64:
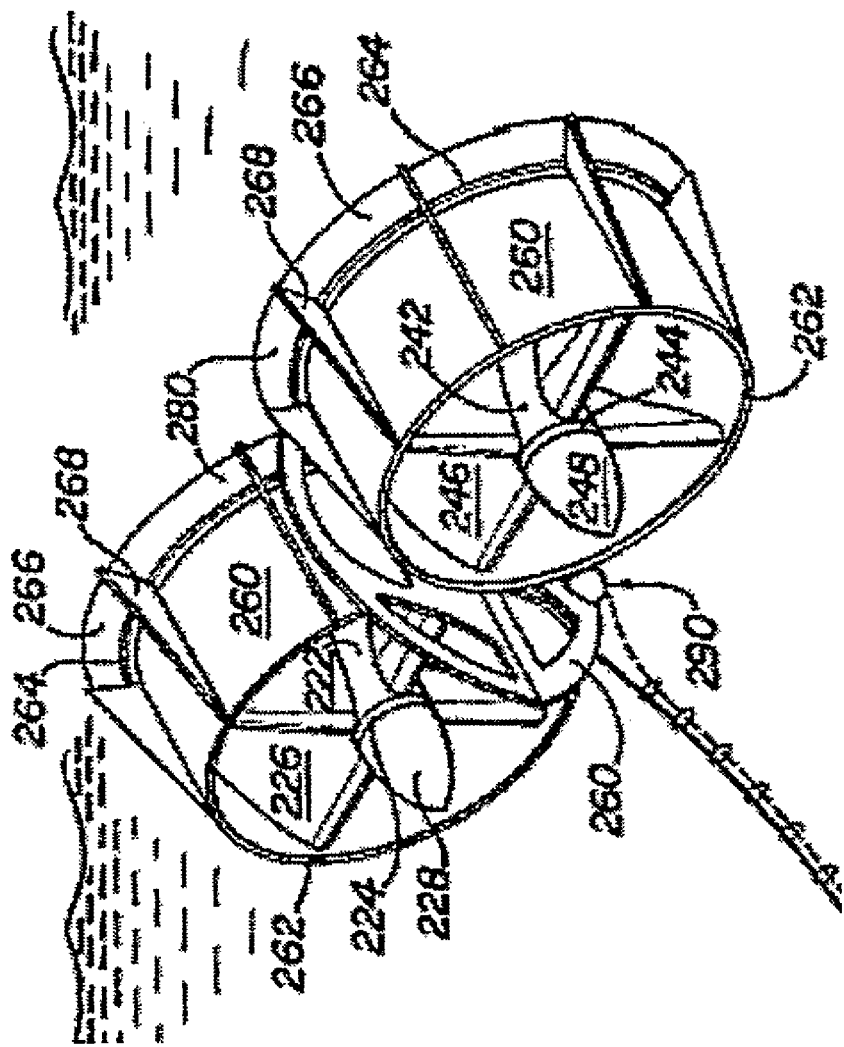
FIG. 64 is a picture of prior art.
Figure 65:
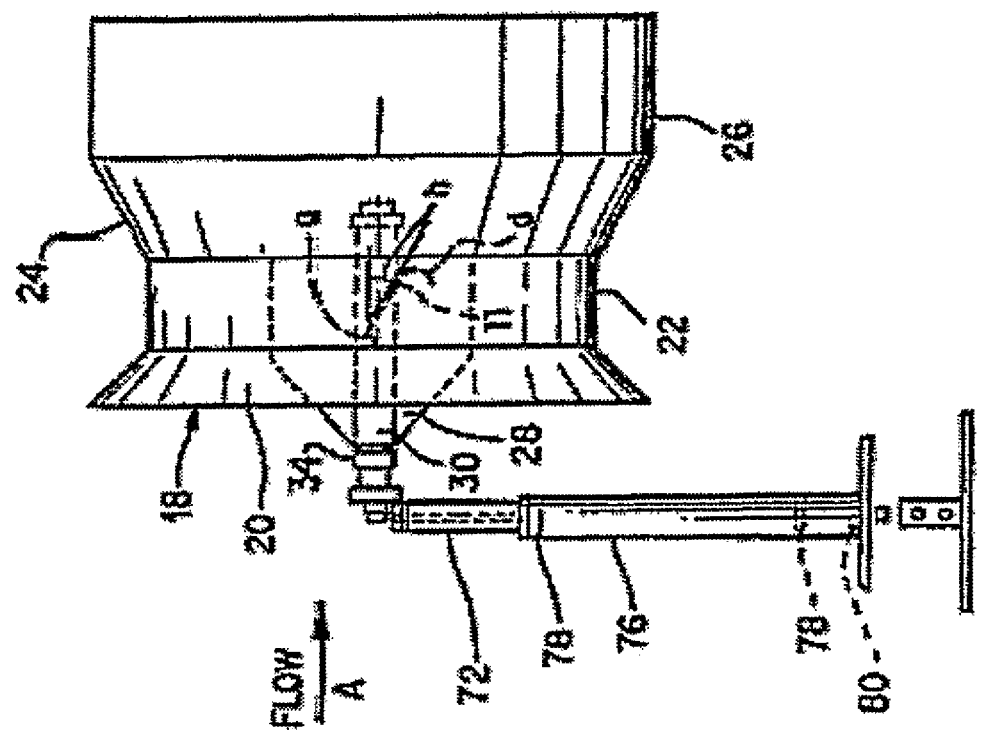
FIG. 65 is a picture of prior art.
Figure 66:
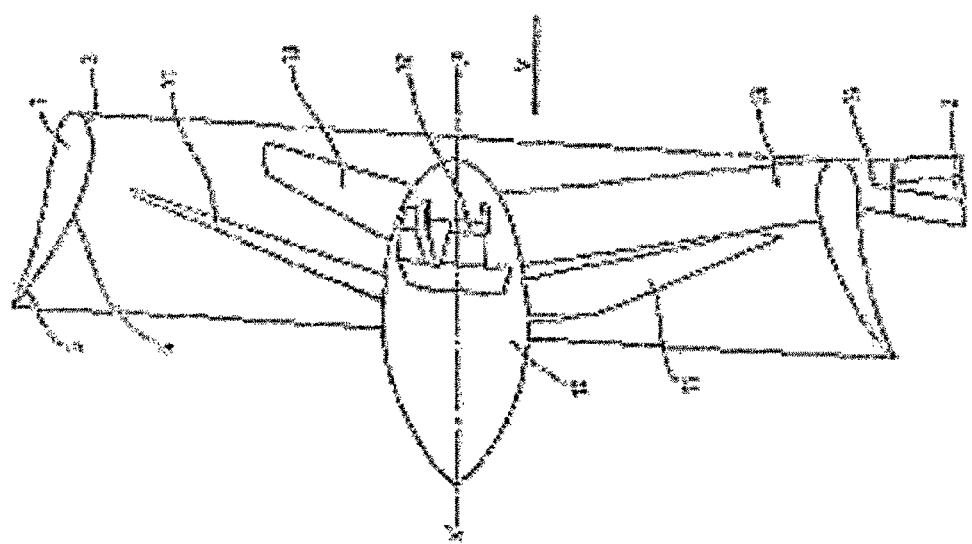
FIG. 66 is a picture of prior art.
Figure 67:
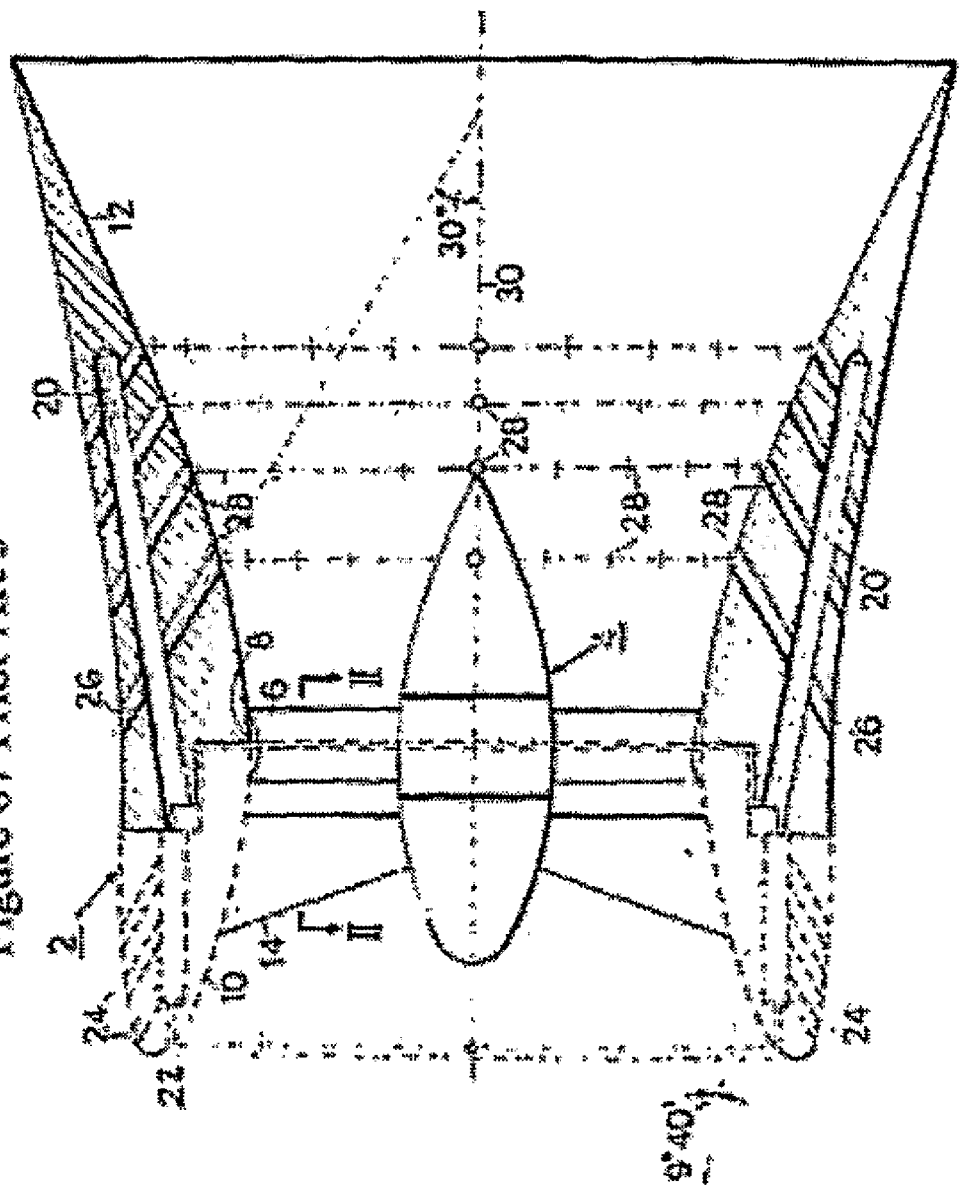
FIG. 67 is a picture of prior art.
Figure 68:
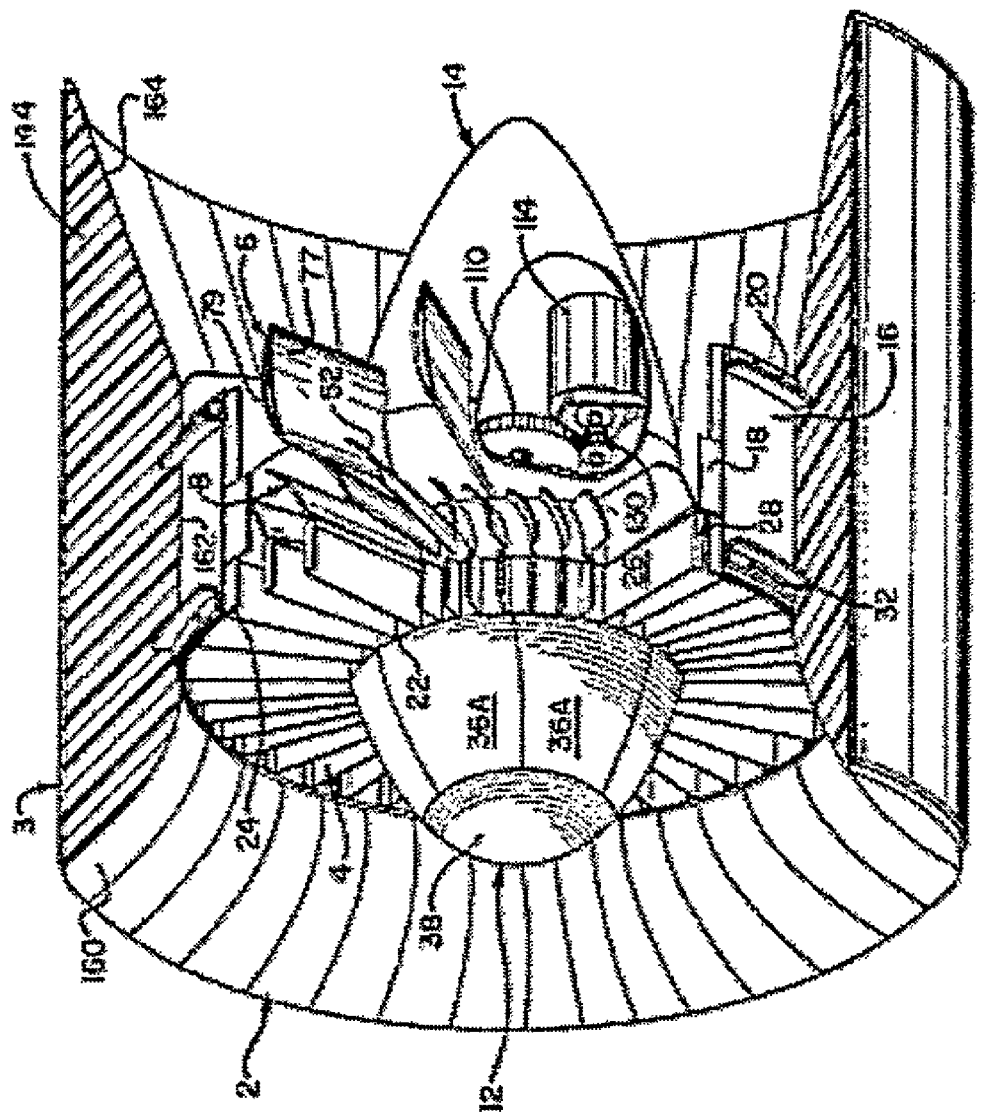
FIG. 68 is a picture of prior art.
Figure 69:
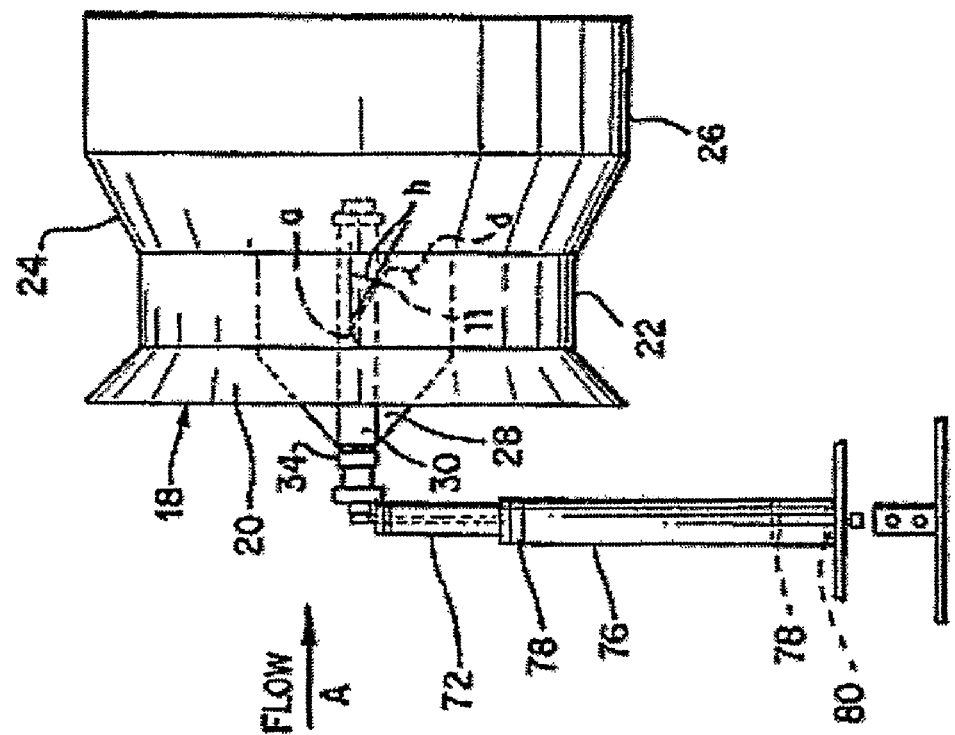
FIG. 69 is a picture of prior art.
Figure 70:
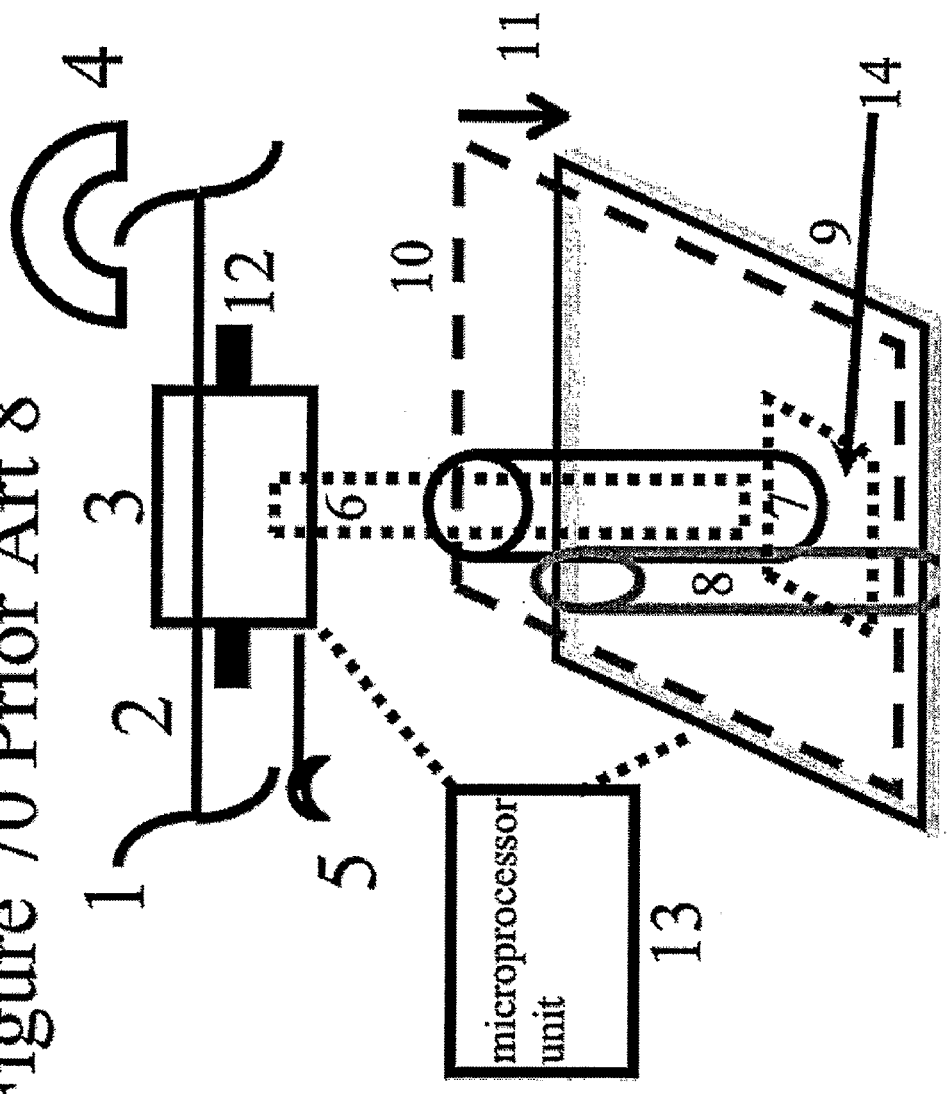
FIG. 70 is a picture of prior art.
Figure 71:
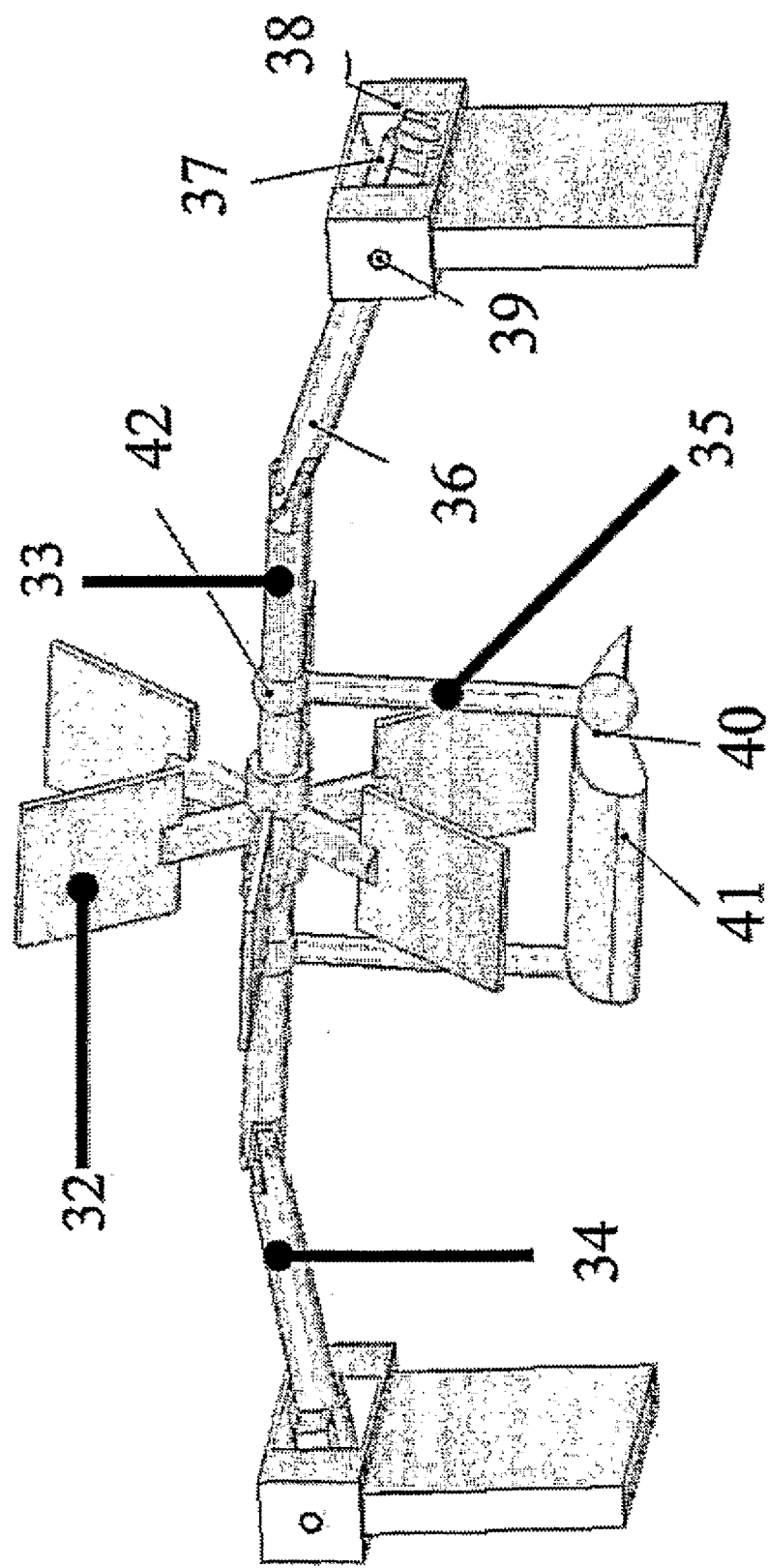
FIG. 71 is a picture of prior art.
Figure 72:
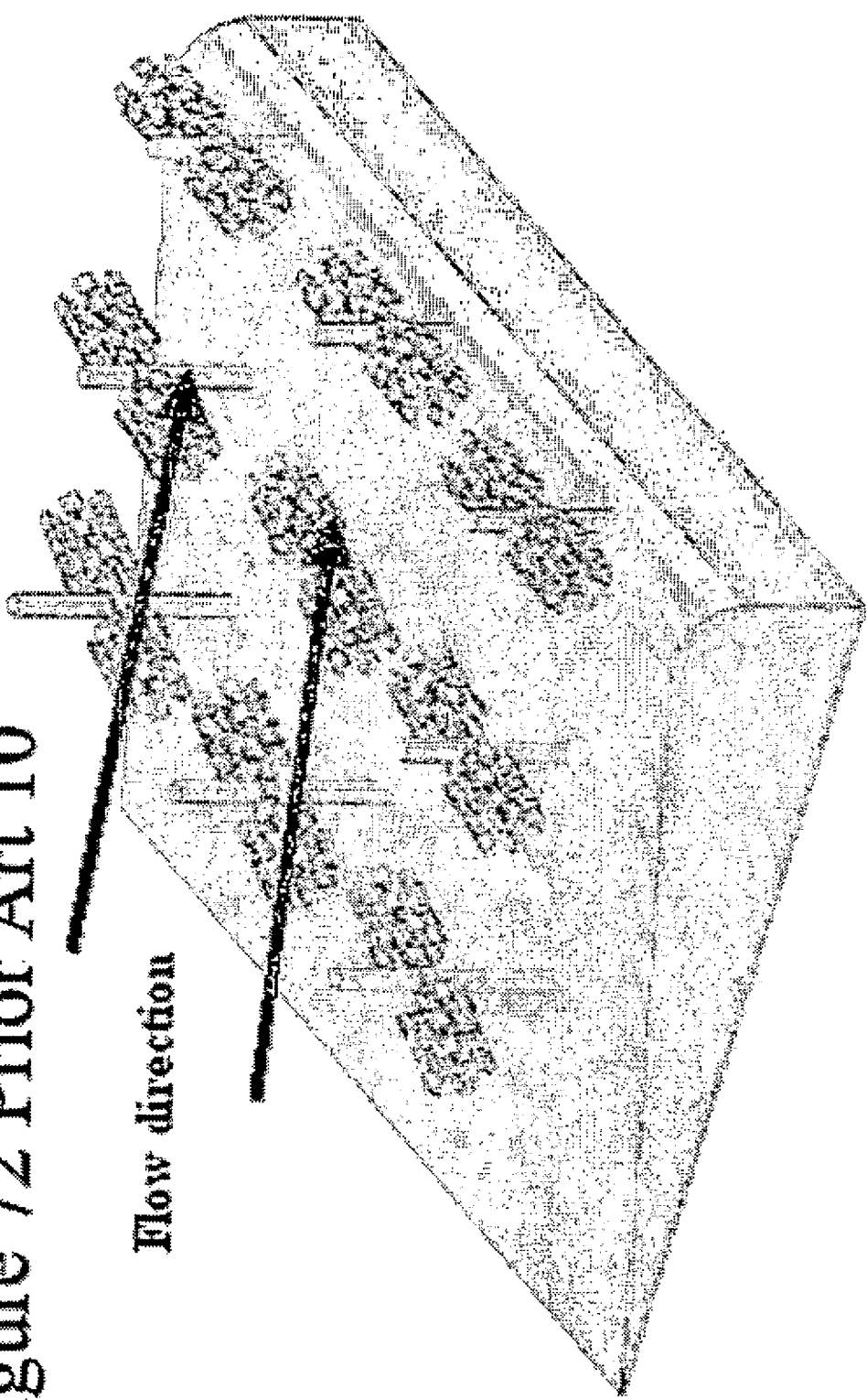
FIG. 72 is a picture of prior art.

The embodiments of the FDD and its attachment means are part of the invention, but the precise attachment means, devices, and methods are an option to the main invention of the placement of an FDD functionally contiguous to a turbine and/or on a tower. In the ideal embodiments, this invention of FDD structures is used in conjunction with propeller blades. However, it may be used to accelerate fluid in conjunction with other structures and machines, such as a vertical axis turbine (FIG. 62).

Part of the current invention is the method of placing said wing structure on a wind tower, before or after the wind tower is erected in place. So these pieces could be prepared as fixed through welding or other means to the wind tower components during manufacture. Part of the current invention is the method of synchronizing a moving wing with propeller blades, ideally in a wind turbine for capturing energy. Part of the current invention is the method of creating structures adjacent to wind turbines to accelerate the airflow.

One example of such a structure would be structures that concentrate the wind flow towards the turbines. They can optionally be attached to the wing structure.

All attachment means may be enhanced by having pre-formed holes for placement of bolts and screws and pre-formed means for attaching supporting objects.

All attachment means discussed in this invention may optionally be composed of or attached to moveable parts that enable the FDD to change position.

All the components may constitute a collection of individual articles of manufacture necessary for the current set of inventions in a kit.

Figure 6:
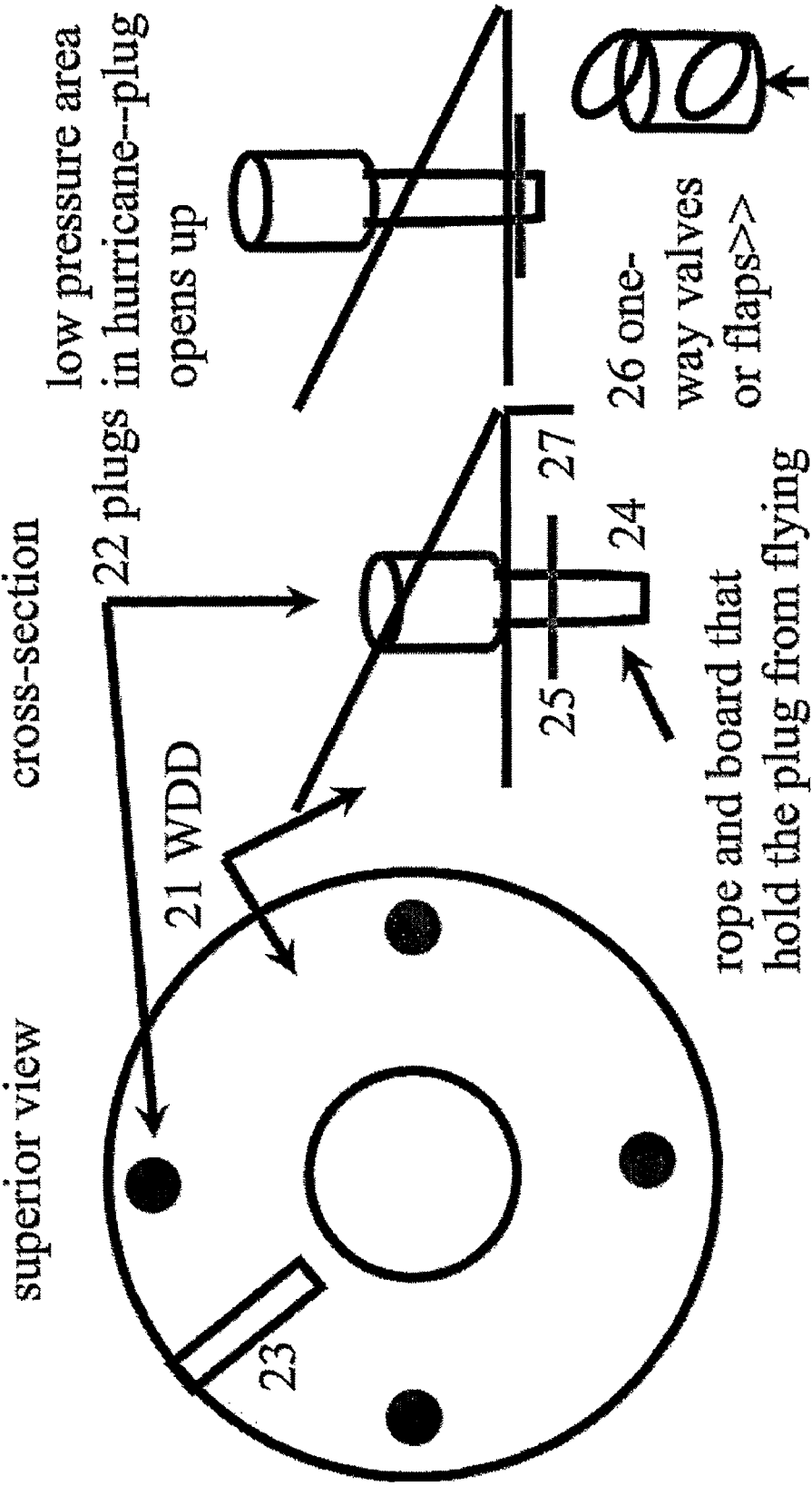
FIG. 6 is a picture of pressure release mechanisms.

FIG. 6 is a picture of pressure release mechanisms. One problem with a FDD is how to deal with high-speed fluid flows such as hurricane winds without ruining the structure of the FDD (21) or the turbine. Leaving a hollow space in the center helps relieve some of the pressure, but there is, danger of the higher pressure below the structure pushing it too far upward. There are several ways to deal with that. FIG. 6 illustrates some solutions. One is to attach the peripheral areas of the FDD (27) to the ground or another surface. Another basic approach is to allow communication of air from the bottom of the WDD (high pressure) to the top (low pressure). Ideally, the devices should only open at a certain high wind velocity. Another solution is a plug (22) and inferior board (25) that uses a rope (24) to hold back the plug from flying all the way out, so that a person with a long, hooked pole could pull it back in after the storm. A better solution would be a one-way valve (26) that only opens at a high velocity or pressure differential. Another good solution would be flaps (26), in one embodiment equipped with a spring, that only open at a pre-set pressure differential. The last two solutions would return to normal without further manipulation at the end of the storm. In one embodiment, the flaps open towards the wind; in another, away from the wind. These flaps could be placed on both the top and bottom of a tarpaulin connecting the rigid structures of the WDD or on a solid structure such as a tube extending from the bottom to the top. In addition, making the WDD non-continuous in certain very thin areas (23) can also help release the pressure. This is referred to as an "interrupted" FDD.

Figure 7:
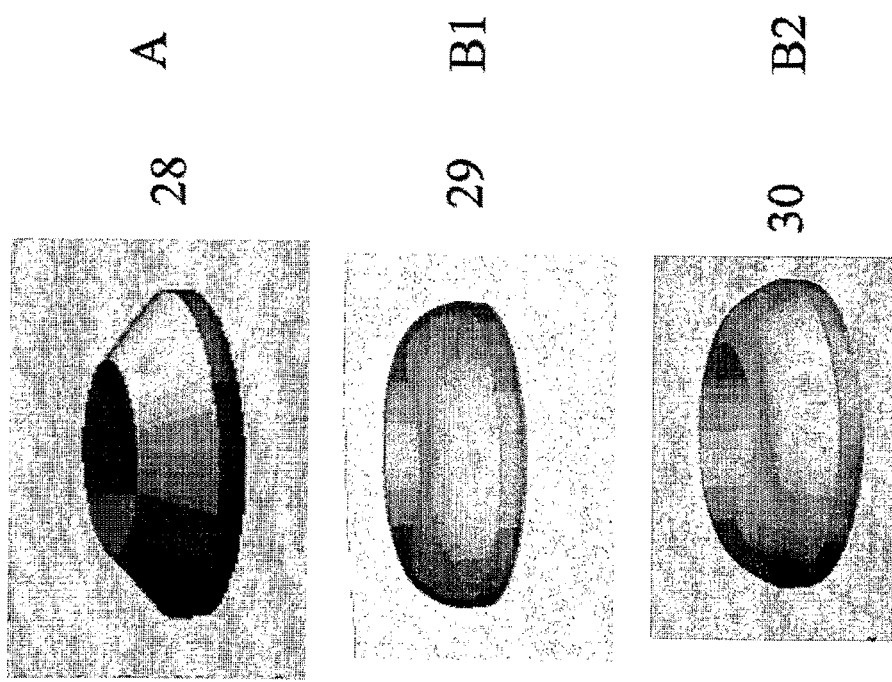
FIG. 7 is a picture of three FDD large wind turbine configurations.

FIG. 7 shows several possible configurations of the large, outer FDD (28, 29, 30). Of these three, B2 performs the best. Each of these are referred to as a combination of two shapes into one FDD.

The different configurations shown here so far can be modeled.

Figure 8:
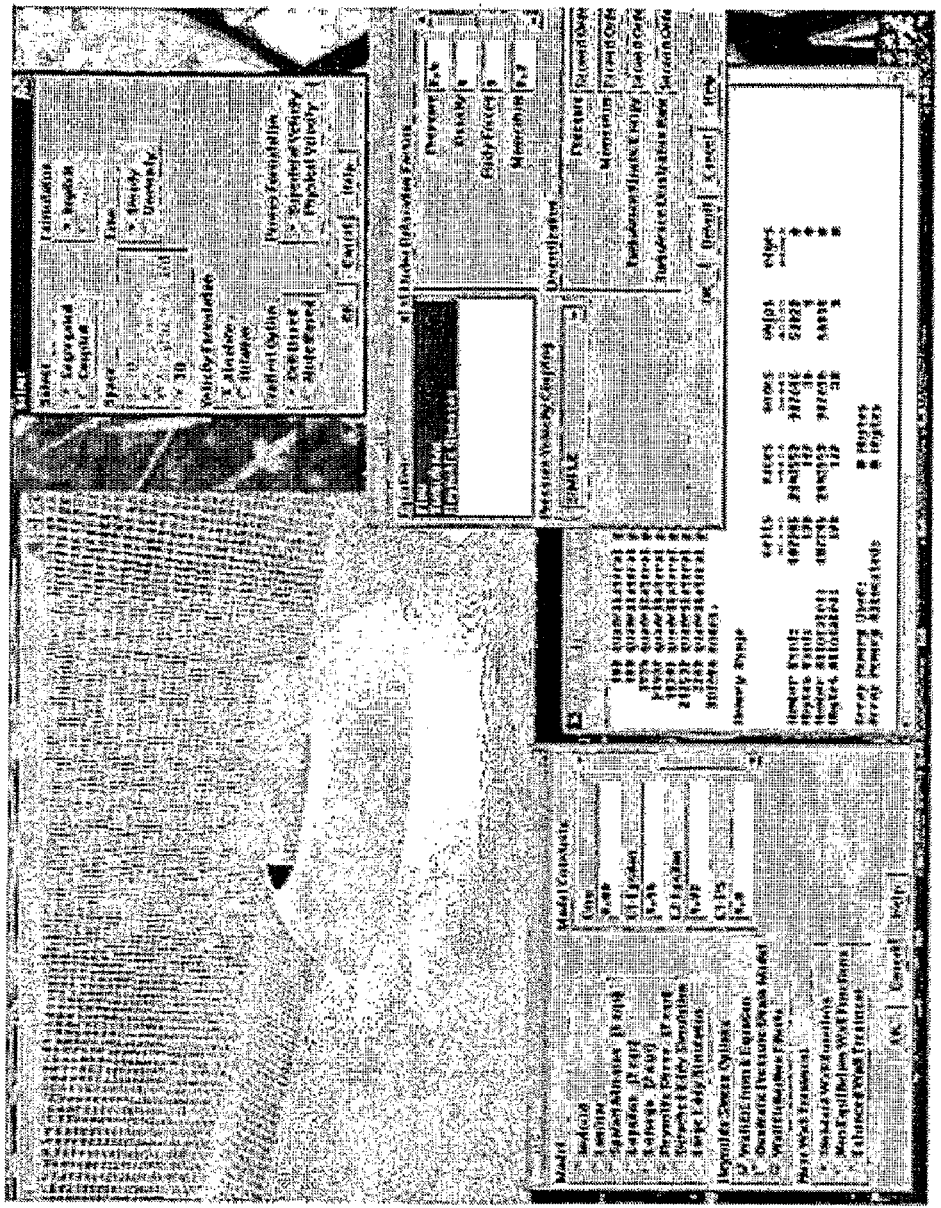
FIG. 8 is a screenshot of a fluid modeling computer program.
Figure 9:
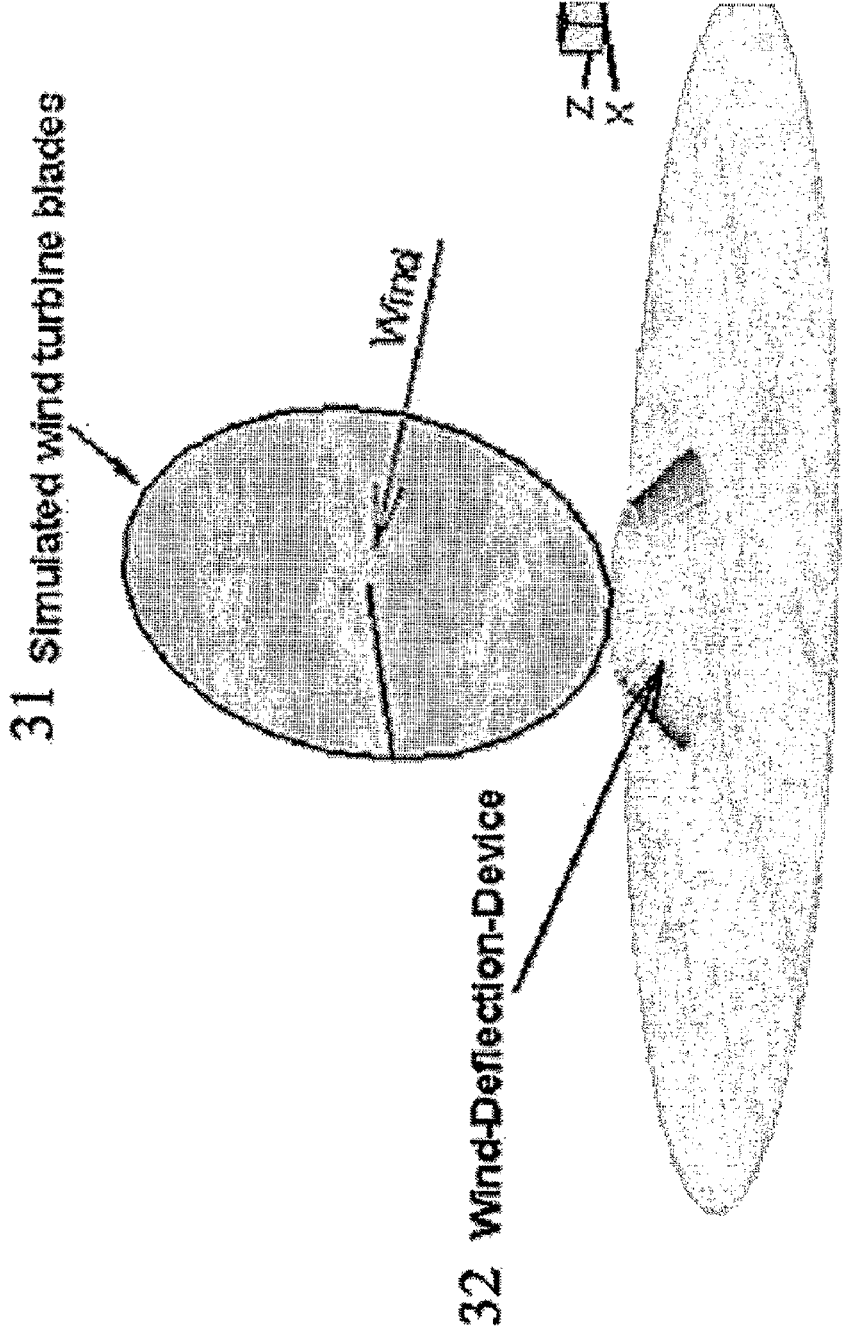
FIG. 9 is a sketch of the computer-modeled simulation appearance.

A WDD that fits underneath a wind turbine and surrounds the wind tower like a torus or doughnut has certain parameters that must be taken into account. The method of providing a WDD specific for any wind tower includes shape of the WDD (ideally convex) and its spatial relationship to the blades, placement factors—such as nearby roads and distance to other wind turbines; wind tower shape factors—such as diameter or shape of girders; parameters of the wind tower and blades—such as height of the structures; and wind flow factors. The crucial factors for this are the variables height, width, inner diameter (Din), location of the blades in relationship to the tower and the WDD, size of the blades, and distance of the blades from the earth. The ideal method is to obtain this information and develop an ideal configuration for each turbine using a computational fluid dynamics program such as FLUENT. FIG. 8 is a screenshot of the input into a fluid modeling computer program. FIG. 9 is a sketch of the numerical model in the program, in this case for the outer doughnut. (31) shows the wind turbine blades revolving in the x-axis, with the z-axis the direction of the wind. (32) shows the WDD or FDD.

Figure 10:
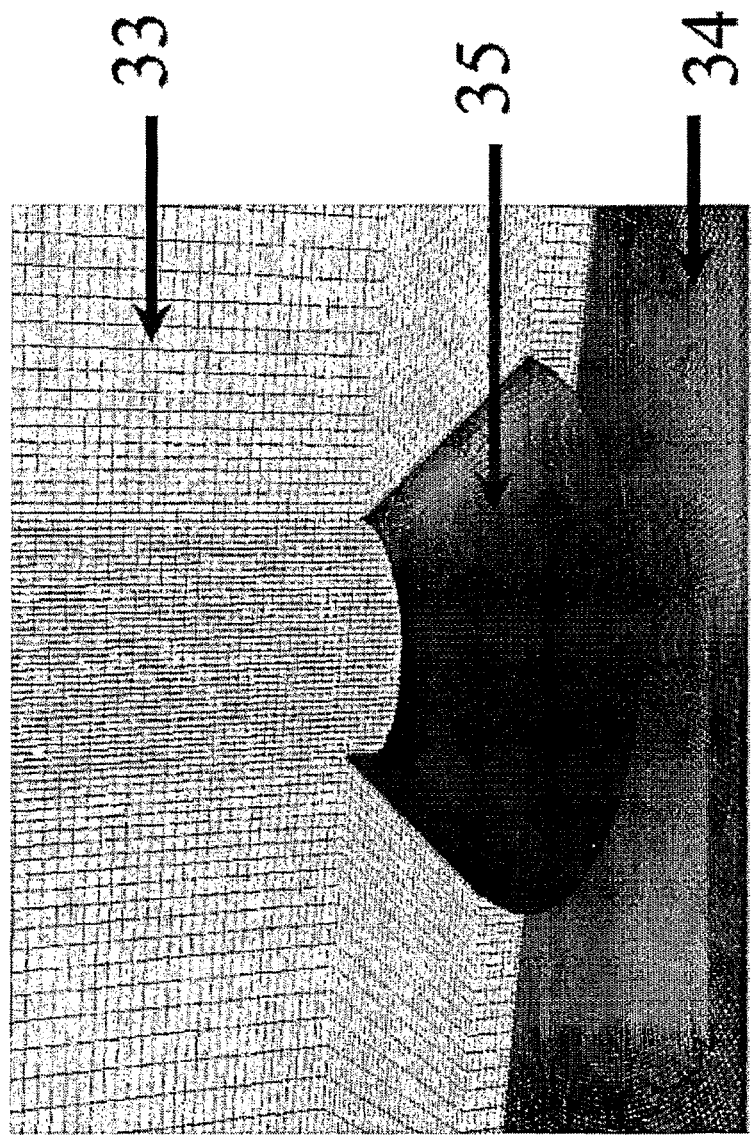
FIG. 10 is a picture of the discretization of the computer modeling.

FIG. 10 shows the discretization of the program into different planes. (33) is the symmetry plane mesh and is green in the original. (34) is the ground and is red in the original. (35) is the FDD and is dark blue in the original. We used 500,000-1,000,000 nodes with clustering of points near the ground and near the WDD.

Figure 11:
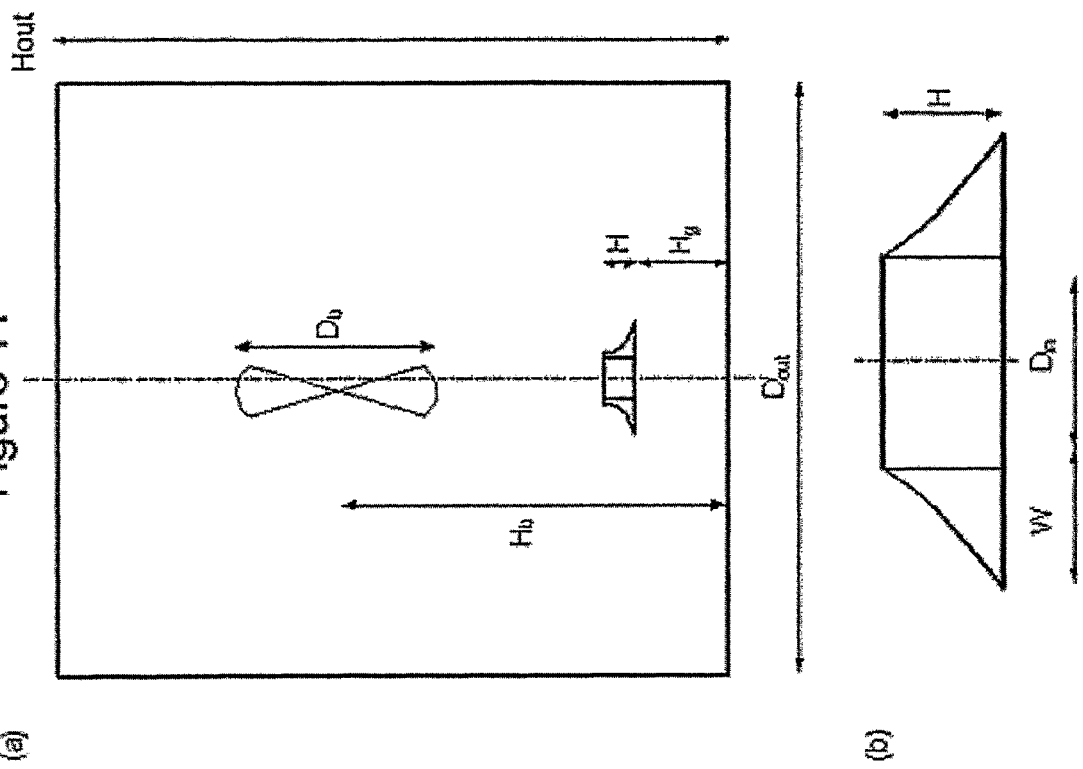
FIG. 11 is an illustration of the parameters of computer modeling with a large wind turbine.

FIG. 11, a geometry sketch, illustrates some of the parameters shown.

The shape, the inner diameter, the width of the wind-deflecting device (WDD) as well as its height vary from case to case. Please note that in the present case, the effects of the blades as well as of the tower are not included.

FIG. 11 is an illustration of the parameters of computer modeling with a large wind turbine. FIG. 11 shows the axisymmetric geometry of (a) the entire domain and (b) the FDD. Please note that the blades are not simulated; they are shown for illustration purposes only.

The following dimensions have been used:
Db=Diameter of the blades, from 30-80 meters
Dout=200-280 meters—not a crucial parameter
Hout=150-160 meters—not a crucial parameter
Hg=Height from the ground=7 meters in most cases
Din=Diameter of the inside of the FDD=10, 30, or 60 meters (depending on the case)
W (width of the FDD)=H=5, 10, or 20 meters, depending on the case
H height of the FDD)=5, 10, or 20 meters, depending on the case
Hb height of the hub (center) of the blades
Assumptions
The flow is steady, incompressible, and turbulent
The tower and the blades are not included in the model.
The 3-D Reynolds averaged Navier-Stokes equations have been used to model the flow. The wind profile is approximated by:

$$U_{in}(y) = U_\delta \frac{\ln(y/z_0)}{\ln(\delta/z_0)},$$

where $U_\delta$ is the velocity at a height of $\delta$ $$\left(\text{in the present case } U_\delta = 10 \ \frac{m}{s}, \delta = 10 \ m, z_0 = 0.01\right).$$

A turbulence intensity of 10% was imposed at the inlet.

The numerical model was validated by mesh-independence test scheme accuracy order and turbulence model by comparing the relative velocity increase $\Delta U$ defined by $$\Delta U = \frac{u - U_{in}}{U_{in}}$$

along three lines on the symmetry plane, (i) a line 10 m upstream of the WDD center, (ii) a line at the center of the WDD and (iii) a line 10 m downstream of the WDD. u is the calculated velocity and $U_{in}$ is the wind velocity imposed at the inlet (a function of the height). The conclusion is that a fine mesh (clustered near the WDD and the ground), second-order-accuracy, and the SST k model will be employed for the production runs.

The model: An axisymmetric wind-deflection-device (WDD) with an inner diameter of Din, height of H and a base width W (base diameter is therefore=Din+2W) is at a height of Hg above the ground. The simulated wind turbine has a blade diameter of Db and center height of Hb. The wind velocity is along the Z direction and has a logarithmic profile (wind velocity is 10 m/s at a height of 10 m). Therefore, the symmetry plane is at X=0.

In order to evaluate the performance of the WDD of several sizes and shapes, the relative Z-velocity component increase is compared. It is defined as $$\Delta U = \frac{u - U_{in}}{U_{in}} \ (\text{in } \%),$$

where u is the calculated velocity in the presence of the WDD and $U_{in}$ is the wind velocity imposed at the inlet.

The available wind power P in a uniform wind of velocity $V_\infty$ is proportional to $V_\infty^3$, therefore, the relative increase in the wind available power can be approximated by $$\frac{\Delta P}{P} \approx 3\overline{\Delta U},$$

where $\overline{\Delta U}$ is the mean relative velocity increase (calculated by the integration of $\Delta U$ over the area swept by the simulated wind turbine blades), $\Delta P$ is the increase in the available power of the wind.

Figure 12:
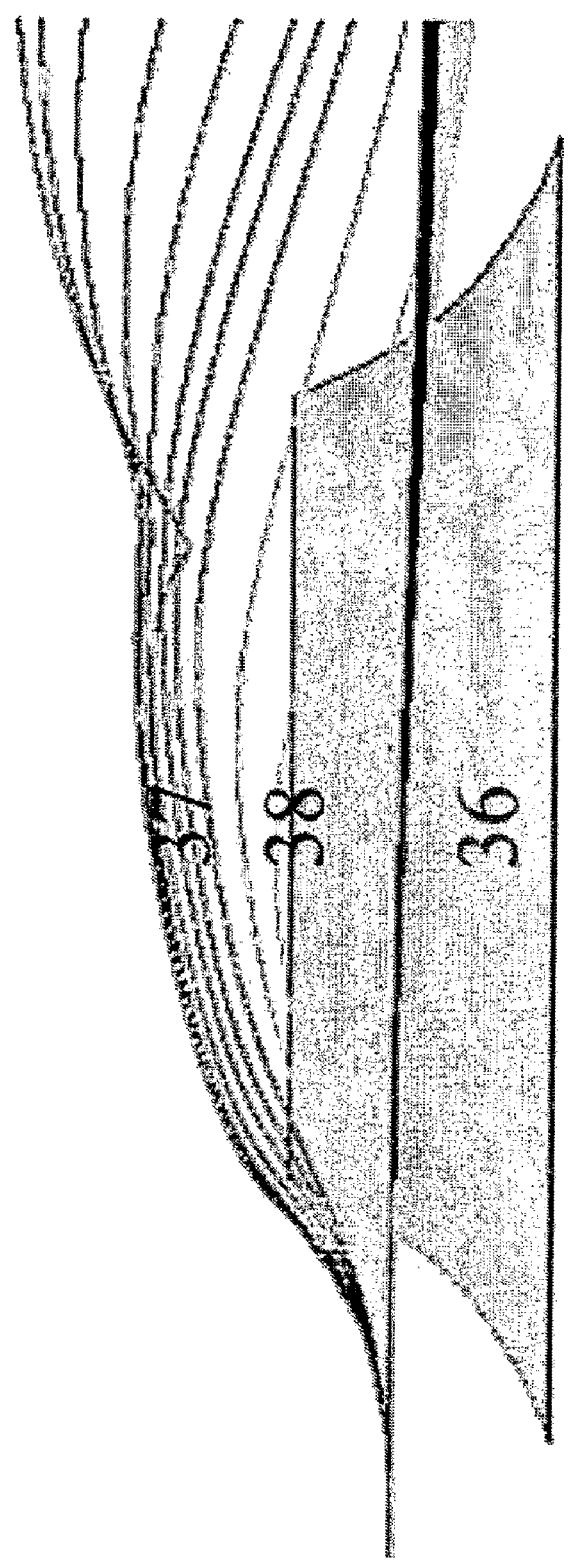
FIG. 12 illustrates computer-modeling results of the paths of air particles around an FDD.

FIG. 12 illustrates a typical computer-modeling graphical result of the paths of air particles around an FDD. The computer simulations shown here confirm the contention of this patent that substantial improvements in energy output can be achieved by using FDDs to alter fluid flow. In FIG. 12, (36) is the WDD. The label (37) is placed over the area of highest velocity of the air particles. (38) is in the area of next highest velocity. By finding the area superior to the WDD where the acceleration is greatest, and adjusting for the area swept by the blades, we can quantify the power output increase and find the best location for a WDD of a certain size and shape in relationship to the blades.

Figure 13:
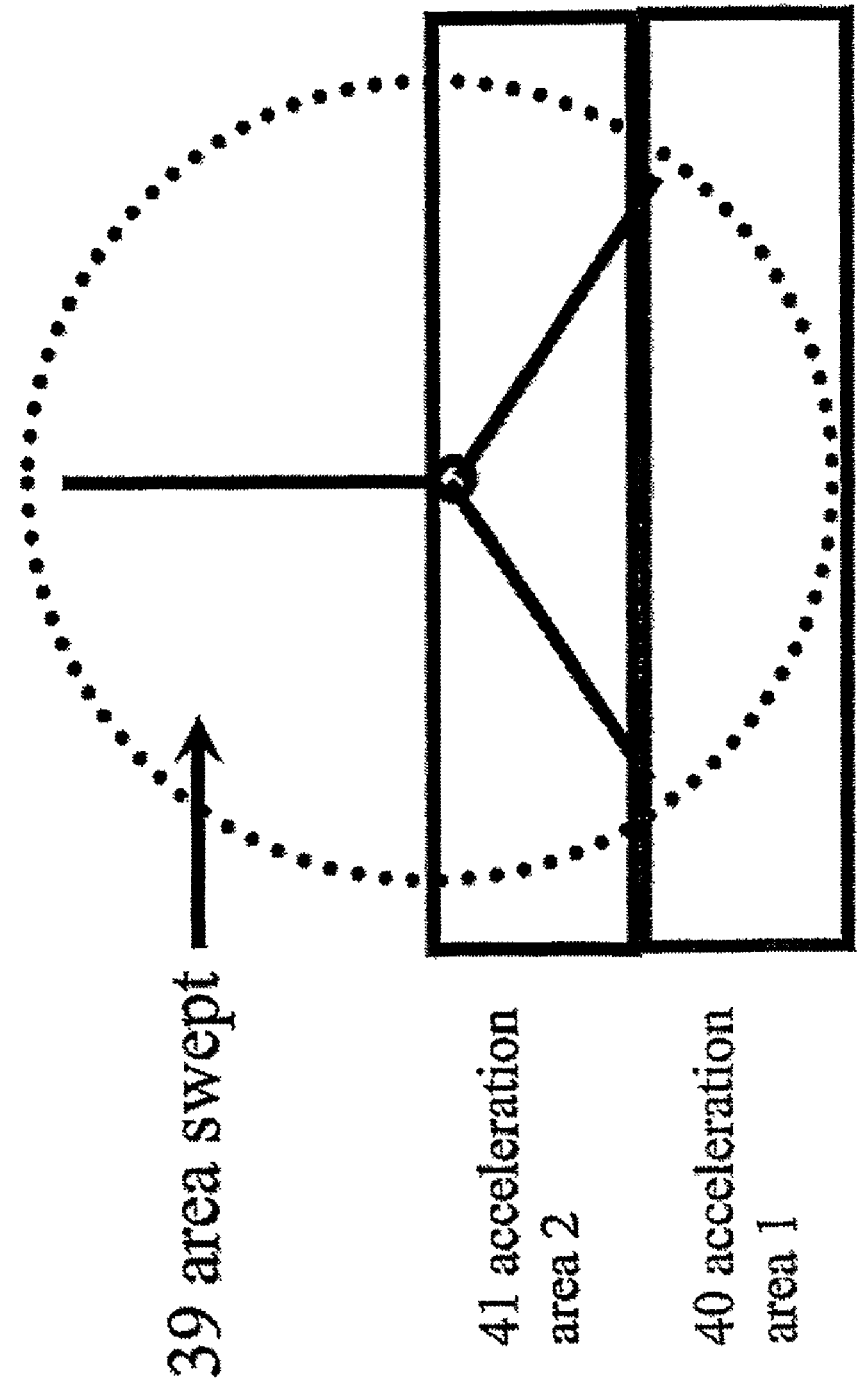
FIG. 13 is a sketch of the concept of areas of greater acceleration affecting part of the area swept by the blades.

This concept is illustrated in FIG. 13. FIG. 13 is a sketch of the concept of areas of greater velocity affecting part of the area swept by the blades. (39) is the area swept by the blades. This is where we want the greatest velocity to pass. It is clear that if the same amount of increased velocity is available for area (40) and (41), it will be better if it reaches area (41) because it has a greater effect to speed up the rotation of the blades. In general, the FDD effect tapers off the greater the distance from the FDD, but certain shapes work better at moving the kinetic energy of the particles involved in the flow into the area swept.

Now we will see how varying the parameters of the FDD affect the power output. This enables one to develop weightings and algorithms for the different options of constructing a large obstacle (or any) FDD, in order to deal with customer preferences, land or sea usage conditions, etc. One can also combine such an algorithm with the time-based input from an anemometer, a machine that records the direction and speed of the wind, or other flow sensor, to determine whether a fixed or limited position of the blades, in combination with a curved FDD, will result in more power output than freely moving blades in conjunction with a 360-degree FDD.

The tables below show increase in power after computing the change in velocity cubed and accounting for the fact that the velocity doesn't affect the whole area swept by the blades.

Figure 14:
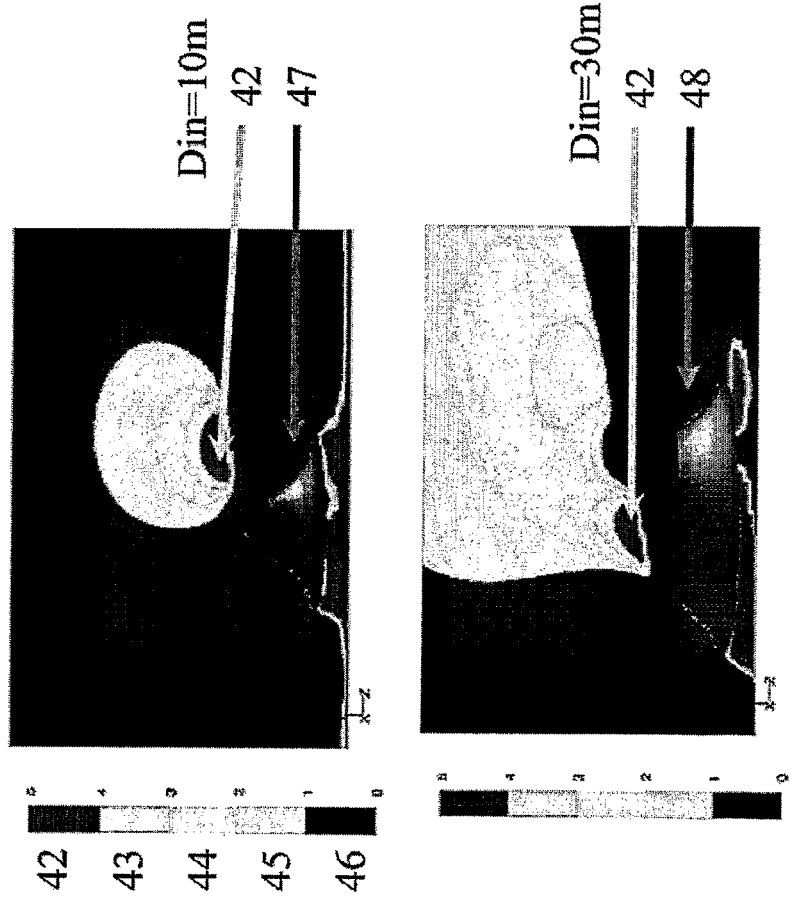
FIG. 14 is a computer model of the effect of inner diameter on wind velocity.
Figure 15:
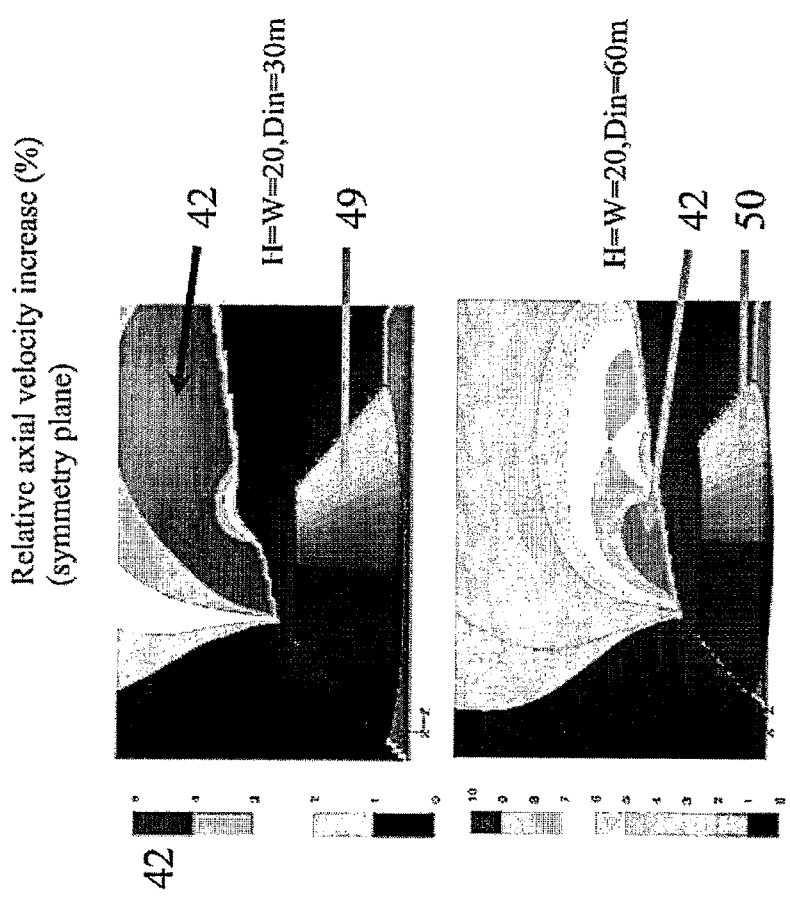
FIG. 15 is a continuation of FIG. 14.

FIGS. 14 and 15 are computer models of the effect of inner diameter on wind velocity. FIG. 14 shows graphs of the velocity distribution with different inner diameters. Points (42) through (46) show the points on the scale used, with (42) having the greatest velocity increase. With the wind coming from the left, note that point (42) in the upper diagram of FDD (47) occurs after the wind has already passed through the blades. It would be possible for someone not aware of the method here used to place an FDD near a wind turbine and conclude that it has no positive effect at all. Enlarging the FDD in the lower diagram with FDD (48) enables the higher velocity zones to be placed in the vicinity of the blades.

FIG. 15 shows more examples of this principle. Here also point (42) indicates the region of greatest velocity. In the case of FDD (49), which is larger than the structures in FIG. 14, again the highest velocity area doesn't occur in the vicinity of the blades, but in FDD 50, which has a larger inner diameter, it does. The tables below show specific values of power output for different conditions and show the importance of coordinating height and width, particularly height, with the inner diameter.

| Effect of inner diameter and height | | | | | |
|---|---|---|---|---|---|
| | | $D_b$ = 60 m | | $D_b$ = 80 m | |
| $D_{in}$ (m) | W = H (m) | $H_b$ = 50 m | $H_b$ = 60 m | $H_b$ = 60 m | $H_b$ = 80 m |
| 10 | 10 | 2.0 | 1.6 | 1.6 | 0.9 |
| 30 | 10 | 4.8 | 5.0 | 4.7 | 3.1 |
| 30 | 20 | 21.7 | 9.8 | 8.6 | 7.6 |
| 60 | 20 | 29.0 | 14.1 | 12.7 | 16.0 |

Same base diameter, small $D_{in}$

| $D_{in}$ (m) | W (m) | H (m) | $D_b = 60$ m | | $D_b = 80$ m | |
|---|---|---|---|---|---|---|
| | | | $H_b = 50$ m | $H_b = 60$ m | $H_b = 60$ m | $H_b = 80$ m |
| 20 | 15 | 10 | 5.2 | 4.0 | 4.0 | 2.7 |
| 20 | 15 | 20 | 13.0 | 7.1 | 4.4 | 5.5 |
| 10 | 20 | 10 | 4.4 | 3.2 | 3.4 | 1.9 |
| 10 | 20 | 20 | 0.1 | 6.6 | 2.7 | 4.0 |

Figure 16:
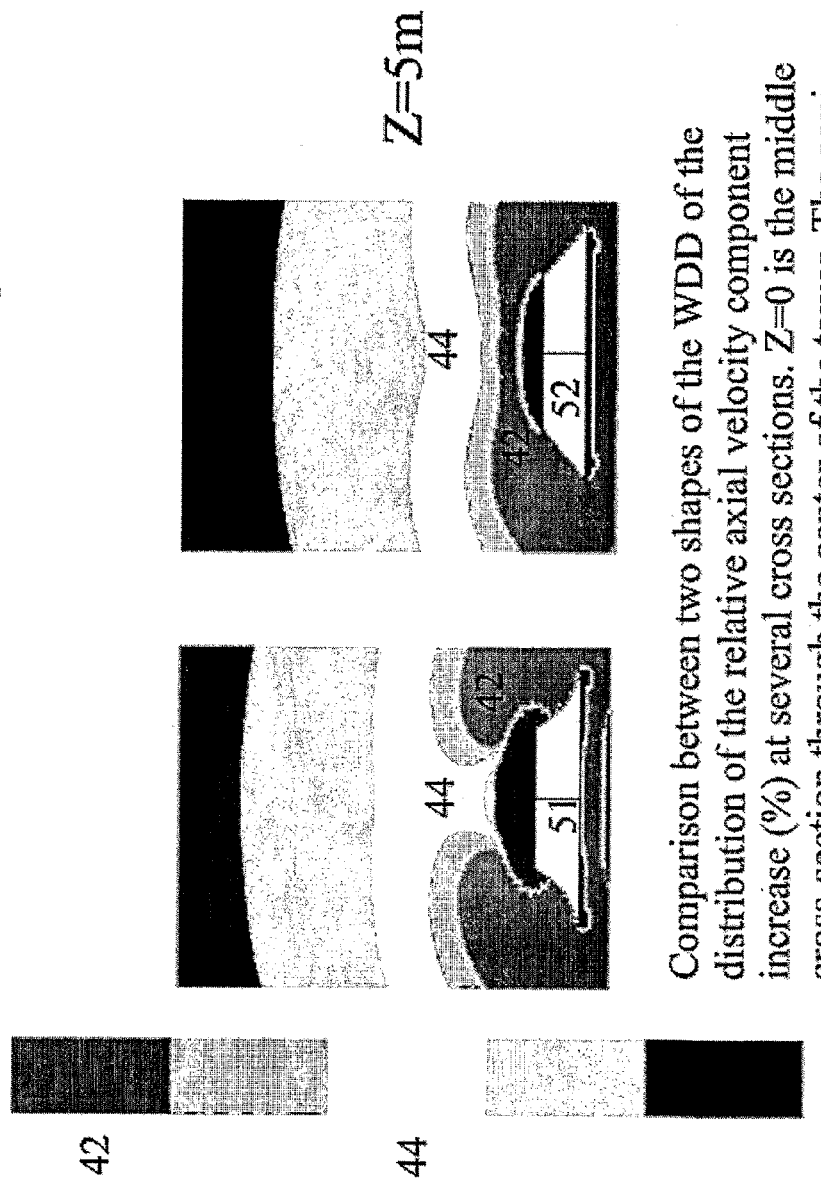
FIG. 16 is a computer model of the effect of WDD shape on wind velocity.

FIG. 16 is a computer model of the effect of WDD shape on wind velocity. Points (42) and (44) represent the same relative velocity levels as before. FDD (51) is concave to the direction of flow, and produces much less power output than FDD (52) with a conic shape. Other models show that a convex shape is even better. Here is the data comparing contoured inwards and straight (conical) shapes.

Effect of shape $D_{in} = 30$, W = H = 10 m

| | $D_b = 60$ m | | $D_b = 80$ m | |
|---|---|---|---|---|
| Shape | $H_b = 50$ m | $H_b = 60$ m | $H_b = 60$ m | $H_b = 80$ m |
| Contoured | 4.8 | 5.0 | 4.7 | 3.1 |
| Straight | 6.0 | 5.1 | 5.1 | 3.3 |

The B2 configuration, with a Din=30, W=H=10, Db=80, Hb=80, with an upper height of 35 meters, gives a power increase of 5.1%.

Figure 17:
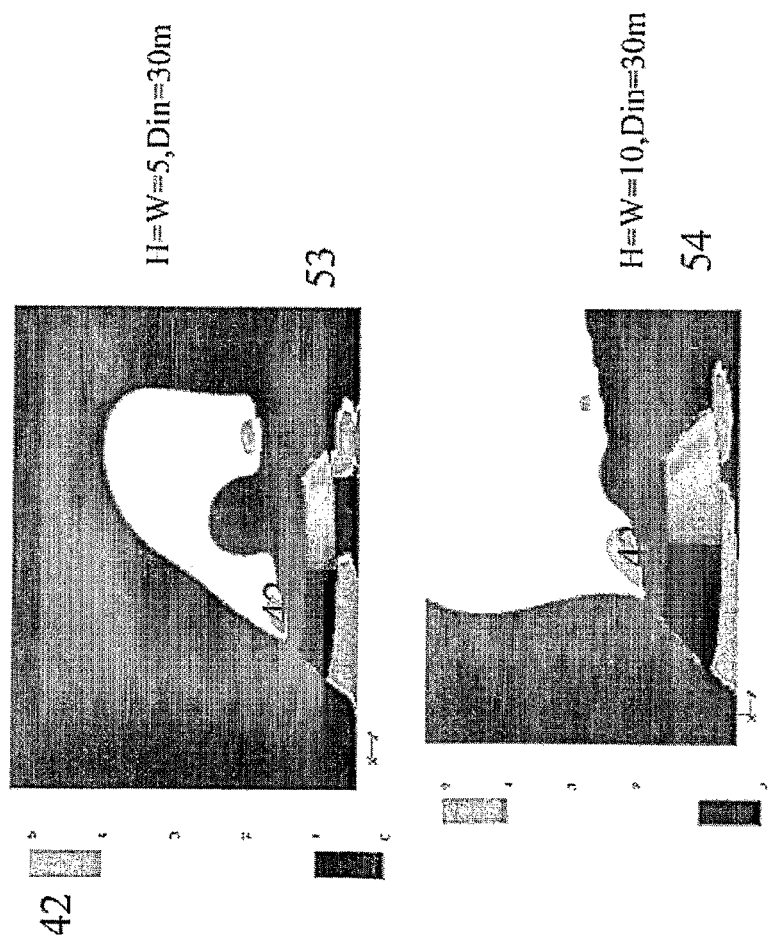
FIG. 17 is a computer model of the effect of WDD size on wind velocity.

FIG. 17 is a computer model of the effect of WDD size on wind velocity. Point (42) represents as before the location of greatest velocity. FDD (53) is smaller than FDD (54), and the power output is much less in (53) than in (54). The following table also shows this relationship.

Effect of size, $D_{in} = 30$ m

| | $D_b = 60$ m | | $D_b = 80$ m | |
|---|---|---|---|---|
| W = H (m) | $H_b = 50$ m | $H_b = 60$ m | $H_b = 60$ m | $H_b = 80$ m |
| 5 | 2.7 | 3.9 | 2.2 | 1.3 |
| 10 | 6.0 | 5.1 | 5.1 | 3.3 |
| 20 | 21.7 | 9.8 | 8.6 | 7.6 |

Figure 18:
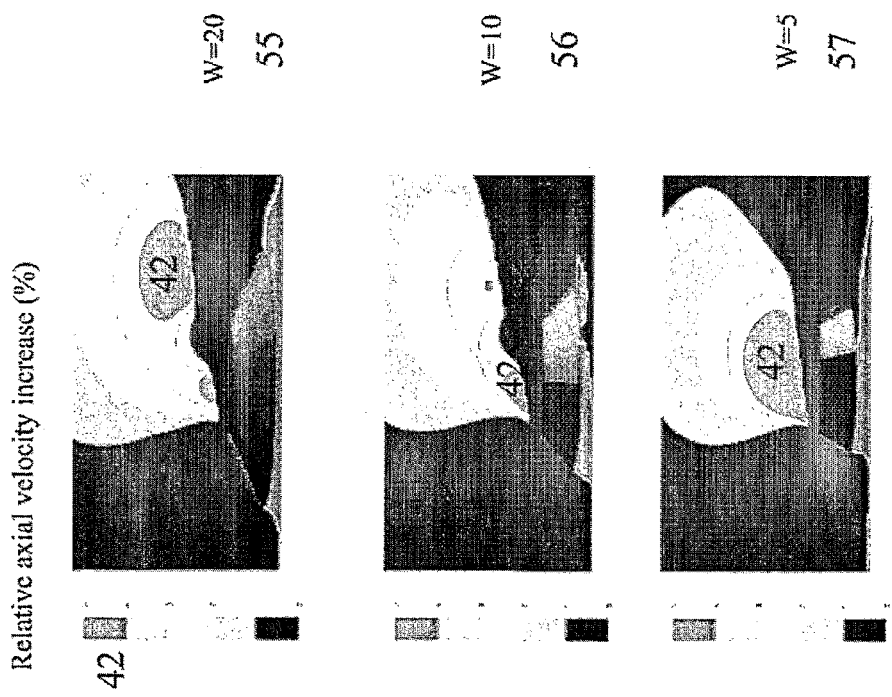
FIG. 18 is a computer model of the effect of WDD inclination angle on wind velocity.

FIG. 18 is a computer model of the effect of WDD inclination angle on wind velocity. Once again, point (42) is the point of greatest velocity. The FDDs shown are in order of width; they decrease from (55) to (56) to (57). In (57), the power output is highest and best located near the blades because it has the highest angle of inclination. The table below shows that height is more important than the width.

Effect of width ($D_{in} = 30$ m, H = 10 m)

| | $D_b = 60$ m | | $D_b = 80$ m | |
|---|---|---|---|---|
| W | $H_b = 50$ m | $H_b = 60$ m | $H_b = 60$ m | $H_b = 80$ m |
| 5 | 8.5 | 5.8 | 6.3 | 3.0 |
| 10 | 6.0 | 5.1 | 5.1 | 3.3 |
| 20 | 7.3 | 6.0 | 6.1 | 3.9 |

The following table collects a number of the cases modeled, and shows the following principles:

The relative velocity increases as the WDD size is increased.

For W=H=20 meters, the relative velocity increase in the lower part of the blades is more than 10%, but decrease in velocity can be observed near the WDD (smaller diameter blades are recommended).

The straight conic shape results in better performance than the contoured one.

A gain of up to 30% can be anticipated in the wind available power for very large WDD.

| Case | $D_{in}$ | W | H | $H_g$ | $H_{out}$ | $D_{out}$ | Shape | $D_b = 80$ | | $D_b = 60$ | |
|---|---|---|---|---|---|---|---|---|---|---|---|
| | | | | | | | | $H_b = 60$ | $H_b = 80$ | $H_b = 50$ | $H_b = 60$ |
| 3 | 10 | 10 | 10 | 7 | 150 | 200 | Contoured | 1.6 | 0.9 | 2.0 | 1.6 |
| 3a | 30 | 10 | 10 | 7 | 150 | 200 | Contoured | 4.7 | 3.1 | 4.8 | 5.0 |
| 4a | 30 | 10 | 10 | 7 | 150 | 200 | Straight (conic) | 5.1 | 3.3 | 6.0 | 5.1 |
| 4b | 30 | 5 | 10 | 7 | 150 | 200 | Straight (conic) | 6.3 | 3.0 | 8.5 | 5.8 |
| 4c | 30 | 20 | 10 | 7 | 150 | 200 | Straight (conic) | 6.1 | 3.9 | 7.3 | 6.0 |
| 5a | 30 | 5 | 5 | 7 | 150 | 200 | Straight (conic) | 2.2 | 1.3 | 2.7 | 3.9 |
| 6a | 30 | 20 | 20 | 7 | 160 | 240 | Straight (conic) | 8.6 | 7.6 | 21.7 | 9.8 |
| 6b | 60 | 20 | 20 | 7 | 160 | 280 | Straight (conic) | 12.7 | 16.0 | 29.0 | 14.1 |
| 7a | 20 | 15 | 10 | 7 | 150 | 200 | Straight (conic) | 4.0 | 2.7 | 5.2 | 4.0 |
| 7b | 20 | 15 | 20 | 7 | 150 | 200 | Straight (conic) | 4.4 | 5.5 | 13.0 | 7.1 |
| 8a | 10 | 20 | 10 | 7 | 150 | 200 | Straight (conic) | 3.4 | 1.9 | 4.4 | 3.2 |
| 8b | 10 | 20 | 20 | 7 | 150 | 200 | Straight (conic) | 2.7 | 4.0 | 0.1 | 6.6 |

-continued

| | | | | | | | $D_b = 30$ | | |
|------|----------|----|----|-------|----------|-----------|------------------|------------|------------|------------|
| Case | $D_{in}$ | W  | H  | $H_g$ | $H_{out}$| $D_{out}$ | Shape            | $H_b = 30$ | $H_b = 40$ | $H_b = 50$ |
| 7a   | 20       | 15 | 10 | 7     | 150      | 200       | Straight (conic) | 16.4       | 6.0        | 4.8        |
| 7b   | 20       | 15 | 20 | 7     | 150      | 200       | Straight (conic) | 126.3      | 27.7       | 8.1        |
| 8a   | 10       | 20 | 10 | 7     | 150      | 200       | Straight (conic) | −3.8       | 5.3        | 4.0        |
| 8b   | 10       | 20 | 20 | 7     | 150      | 200       | Straight (conic) | 0.0        | 0.0        | 7.6        |

The output numbers on the far right indicate the percentage increase in power available from the WDD. An algorithm can weight the factors involved to obtain an optimized design for each wind tower and turbine. For example, increased height and interior diameter are more consistent predictors of increased wind power than increased width or wind turbine center height. Since some of the results with changing variables such as width can actually result in decreased flow, the proper method is to determine the measurements and available space for each installation and machine type, and prepare a customized optimization by ideally first checking height and Din, and then the other parameters. Width would usually be the next variable for the WDD parameters.

Figure 19:
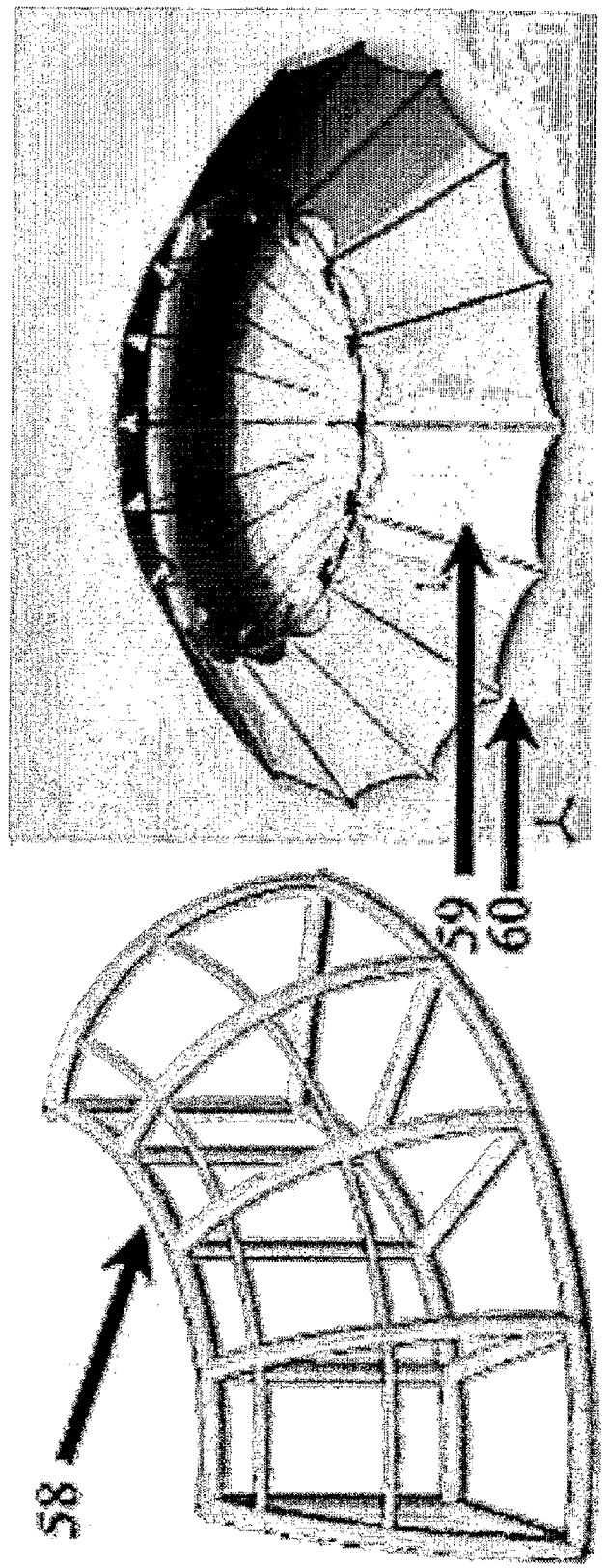
FIG. 19 is an illustration of methods of constructing an outer WDD.

The outer WDD device ideally consists of an attachment shell, and other structures or tarpaulins to complete the shape desired. FIG. 19 is an illustration of methods of constructing an outer WDD using a frame (58) with tarpaulins in a dome-shaped manner, or a more conically shaped frame attached to the ground (60) and tarpaulins (59).

Let us look at the numbers for an axisymmetric wind-deflection-device (WDD) composed of two parts, as in FIG. 7—a cylindrical part of height Hg and a conic part of height H. The WDD has a cylindrical inner hole of diameter Din. The maximal width of the WDD is W, so that the base diameter is therefore=Din+2W. The simulated wind turbine has a blade diameter of Db and center height of Tb. The wind velocity is along the Z direction and has a logarithm c profile (wind velocity is 10 m/s at a height of 10 meters). Therefore, the symmetry plane is at X=0.

Three configurations have been considered. Configuration A (28) has a straight side-surface, while configurations B have a convex side surface. Configuration B1 (29) has a larger slope in the inner part of the WDD, while configuration B2 (30) has a smaller slope and therefore the wind at the upper part of the WDD is directed more horizontally.

The details of the wind turbine modeled below are:
Model of the turbine: FLODA-600
Height of the blades at their lowest points from the ground: 12 m
Height of the tower: 30 m
Diameter of the blades: 36 m
The tower diameter: 2.5 m
Distance from the wind tower to the blades (horizontally): 1.5 m In the present simulations, Hg=0.5 or 3 m and several combinations of Din, H, and W have been considered for Configuration A. Since the tower is 2.5 m in diameter and the blades are 1.25 m away from it, the blades are at a distance of X=−2.75 m away of the center of the tower.

If larger power increase is required, Din should be increased and/or the shape of the WDD should be optimized. Two convex-shaped shape of the WDD have been considered in cases 6-8. In these cases (for the shapes considered), the estimated power increase is more than 14% —see Table II.

Wind Available Relative Power Increase Estimates (Configuration A)

| Case | $H_g$ | $D_{in}$ | W  | H   | X = −2.75 m | X = 0 m | X = 2 m | X = 3 m |
|------|-------|----------|----|-----|-------------|---------|---------|---------|
| 1    | 3     | 16       | 7  | 7   | 8.9         | 9.8     | 9.9     | 9.9     |
| 2    | 3     | 20       | 7  | 7   | 10.7        | 11.3    | 11.3    | 11.2    |
| 3    | 0.5   | 20       | 7  | 5.5 | 7.3         | 7.8     | 7.7     | 0.0     |
| 4    | 0.5   | 20       | 7  | 7   | 9.9         | 10.5    | 10.4    | 0.0     |
| 5    | 0.5   | 20       | 10 | 10  | 10.0        | 10.1    | 9.9     | 9.7     |

Wind Available Relative Power Increase Estimates (Configurations B)

| Case | Configuration | $H_g$ | $D_{in}$ | W | H | X = −2.75 m | X = 0 m | X = 2 m | X = 3 m |
|------|---------------|-------|----------|---|---|-------------|---------|---------|---------|
| 6    | B1            | 3     | 16       | 7 | 5 | 8.9         | 9.2     | 9.1     | 9.0     |
| 7    | B1            | 3     | 20       | 7 | 7 | 14.2        | 14.6    | 14.5    | 14.2    |
| 8    | B2            | 3     | 20       | 7 | 8 | 14.5        | 15.1    | 14.9    | 14.7    |

Note that power output appears, from the limited data shown here, partially related to total interior area. In Case 1, 7×16 is 0.8 of Case 2's 7×20, and the power output of Case 1 is about 0.8 of Case 2.

Now we proceed to a discussion of an inner doughnut WDD, which is basically a circulation FDD, because it can be much smaller, but exerts a powerful local effect on the turbine energy capture component, usually blades in the case of a wind turbine, but it can be any other device, way out of proportion to its size.

Figure 20:
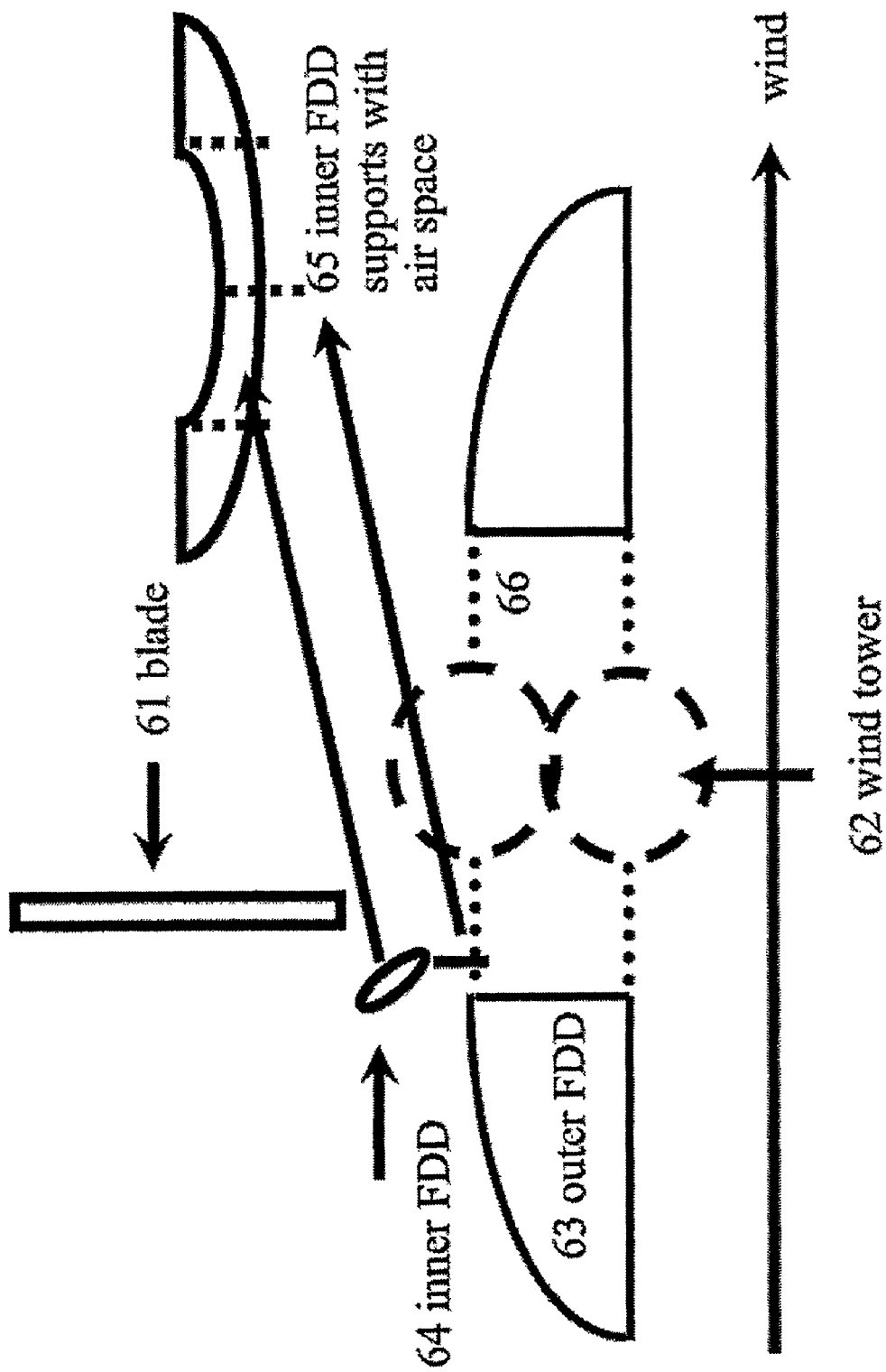
FIG. 20 is an illustration of an inner FDD added to an outer FDD frame.

FIG. 20 is an illustration of an inner FDD (64) added to an outer FDD (63) frame and shows one embodiment of their relationship. It shows that a WD can have an additional shape such as an airfoil to deflect more wind at higher speed into the blades. One preferred concept is to have two WDDs: ideally, one larger to accelerate a larger amount of flow, and a second one that is smaller and more precisely increases the flow. But they can be used independently as well. The circulation, inner FDD will be placed functionally adjacent to the blades (61), usually inferior to them and peripheral to them horizontally, and encircling the central support structure (62). The additional inner doughnut can be attached directly to the wind tower or to the WDD support structure adjacent to it (66), or both. Whatever kind of supports for the inner FDD are used, they should have air space beneath them (65).

Any of the shapes discussed can of course be applied to turbines placed in water. The percentage increase in power might be higher because the flow is already turbulent and the flow is usually slower.

Figure 21:
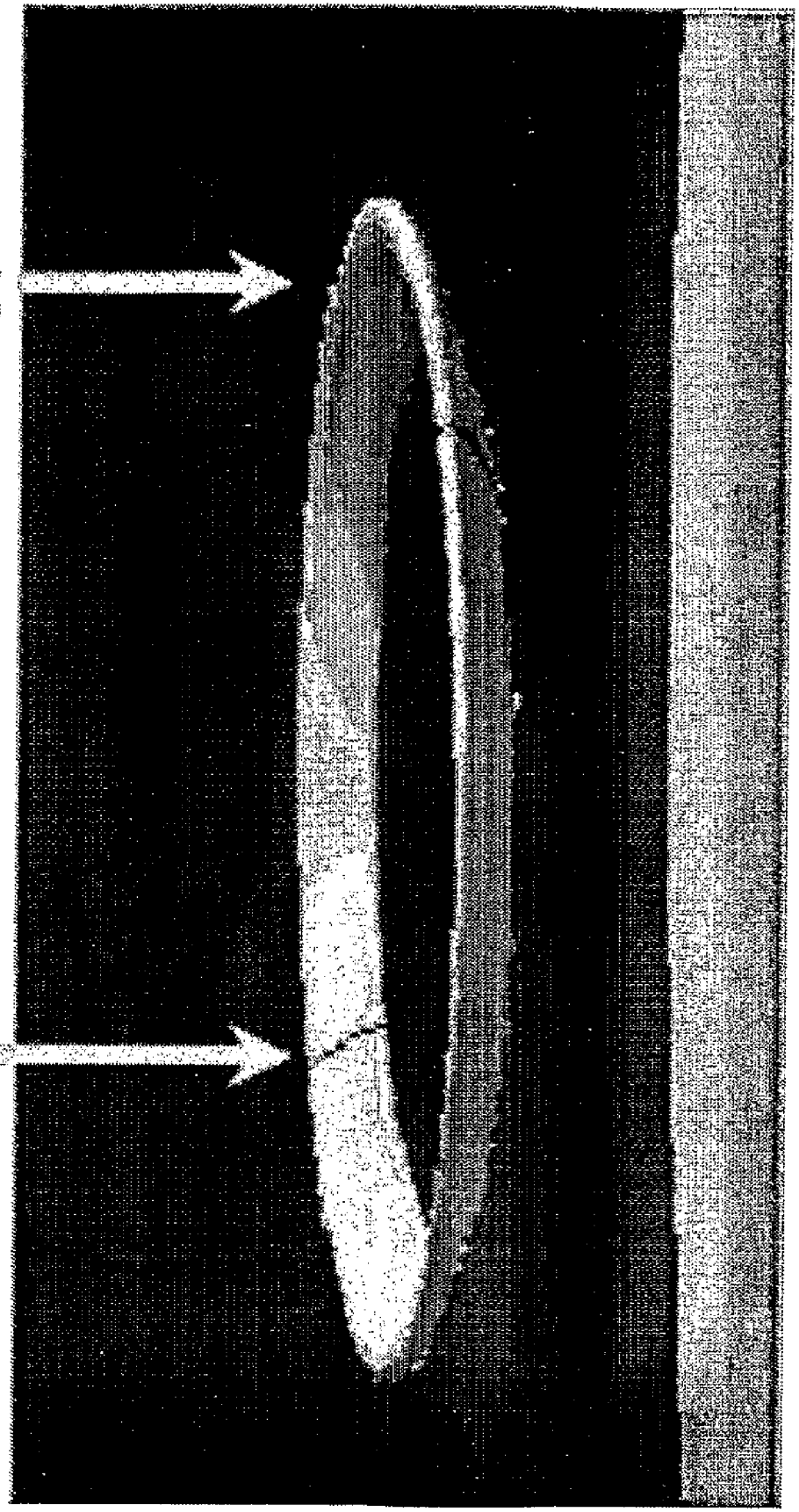
FIG. 21 is a 3D picture of an inner FDD.

FIG. 21 is a 3D picture of an inner FDD (67). This doughnut can also be an interrupted or partially interrupted structure, such as at point (68) to enable survival in high winds. It can also have pressure release mechanisms, or be an incomplete shape that is partially hollow or an outline.

Figure 22:
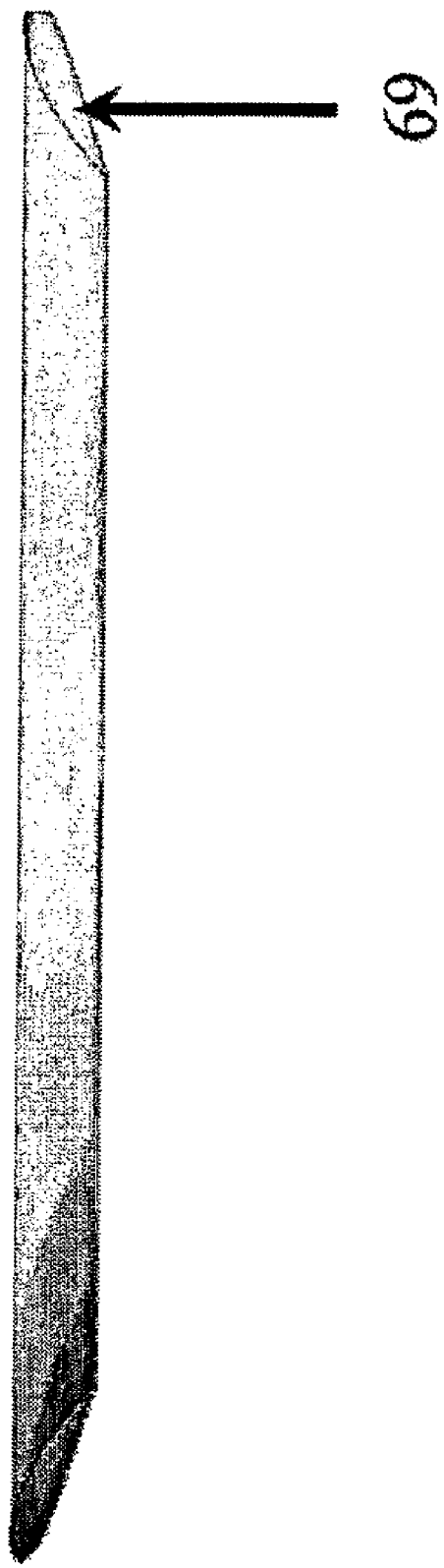
FIG. 22 is an illustration of an airfoil-shaped inner FDD.

FIG. 22 is an illustration of an airfoil-shaped inner FDD, (69) shows how the inner doughnut would look if it were an airfoil shape at an angle of attack.

The inner FDD was modeled using similar techniques to the outer one.

An axisymmetric wind-deflecting-device (WDD) with a diameter (between opposite points of the leading edge) of Din is used to deflect wind. Several yes of cross section have been considered in order to define parameters of the inner doughnut: a NACA 4424 airfoil, a NACA 4448 airfoil (that is twice as thick as the NACA 4424 airfoil), a circular cylinder, a one quarter segment of a circular cylinder, and outline shapes. The length (chord or diameter) of all the cross sections unless otherwise stated is 1 meter except the one-quarter circular cylinder that has a chord of 0.5 m.

FIG. 23 is a computer model of the effect of inner doughnut shape on wind velocity and shows the WDD with a NACA 4424 cross section (71). The chord of the airfoil is at an angle of 30 degrees to the ground (horizon). The angle of attack is 30°. The WDD is at a height of Hg above the ground. The simulated wind turbine has a blade diameter of Db=15.3 meters (50'), center height of Hb=25.09 meters (82') and the center of the turbine is at a distance of 2.45 meters away from the tower center (which is at X=Z=0). The symmetry plane is at X=0. The wind velocity is along the Z direction and has a logarithmic profile (wind velocity is 10 m/s at a height of 10 m). The highest velocity area is shown by point (70).

To visualize different ways of building the inner FDD, look at FIGS. 24-27. FIG. 24 is a 3D picture of the inner (4) and outer doughnuts (3) without specifying the attachment mechanism. FIG. 25 is an illustration of the inner FDD (72) not attached to the tower (73). Rather, a beam (74) goes from the inner FDD either to the outer FDD (75) or to the ground. FIG. 26 is an illustration of the inner FDD (76) attached to the tower (78) by at least one beam (77). FIG. 27 is an illustration of the inner FDD (80) attached by beam (81) both to the tower (79) and to a surrounding structure, whether the outer FDD or the ground.

Three cases with a NACA 4424 cross-section have been simulated (A1) Din=10 m, (A2) Din=6 m and (A3) Din=5.3 m. In addition, a case with NACA 4448 cross-section (twice as thick) and Din=6 m was modeled with an angle of attack of 10° (A4), 20° (A5), 30° (A6) and 40° (A7). The latter case was also solved for a chord length of c=2 m (instead of a chord of 1 m of the previous cases). In case A7a the maximal thickness was 0.96 m, while in case A7b the maximal thickness is 0.48 m, as in cases A4-A7. In all the cases the height of the inner part Hg is 15.5 meters and the maximal height of the WDD is approximately 16.05 meters. In addition, two cases with a circular cross section of a diameter of 1 meter are also modeled for $D_{in}$=6 and 7 m (A8 and A8a, respectively) and two cases with a one-quarter circular cylinder and $D_{in}$=6 and 7 m (A9 and A9a, respectively).

In order to evaluate the performance of the WDD of several sizes and shapes, the relative Z-velocity component increase is compared. It is defined as $$\Delta U = \frac{u - U_{in}}{U_{in}} (\text{in } \%),$$

where u is the calculated velocity in the presence of the WDD and $U_{in}$ is the wind velocity imposed at the inlet.

The available wind power P in a uniform wind of velocity $V_\infty$ is proportional to $V_\infty^3$, therefore, the relative increase in the wind available power can be approximated by $$\frac{\Delta P}{P} \approx 3\overline{\Delta U},$$

where $\overline{\Delta U}$ is the mean relative velocity increase (calculated by the integration of $\Delta U$ over the area swept by the simulated wind turbine blades), $\Delta P$ is the increase in the available power of the wind.

The table below presents the relative increase in the available wind power (%) for several cases and for several distances upstream of the tower center, although the blades are at a distance of 2.45 m. Obviously, there is an optimal WDD diameter for this turbine (Din≈6 m). The optimal cross section (among the configurations tested) is NACA 4448 airfoil at an angle of 40° and a Din of at least 6. Moving out to Din=10 meters can cause zones of higher velocity and power output, but the trick is to make them occur at the location of the blades. The circular cylinder cross-section (case A8) yields less gain, while the one-quarter cylinder is the worst. The reason is that the circular cylinder cross section results in a more local disturbance to the axial velocity than the airfoil cross section. Also, it seems that cross-sections with an abrupt downstream edge, as the one-quarter cylinder (case A9), should be avoided. Note that several outline cases were modeled. Outline structures will be discussed in more detail later, but here they seem to offer only approximately the same performance when optimal distances are compared, but they seem to require greater inner diameters, which can be a disadvantage under many circumstances. Note that increasing the size and the Din simultaneously results in very respectable performance in case A7c.

Wind Available Relative Power Increase (%) Estimates for the E15 Wind Turbines with Airfoil Cross-Section WDD.

Z=0 is the tower center and the wind turbine's blade center is at Z=−2.45 m

| Case | $D_{in}$ (m) | α(°) | Z (m) = | | | | |
|---|---|---|---|---|---|---|---|
| | | | −2.8 | −2.6 | −2.45 | −2.4 | −2.2 |
| A1 (NACA 4424) | 10 | 30 | 2.9 | 2.7 | 2.6 | 2.6 | 2.5 |
| A2 (NACA 4424) | 6 | 30 | 2.5 | 2.8 | 2.9 | 3.0 | 3.1 |
| A2a (NACA 4424), c = 2* | 6 | 40 | 2.8 | 3.1 | 3.2 | 3.3 | 3.5 |
| A3 (NACA 4424) | 5.4 | 30 | 2.0 | 2.3 | 2.5 | 2.5 | 2.7 |
| A3a (NACA 4424) | 10 | 40 | 4.7 | 4.6 | 4.5 | 4.5 | 4.3 |
| A4 (NACA 4448) | 6 | 10 | 3.0 | 3.2 | 3.1 | 3.1 | 2.9 |
| A5 (NACA 4448) | 6 | 20 | 3.4 | 3.6 | 3.5 | 3.5 | 3.4 |
| A6 (NACA 4448) | 6 | 30 | 3.5 | 3.7 | 3.7 | 3.7 | 3.6 |
| A7 (NACA 4448) | 6 | 40 | 3.6 | 3.8 | 3.8 | 3.8 | 3.9 |
| A7a (NACA 4448), c = 2** | 6 | 40 | 1.5 | 2.2 | 2.6 | 2.6 | 2.7 |
| A7b (NACA 4448) | 10 | 40 | 4.4 | 4.2 | 4.0 | 4.0 | 3.7 |
| A7c (NACA 4448), c = 2** | 10 | 40 | 11.1 | 11.0 | 10.9 | 10.8 | 10.7 |
| A8 (circular) | 6 | — | 1.5 | 2.0 | 2.3 | 2.4 | 2.4 |
| A8a (circular) | 7 | — | 2.7 | 2.6 | 2.5 | 2.4 | 2.2 |

-continued

| | | | | | | | |
|---|---|---|---|---|---|---|---|
| A9 (¼-circular) | 6 | — | 1.0 | 1.3 | 1.5 | 1.6 | 1.8 |
| A9a (¼-circular) | 7 | — | 1.7 | 1.9 | 2.0 | 2.0 | 2.0 |
| A10 (outline) | 6 | 0 | 0.9 | 1.2 | 1.3 | 1.3 | 1.5 |
| A11 (outline) | 6 | 0 | 2.3 | 2.5 | 2.7 | 2.7 | 2.7 |
| A11c (outline) | 6 | 30 | 2.8 | 3.1 | 3.3 | 3.3 | 3.4 |
| A12 (outline NACA 4448) | 6 | 30 | 2.9 | 3.2 | 3.4 | 3.4 | 3.6 |

| | | | Z (m) = | | | | |
|---|---|---|---|---|---|---|---|
| Case | $D_{in}$ (m) | α(°) | −5.75 | −5.5 | −5.25 | −5 | −4.75 | −4.5 |
| A1 (NACA 4424) | 10 | 30 | 3.9 | 4.5 | 4.8 | 4.9 | 4.9 | 4.7 |

The following table presents the drag and lift forces on the WDD as well as the moment relative to the center point of the tower on the ground.

| Case | Drag (Kg) | Lift (Kg) | Moment* (Kg-m) |
|---|---|---|---|
| A1 | 51 | 63 | 1162 |
| A2 | 35 | 28 | 710 |
| A3 | 23 | 5 | 441 |
| A4 | 9 | 20 | 164 |
| A5 | 23 | 53 | 274 |
| A6 | 23 | 40 | 411 |
| A7 | 29 | 32 | 513 |
| A8 | 12 | 0 | 186 |
| A9 | 25 | −26 | 394 |

*relative to the center of the tower on the ground

FIG. 28 is a computer model of the effect of a sphere (83) on wind velocity. Point (82) is the area of highest velocity superior to the sphere. As shown, half of the kinetic energy is sent below the sphere, where it is wasted FIG. 29 is a velocity graph comparing a foil (85) and a sphere (84) to illustrate the same point.

FIG. 30 is a computer model of the effect of a quarter sphere shape (87) on wind velocity. (86) indicates the areas of highest velocity. Note that the area below the quarter sphere (86a) actually causes greater acceleration than the area above (86). This fact leads one to consider the effect of outline FDDs without a volume. By doing so, we can also see that a structure need not necessarily have volume in order to be a useful FDD.

FIG. 31 illustrates two cases of outline FDDs. These consist of three parts. (88) is the arc, (89) is the straight line attached to one end of the arc, and (90) is the open space that they form between them. Point (90) is useful in referring to the directionality of such a "half-foil" structure.

FIG. 32 is a computer model of the effect of an outline the half-foil shape on wind velocity. (91) is a point of highest velocity; (92) is a point of lower but increased velocity. Note that the open face causes higher velocities than the closed space when one compares 91b to 91a and 92b to 92a. Note how far the moderate increase in velocity extends with 92b.

FIG. 33 is a large FDD structure outline. It shows how an outline structure can be successfully applied to large FDDs as well. (93) is the wind tower. The wind towards it passes over structure (94). If it makes a ring around the tower, in its ideal embodiment structure (95) would be part of the same system. They do not need to be physically connected, but ideally they are. A section (96) is inserted into the ground. Ideally, (96) is non-continuous. A section above it (98) inclines towards the wind tower. A section (97) parallel to the earth's surface extends towards the wind tower and completes the outline and barrier to the air traveling under the FDD.

FIG. 34 is a superior view of a wind tower and FDDs. It illustrates that FDDs for large wind or other flow sources can be partial rings that "enclose" the support structure and its energy capture equipment, and that the rings need not be circular. Part (99) is an example of a wind tower—or any structure holding any kind of energy capture machine. Part (100) is an FDD in a non-circular z-axis direction configuration that alters the flow into the machine attached to (99). We consider it for the sake of terminology to "surround" the energy capture structure and to be in a y axis as if it were curved, since it can surround the tower in a rough, non-circular pattern. In that sense, it is a ring, but this patent sometimes refers to it as a "non-ring." Part (102) is a partial ring that alters the flow into the area of part (101). One can remove part (99) from the picture and have one or more FDDs of various shapes providing flow into (101). The practical application could be different locations of real estate available to place the FDDs, and wind or current that consistently comes from one direction so that a full ring is not necessary.

FIG. 35 illustrates case 7b for the large wind turbine. Part (103) is the wind tower. Part (104) represents the blades connected to a hub (105) on the tower. Part (106) is a large obstacle FDD. (107) shows the area of the area swept by the blades that part (106) blocks. This is a concept that takes some rethinking. Ordinarily, one would NOT want to block the flow of fluid into the energy capture component, but a partial blockage using this configuration results in more of the velocity increase being directed into the area swept, as illustrated in FIG. 13 and parts (39, 40, 41). In FIG. 35, we see that the bottom area of the blade is 15 meters from the ground. The FDD starts at 7 meters of height, and rises another 20 meters, so that the area of the blades' diameter that is blocked is 12 out of 30 meters, yet the power increase from doing this is over 100% because it directs the flow to the most advantageous middle of the blade area.

FIG. 36 is an FDD whose superior view is basically rectangular. This is one embodiment; the point is that it is non-circular. This may be easier and cheaper to construct and should work almost as well as a completely circular ring, particularly if the arrangement is polyhedral. (107) and (110) represent one side of the FDD, and (109) and (111) represent the other. (108), (112), and (113) represent the triangular space that needs to be filled in to bridge the FDDs on each side. (108) need not be curved. The figure illustrates a foil shape, but such a shape is not required.

The difference between large WDDs and the small airfoil type WDDs is that the large ones do the job of obstructing the flow (decreasing net flow area), while the small doughnuts alter the flow velocity more locally. Consequently, for the large WDDs the exact location of the blades is much less sensitive than for the small (local-effect) WDDs. Moreover, the effect of large WDDs depends tremendously on the size of the WDD, while the size of the small WDD is of lesser importance (but their diameter is important).

The method of determining the shape of die outer doughnut-shaped WDD for any particular turbine includes the method of asking any of these questions in order to determine the best shape of the WDD:

Questions for Wind Turbine Enhancer Assessment
Please specify units (such as meters) in answers for complete clarity.
General:
Number of kilowatts produced per year by the turbine:
Average wind speed over the year:
What percentage of the time do the winds come from one direction only?

What is the local retail cost of electricity per kilowatt hour?
Turbine:
Brand and model:
Is it fixed in direction or does it turn to the wind?
Blade diameter:
Distance from ground to lowest point of blades:
Height of center of turbine from the ground:
Width of blades:
Diameter of wind tower (if it is a latticed steel tower, how many legs does it have, what is the space between them, and specifics on the placement of vertical and horizontal bars from the bottom to the top—a picture would be good, exact thickness of the bars):

Does the wind tower diameter vary at different points along the tower? If so, how?

Distance from outer edge of wind tower to the inner edge of the blades, horizontal distance:

Are there any essential objects or roads within a 50 meter radius from the turbine? (If so, please try to specify or diagram)

What is the geographical environment of the turbine? Is it in a flat area or on top of a hill? If it is on top of the hill, what is the slope on each side and for how far?

Please provide contact information for the manufacturer and your sales/service representative:

The next step after that is to determine the best shape of the WDD according to the height and width desired by the customer, and providing the customer with an estimate of the return on investment from different options. Part of the method involves assessing the layout of the surrounding land to see, for example, whether additional areas of height are possible beneath the turbine blades if the turbine is at the top of a hill. The method of requesting wind direction is to determine whether it is advantageous for the customer to fix the direction of the turbine, and construct a partially encircling turbine instead of a doughnut.

Surrounded Turbine

We have seen the effects of FDDs with axes at right angles to the flow into a turbine. Clearly, it would be much more efficient to surround a turbine with FDDs. The structure surrounding a set of propellers is referred to in the current invention as a surrounding ring, even if it is partial. We will use that term "shroud" occasionally in the claims to extend some of the inventions to their use in shrouds, but wish to emphasize that the current invention differs from previously described shrouds. The following discussion tends to be more applicable to smaller turbines as a matter of practical engineering, but there is no intention to exclude large ones from this approach.

FIG. 37 shows the parts of a small wind FDD surrounded by a "surrounding ring." Again, wind is used as an illustration; any type of fluid is equally applicable. Part (117) represents the leading edge, (116) the interior, and (115) the trailing edge, usually exterior of the present invention. This arrangement excludes Venturi tubes and flow collectors, in which the roles of (117) and (115) would be reversed. Even other inventions with a foil shape included are basically long collectors and diffusers. They operate by a simple application of Bernoulli's principle to concentrate the fluid flow and hence the velocity. Our concept is very different. By presenting a circulatory surface to the incoming fluid, we require only a small aerodynamic structure. Part (118) represents one embodiment of the current invention: small, hollow release points with the surrounding ring to diffuse the high pressure differential in cases of high wind.

FIG. 38 shows a way of constructing the release sites for a wind or other turbine requiring release of high pressure. (119) are the blades. (120) are the parts of the surrounding ring. Partial interruptions (121) in their connections enable release of air. We refer to this as a partially interrupted shape or foil or foil outline. This is unique to the current invention. The concept can also apply to the rings described before surrounding the supporting structures of turbines. Parts (122) are the locations where the surrounding ring parts are connected.

FIG. 39 shows one construction of a small wind turbine's surrounding ring. Of course the design can be varied for many reasons, particularly if the machine does not need to turn. An example of that would be placement of the machine made for water in a current always flowing in the same direction. (123) are the blades, (124) the nacelle or generator, and (125) represents a wind tower or other supporting structure. A cage (126) or set of wires or other structure is connected on one side to the nacelle or generator and on the other side (130) to the FDD surrounding ring (127). The cage in front both protects living things from the blades and enforces turbulent flow. Particularly if the tower is smooth, an attachment (128) to the tower can have a connection (129) to the cage or FDD (126, 127, 130, depending on the location) and help stabilize the FDD and cage. FIG. 39 is not drawn according to recommended dimensions, in order to show the structures.

FIG. 40 shows a central FDD on a small wind turbine with a surrounding ring (133). Part (131) is the central FDD located in the x-axis anterior to the hub. It covers only the central area of the blades (134) before they widen and twist. It can be attached either to the hub (135) or the cage (132).

FIG. 41 is a double propeller design. The idea is based on the fact that each set of propellers has a theoretical (67% according to Betz' Law) and practical maximum of energy that it can capture. The problem with locating a set of propellers close to each other is the vortices and irregular flow created by the blades. The concept here, ideally for use in situations where small turbines are used, and there is adequate space, is to obtain maximal power from the initial turbine's blades (138) using a surrounding ring (136) as discussed, and then use a second FDD (137) and a second set of blades (139), farther along the x-axis and more interior to the area swept by the first propeller blades, to capture more of the energy. One of the concepts is to use the second FDD surrounding ring to improve the otherwise choppy flow into the second set of blades. Part (140) is one embodiment of the cage that allows flow of the air around the first FDD. Part of (140) leading into the second set of blades (139) could also be a collecting tube with solid walls. The double turbine arrangement is likely to be most useful in situations of limited space, such as residential rooftop wind projects, where the wind consistently comes in one direction.

FIG. 42 is a picture of the geometry of a tilted airfoil in a surrounding ring. It ideally has an angle of attack (141). The leading edge (142) of the airfoil faces interiorly from all sides. (143) is the most interior position of the foil. The diameter of the interior of the foil is Db (diameter of the blades) plus two times Sp (the distance from the blades to the surrounding ring) on each side; the picture shows the radius of Db/2 plus Sp. In most cases for 2.5-meter diameter blades, the Sp is 2.5 centimeters. That is a good choice for a model because it allows some room for bending of the structures, particularly in high winds, without the blades scraping on the surrounding ring. In most cases of 10-meter diameter blades, we used an Sp of 5 centimeters. The flow diagrams show that the closer the location of the blades to the surrounding ring, the better.

FIG. 43 is a flow diagram of laminar and turbulent flow. The diagram shows that the high velocity area for laminar flow (144) is much less than the high velocity area for turbulent flow (145).

FIG. 44 is a diagram of one method of enforcing turbulent flow. (146) is a foil or other FDD. Simply attaching a wire (147) to the inside enforces the turbulence and increases the power gain. The enforcement of turbulent flow is known in other contexts, but the current invention is the first time the concept has been applied to energy capture turbines. We propose as a better embodiment the use of a thin wire anterior cage to simultaneously perform the function of protecting living things from the blades.

FIG. 45 is a picture of two outline foil models. We base the concept of using incomplete shapes and, ideally, incomplete foils in order to direct more of the velocity towards the turbine. FIG. 43 shows that there are substantial areas of high velocity flow outside of the surrounding ring in the upper areas of the picture above the foils. Creating an irregularity in the shape or foil on the side away from the area of the turbine's energy capture favors the flow into the turbine. The incomplete shape can be accomplished in many ways: surface breaks, hollowness, the use of an outline structure, etc. We favor outline structures because of lower cost of materials and their effectiveness. The current invention is the first to make use of is concept in energy capture. FIG. 45 shows two particularly successful outline models. Structure (148) is named a "Farb Foil" as one specific application of the concept. Its major feature is a surface shape that is complete on the two sides facing into the area of energy capture and continues at least to some degree onto the outside face of the structure without completing the structure. The model shown, referred to as F in the mathematical models that follow, shows the trailing edge (150) making a smooth turn at (151) and continuing smoothly onto the leading face (152) and smoothly rounding the corner (153) and stopping at point (154). The shape shown is basically an incomplete NACA 4448 airfoil, but the concept can be applied to any type of foil. (155) is the internal hollow space and is basically neutral. Ideally the area between (153) and (154) is very small in proportion to the chord-length of the foil, less than 10%, but an extension of (153)-(154) is compatible with the invention.

Structure (149) is an incomplete NACA 4448 foil that starts at trailing edge (156) and ends at point (157) before the second turn that returns to the leading edge.

Data to be presented later on show that outline structure (149) is extremely effective at close range, more so an the full airfoil, and that structure (148) is extremely effective at longer ranges from the structure.

FIG. 46 is a picture of some Farb Foil variants. Structure (158), oriented with the energy capture machine to the top, is optionally solid. Part (159) is the configuration already described. Part (160) makes a break in the smooth foil structure, and then 161 fills in the remainder. Ideally the Farb Foil can use any structure or foil with both a camber on the interior of the structure (163) and the exterior (166) as in structure (162). Part (164) is referred to as the face and (165) as the hook. There could be situations, such as on aircraft, where the Farb Foil could be moved into a different shape in flight by, for example, keeping side (167) basically the same as (163) and decreasing the thickness of the face by pushing down at point (168) and moving the hook forward to point (169). For use in aircraft, part (163) would be referred to as the upper camber and location (166) as the lower camber. The Farb foil as shown in structures (158) and (162) develops excellent vertical acceleration and could be used to make aircraft that require less runway space. Changing wing shape during flight—which could be accomplished in many ways—would allow adaptation to more horizontal flight as well.

FIG. 47 is a picture of two flow diagrams of outline foils. Both extend only from the trailing edge onto the face of the foil. Structure (170), which we saw before as structure (149), works well as a nearly complete or complete face, and not too well as a shape that contains little of the face (171). The outline, full-face foil is very successful at creating a large area of high velocity flow (172) immediately adjacent to its inner face. The equivalent area (173) for structure (171) is much smaller.

FIG. 48 is a flow diagram of a Farb Foil. It shows how the hook (174) helps direct die flow along the face (175) to a large area of high velocity from point (176) to (177) that is more vertically concentrated than structure (170), which has a more horizontally concentrated maximal flow. This shows why the Farb Foil is better for directing the particles of fluid into larger turbines and for more vertical flight.

FIG. 49 is a diagram of turbine blades adapted to the present invention. The increases in power output by the use of this invention's surrounding rings are quite large, and a different blade design would take better advantage of the new situation. Since the greatest velocity increase occurs at the periphery of the blades, they should be widened and flattened at the periphery. Part (178) is the hub of a blade and part (181) is the central line of the blade. The blade fans out, ideally to each side, along sides (179) and (180) so that the periphery (182) is much wider. This takes advantage of the variable velocity distribution due to the FDD. A method of manufacture of a turbine is to adjust the shape of the blade according to the velocity distribution caused by the FDD.

Since the increase in axial velocity is so great near the tips in this situation, the ideal blade design would be to twist the tips so that the outer portion is close to an angle of 90 degrees to the axial velocity and the innermost portion is close to zero degrees. Another method for adjusting the shape of the blades would be to take the ratio of the rotational to the anal velocity at each point and plan the twist of the blades accordingly.

FIG. 50 is a diagram of turbine blades with adaptations to a surrounding ring at the end. As larger sizes of turbines are used with FDDs, the risk of collision between the blades and the FDD increases. In addition, every centimeter that the blades can get closer to the high velocity region near the FDD makes a significant impact on the power captured, FIG. 50 presents some ways of handling this problem. Part (183) is the FDD as a surrounding ring. Blade one (184) shows how a sliding object such as a ball bearing (187) on the end of the blade could follow a track (189) in the surrounding ring. A partially embedded ball bearing (188) would work better. Blade one's example would likely cause more fluid dynamic interference than blade two (185), where the blade provides the track (190) and the sliding means such as a ball bearing (191), is on the surrounding ring. Blade three (186) provides another, more elegant alternative. Magnet sets on the blades (192) and on the surrounding ring (193) can help prevent collisions. In addition, coils in the surrounding ring (193) could enable production of electricity at that point.

FIG. 51 is a model of a small wind turbine tower assembly. It represents one embodiment Since the present invention is so successful in creating increased velocities, it increases the danger from high winds, particularly hurricanes and typhoons. Therefore, pressure release mechanisms such as those already described, can be crucial. An alternative is making wind towers that can be easily and quickly taken down and put up. The base (194) of the tower will contain optional add-ons for installation, such as an option of multiple points of attachment for better stability, a choice of screws of mild depth that can be installed in the ground or rooftop surface using a shovel, drill, and concrete, a plate with bolts, suction, and so on. Each option comes with the additional option of a horizontal surface extending from the legs of the base. That horizontal surface will provide space for weights and rocks that further stabilize the installation of the small wind turbine. The base (194) is attached to a first column (195) that supports the rest of the turbine. The base has optional extenders (196) that can snap into different lengths. All parts of the base have holes (198) for inserting bolts at regular intervals, and the extenders attach to an outlying base (197) that spreads the base over a greater area and has bolts (198). For outdoor installations, an outlying base has the option of screws (199) that enter the earth and can be fixated with cement. The outlying base can be of various sizes. The preferred method is to place heavy weights on them in order to provide additional stability. The stand has a levering means (200) connected to a second stand (201), which holds the turbine (202), its blades (203), and its cage. As the turbine is hoisted into position, it has means to lock at the correct point and to be released as needed. Each stand has a means (204) for jacking up the stand to obtain greater elevation.

FIG. 52 is a diagram of a wind tower (205) attached to a hydraulic pump (209). A joint (208) enables an upper structure (206) to be quickly raised and lowered in relation to a lower structure (207).

FIG. 53 is a picture of a retractable wind tower. (210) is the energy machine attached to a tower (211), which can descend into a hollow tube (212) [or a hollow tower around a solid tube] and can have means (213) for loosening and tightening. There can be optional side supports (214) for the structure.

FIG. 54 is a 3D model of an inner FDD cascade (215). We found that a group of structures that use airfoils and are separated both horizontally and vertically work no better than a single foil located near the blades of a large wind turbine. This confirms the hypothesis that the smaller, internal "doughnut" around a large wind turbine works by a circulatory, not a blocking effect so that multiple ones interfere with each other.

FIG. 55 is a computer model of the effect of a closely clustered inner FDD cascade on wind velocity. The area of highest velocity (216) is not improved by the areas of increased velocity below adjacent to the lower foils.

The method of placing the surrounding ring and the turbine blades in relation to each other to take advantage of the maximum power predicted by modeling is unique to this invention.

FIG. 56 shows the concept of adding flow velocities to make a flow map. (217) and (218) are exactly the converse of each other with the same outline foil shape. With the smooth end facing the inside on all sides they make a surrounding ring (219). In general, the highest velocity region (220) will be directly adjacent to the inner surface of the foil and the lowest velocity region (221) will be in the center. The higher velocity region has been arbitrarily for the purpose of illustration assigned a velocity increase of 100%.

FIG. 57 is a picture of the relationship of flow velocities to blade shape. The numbers shown are illustrative only. (221) is the surrounding ring. Several areas of fluid velocity are shown from the highest to the lowest from the periphery to the center (222, 223, 224, 225). This data helps us construct the blade (226) that is appropriate for this particular configuration of FDD and blade. As an example of the process only, (227) shows the width of the blade located in region (225). The blade width is doubled at point (228) because it is located in region (224) with a velocity twice that of region (225). The effect is to enable the blades to obtain maximal advantage from the use of the FDD and capture the energy where it is greatest.

FIG. 58 is a radial velocity distribution for a 4448 foil outline.

FIG. 59 is a radial velocity distribution for a Farb foil.

Figure 60:
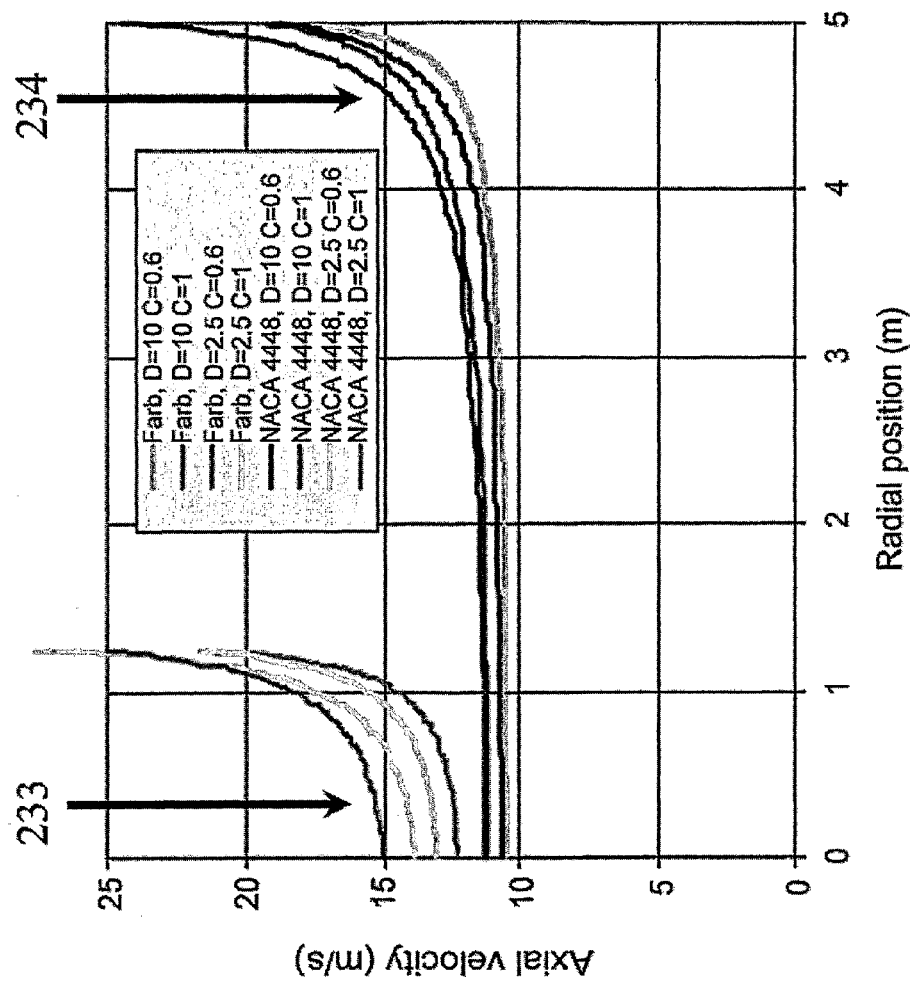
FIG. 60 is graph of velocity by radial position for several FDDs.
Figure 61:
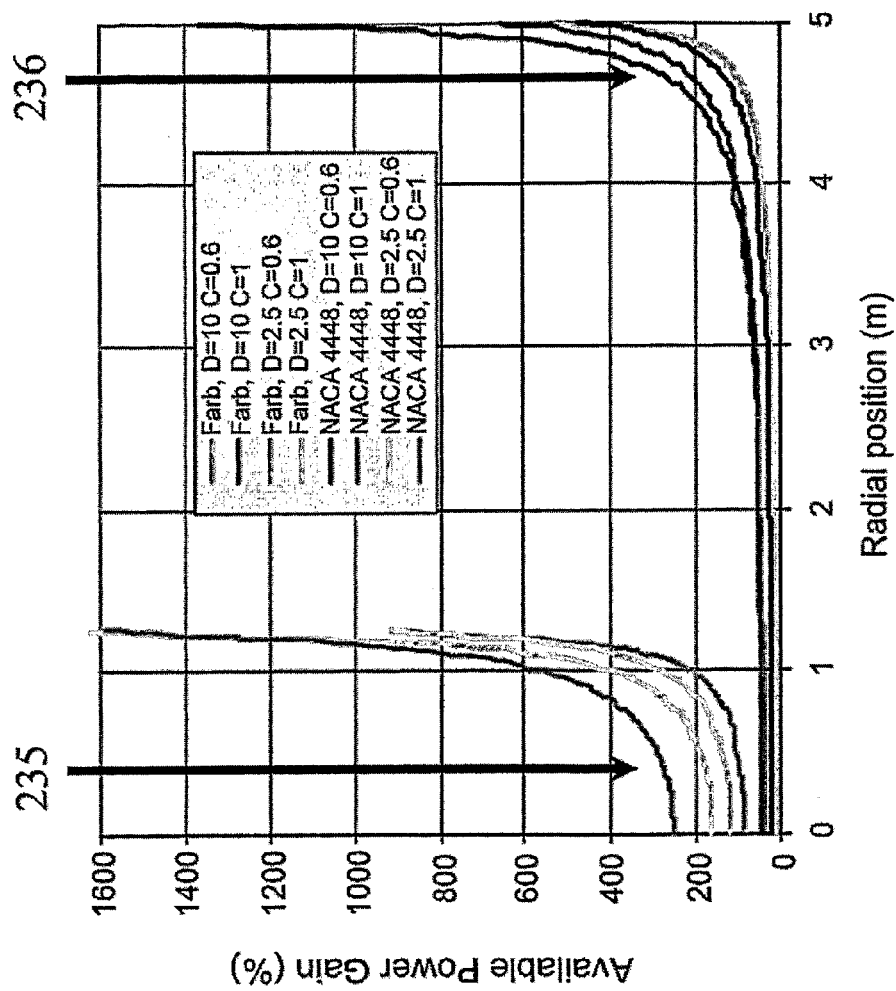
FIG. 61 is graph of power output by radial position for several FDDs.

Graphs (229, 230, 231, 232) all show a sharp increase in velocity close to the area of the FDD. This indicates that, ideally, the blades should fan out close to the periphery, FIG. 60 is graph of velocity by radial position for several FDDs. It shows the cases that will be calculated below. It shows the NACA foil outline (233) as best at short range and the one-meter Farb foil (234) at longer range. FIG. 61 is graph of power output by radial position for several FDDs. It shows the NACA foil outline (235) as best at short range and the one-meter Farb foil (236) at longer range. It shows clearly how important the periphery of file blades is for the effect.

FIG. 62 is a picture of a vertical axis turbine. FDDs have not been proposed before for vertical axis turbines. (237) is the turbine, (238) represents the blades, which do not need to be in the shape shown, and (239) the vertical axis. An FDD (240) can be located inferiorly as shown or superiorly, or as a partial or complete ring with a vertical axis, attached to the turbine or not. An FDD (241) can be located on a side, as shown, or on both sides, or as a partial or complete ring with a horizontal axis. Parts (240) and (241), to various extents, can coexist.

What are the results of modeling the configurations shown? We first show some results from modeling a NACA 4424 airfoil surrounding a turbine to demonstrate the power output for that configuration and to demonstrate the effects of laminar and turbulent flow. The enclosure is axisymmetric. Its cross-section has a NACA 4424 airfoil shape scaled linearly so that its chord is 60 cm and maximal thickness 20 cm. The airfoil was placed at a negative angle of attack (alpha) of (i) −10°, (ii) −20° and (iii) −30'. (This orientation is the same throughout the surrounding ring. Calling it negative is just the orientation as used here in some of the pictures. It is of course positive from the opposite side of the surrounding ring.) The diameter of the blades is assumed to be Db=2.5 m and the smallest diameter is 2.5 m+2×2.5 cm (Sp=2.5 cm where Sp is the distance from the blades to the enclosure).

The Reynolds number, based on the chord, is $Re \approx 4 \cdot 10^5$, i.e. the flow is transitional and unsteady. Therefore, in each one of the cases both laminar and turbulent flows were calculated.

The estimated available wind power gain is listed in the table below for several possible positions of the blades relative to the leading edge of the enclosing foil. Turbulent flow results in better gain and therefore, flow should be enforced to be turbulent, e.g., by means such as adding wires on the surrounding ring.

It should be noted that the large axial velocity increase near the surrounding ring may require modification of the design of the blades to utilize the available wind power gain.

Available Wind Power Gain (%) Dependence on the Axial Location ($X_b$)

| | $X_b$ (m) = | | | | | | |
| --- | --- | --- | --- | --- | --- | --- | --- |
| | −0.4 | 0 | 0.15 | 0.25 | 0.35 | 0.5 | 0.65 |
| α = −10°, Laminar | 12 | 50 | 93 | 84 | 66 | 48 | 32 |
| α = −10°, Turbulent | 24 | 83 | 142 | 128 | 97 | 62 | 42 |
| α = −20°, Laminar | 8 | 48 | 84 | 79 | 76 | 68 | 47 |
| α = −20°, Turbulent | 34 | 118 | 182 | 152 | 120 | 88 | 61 |
| α = −30°, Laminar | 10 | 66 | 101 | 86 | 75 | 55 | 41 |
| α = −30°, Turbulent | 46 | 168 | 234 | 183 | 149 | 111 | 77 |

Note that the power increases are quite significant at the right location, right angle of attack, and turbulent flow. In this model, optimal placement is at approximately 25% of chord length from the leading edge.

Is a full airfoil really the best configuration? We found that a shape with smooth edges is important in maintaining maximal performance. This is well known from experience in airfoils.

The surrounding ring in the following model is axisymmetric. Its cross-section is built of a non-airfoil shape, composed of a circular arc (90°) and a straight section. The radius of the circular arc is 40 cm. The chord length (from leading to trailing edges) is 1 meter. The diameter of the blades is $D_b$=2.5 meters and the spacing between the imaginary blade tips and the surrounding ring is $S_p$=2.5 cm. in two cases (Cases 1 & 2) and 17.5 cm. in one case (Case 3) with the aim of maximizing the available wind power gain.

The far-field wind velocity is 10 m/s. The Reynolds number, based on the chord is $Re \approx 6 \cdot 10^5$, and therefore turbulent flow is modeled using the Reynolds stress model. The axial velocity component distribution and the available wind power gain for each one of the three cases are shown below for the three cases and for various placements of the surrounding ring relative to the imaginary blades. Note that the results are much better when using a foil, but that Case 3 shows that the non-foil shape has a certain ability to direct the velocity gain at a greater distance from the surrounding ring. This also shows that about half the effect is the surface effect.

Available Wind Power Gain (%) Dependence on the Axial Location ($X_b$; $X_b$=0 is at the Leading Edge)

| | $X_b =$ | | | | | | | | | | |
|---|---|---|---|---|---|---|---|---|---|---|---|
| | −0.4 | 0 | 0.15 | 0.25 | 0.35 | 0.40 | 0.45 | 0.50 | 0.60 | 0.65 | 0.75 |
| Case 1 | −26 | −8 | 18 | 44 | 67 | 67 | 57 | 50 | 42 | 39 | 35 |
| Case 2 | −11 | 31 | 64 | 75 | 80 | 80 | 80 | 79 | 76 | 74 | 67 |
| Case 3 | −2 | 35 | 66 | 86 | 101 | 105 | 109 | 110 | 108 | 103 | 89 |

Using the information above, we constructed some incomplete shapes and found that outline, incomplete airfoil shapes have excellent and sometimes better performance than the complete airfoil. Types C and F as shown in the drawings of FIG. 45 perform the best—C for close contact below 10 meters, and larger sizes of F for 10 meters and above. The incomplete foils have the additional advantages of lighter weight and lower material costs.

First here is the data for the use of a regular NACA 4448 foil. (We modeled foils of lesser thickness such as the 4424 and found them not to work as well.) All these cases use a chord of 0.6 meters except for a case with chord cal meter. With higher angles of attack at 0.6 meters, the optimal location is at around 25% of chord length and the 30% angle of attack works best.

| NACA 4448 | | | | | | | |
|---|---|---|---|---|---|---|---|
| $D_{in}$ (m) = | | | | | | | |
| | | | | | | | 10 |
| | | | | | | 10 | (c = 1 |
| X (m) = | 10 −0° | 2.5 −30° | 2.5 −40° | 5 −30° | $S_p$ = 2.5 cm −30° | $S_p$ = 17.5 cm −30° | m) −30° |
| −0.40 | 5 | 40 | 34 | 36 | 19 | 21 | 51 |
| 0.00 | 14 | 147 | 141 | 88 | 40 | 36 | 82 |
| 0.05 | 18 | 186 | 180 | 106 | 47 | 38 | 91 |
| 0.15 | 26 | 255 | 226 | 135 | 59 | 41 | 114 |
| 0.25 | 28 | 215 | 184 | 119 | 53 | 42 | 128 |
| 0.35 | 22 | 161 | 149 | 96 | 46 | 40 | 121 |
| 0.40 | 19 | 142 | 138 | 88 | 44 | 39 | 112 |
| 0.45 | 17 | 125 | 128 | 81 | 41 | 37 | 104 |
| 0.50 | 15 | 110 | 119 | 75 | 39 | 36 | 96 |
| 0.55 | 13 | 95 | 110 | 69 | 37 | 34 | 90 |
| 0.60 | 12 | 81 | 101 | 63 | 34 | 33 | 85 |
| 0.65 | 11 | 68 | 92 | 57 | 32 | 31 | 80 |
| 0.75 | 9 | 46 | 74 | 45 | 27 | 28 | 73 |

Now we see that the quarter cylinder and line discussed earlier does not work as well, even though the cases shown are performed with a one meter length:

| | Quarter cyl + line Cross-section | | | |
|---|---|---|---|---|
| | A | B | B | B |
| | $D_{in}$ (m) = | | | |
| X (m) = | 2.5 −0° | 2.5 −0° | 10 −0° | 2.5 −30° |
| −0.40 | −26 | 5 | 10 | −31 |
| 0.00 | −8 | 51 | 24 | 5 |
| 0.05 | −2 | 63 | 26 | 21 |
| 0.15 | 18 | 89 | 33 | 38 |
| 0.25 | 44 | 114 | 38 | 47 |
| 0.35 | 67 | 131 | 42 | 54 |
| 0.40 | 67 | 136 | 44 | 56 |
| 0.45 | 57 | 139 | 45 | 57 |
| 0.50 | 50 | 140 | 45 | 58 |
| 0.55 | 45 | 139 | 45 | 59 |
| 0.60 | 42 | 136 | 45 | 59 |
| 0.65 | 39 | 131 | 44 | 58 |
| 0.75 | 35 | 117 | 41 | 53 |

However, certain outline shapes perform even better than a regular 4448 foil.

| | | | Cross-section | | | | | |
|---|---|---|---|---|---|---|---|---|
| | C | C | C (c = 0.6 m) | C (c = 0.6 m) | F (c = 0.6 m) | F (c = 0.6 m) | F | F |
| | | | | $D_{in}$ (m) = | | | | |
| X (m) = | 2.5 −30° C | 10 −30° C | 2.5 −30° (c = 0.6 m) | 10 −30° (c = 0.6 m) | 2.5 −30° (c = 0.6 m) | 10 −30° (c = 0.6 m) | 2.5 −30° F | 10 −30° F |
| −0.4 | 100 | 48 | 57 | 31 | 40 | 23 | 61 | 63 |
| 0.0 | 289 | 88 | 182 | 56 | 148 | 45 | 212 | 63 |
| 0.1 | 408 | 111 | 272 | 69 | 238 | 57 | 313 | 130 |
| 0.2 | 539 | 125 | 291 | 72 | 224 | 57 | 442 | 153 |
| 0.3 | 565 | 125 | 233 | 67 | 173 | 50 | 392 | 146 |
| 0.4 | 477 | 114 | 195 | 63 | 143 | 46 | 307 | 128 |
| 0.5 | 387 | 105 | 169 | 59 | 118 | 42 | 251 | 112 |
| 0.6 | 329 | 101 | 144 | 55 | 93 | 39 | 214 | 101 |
| 0.7 | 287 | 97 | 120 | 51 | 71 | 36 | 185 | 92 |
| 0.8 | 253 | 94 | 97 | 46 | 52 | 33 | 160 | 84 |
| 0.9 | 222 | 91 | 76 | 41 | 38 | 30 | 134 | 78 |
| 1.0 | 191 | 87 | 59 | 36 | 28 | 27 | 111 | 72 |
| 1.2 | 132 | 76 | 34 | 30 | 15 | 22 | 69 | 60 |

The table shows that partial foil of shape C outperforms a full foil at close range. Compare the 291% power gain above with the earlier, equivalent case of the full foil at 255% for 0.6 meter chord length and Din=2.5 meters. Note that the point of optimal power is now a little closer to 33% of chord length than the 25% before, probably optimal at around 29%. The chord length of 1 meter raises the increased power to 565% in the ideal configuration, which is also a little less than 30% of chord length.

Shape F demonstrates excellent but not ideal performance at 2.5 meters. However at Din=10 meters for a 1 meter chord length, the results with shape F are clearly superior (153%). Shape F results in a more vertical dispersion of increased velocity, as the flow pictures show. That also provides the advantage of moving the increased velocity closer to the leading edge; in the data above, that is 20% of chord length from the leading edge.

The following table makes the data easy to compare:

| Structure | chord length in m | Din in m | Sp in cm | an-gle | max power | X at max power in m best |
|---|---|---|---|---|---|---|
| NACA 4448 outline C | 1 | 2.5 | 2.5 | 30 | 565 | 0.3 * |
| Farb Foil outline F | 1 | 2.5 | 2.5 | 30 | 442 | 0.2 |
| NACA 4448 outline C | 1 | 10 | 5 | 30 | 125 | 0.25 |
| Farb Foil outline F | 1 | 10 | 5 | 30 | 153 | 0.2 * |
| NACA 4448 | 1 | 10 | 5 | 30 | 128 | 0.25 |
| NACA 4448 outline C | 0.6 | 2.5 | 2.5 | 30 | 291 | 0.2 * |
| Farb Foil outline F | 0.6 | 2.5 | 2.5 | 30 | 238 | 0.2 |
| NACA 4448 | 0.6 | 2.5 | 2.5 | 30 | 255 | 0.15 |
| NACA 4448 outline C | 0.6 | 10 | 5 | 30 | 72 | 0.2 * |
| Farb Foil outline F | 0.6 | 10 | 5 | 30 | 57 | 0.1 |
| NACA 4448 | 0.6 | 10 | 5 | 30 | 59 | 0.15 |

This power gain data is based on raw data from the velocity distribution, as in the following table for the NACA 4448 outline foil. Odd-numbered columns are the radial distance and even-numbered columns are the velocity for different FDD configurations, with 10 meters per second as the general wind speed outside the system. NACA 4448 outline foil

| D = 2.5 C = 0.6 | | D = 10 C = 0.6 | | D = 2.5 C = 1 | | D = 10 C = 1 | |
|---|---|---|---|---|---|---|---|
| 0 | 13.1019 | 0 | 10.726 | 0 | 15.0473 | 0 | 11.124 |
| 0.044249 | 13.103 | 0.16642 | 10.7266 | 0.044433 | 15.0488 | 0.151029 | 11.1244 |
| 0.087986 | 13.1102 | 0.201798 | 10.7271 | 0.08853 | 15.06 | 0.301825 | 11.1272 |
| 0.130974 | 13.1232 | 0.321063 | 10.7286 | 0.132071 | 15.0796 | 0.452582 | 11.1323 |
| 0.173069 | 13.1406 | 0.454931 | 10.7311 | 0.174796 | 15.1039 | 0.602773 | 11.139 |
| 0.214191 | 13.1622 | 0.583574 | 10.7343 | 0.21645 | 15.1349 | 0.746305 | 11.1467 |
| 0.254397 | 13.1882 | 0.712385 | 10.7385 | 0.257185 | 15.1716 | 0.880032 | 11.1553 |
| 0.26602 | 13.1974 | 0.841239 | 10.7435 | 0.273772 | 15.1888 | 1.00809 | 11.1653 |
| 0.293895 | 13.2193 | 0.96905 | 10.7492 | 0.297656 | 15.213 | 1.13293 | 11.1767 |
| 0.33301 | 13.2555 | 1.09491 | 10.7557 | 0.339008 | 15.2615 | 1.25513 | 11.1891 |
| 0.333086 | 13.2555 | 1.21825 | 10.7631 | 0.384565 | 15.3331 | 1.37458 | 11.2025 |
| 0.372074 | 13.2948 | 1.33879 | 10.7712 | 0.392962 | 15.3486 | 1.491 | 11.2174 |
| 0.41151 | 13.3422 | 1.45629 | 10.78 | 0.438657 | 15.4268 | 1.60416 | 11.2338 |
| 0.448936 | 13.3959 | 1.57055 | 10.7898 | 0.439324 | 15.4278 | 1.71409 | 11.251 |
| 0.478183 | 13.4418 | 1.6816 | 10.8004 | 0.470739 | 15.4884 | 1.82091 | 11.2692 |
| 0.485738 | 13.4523 | 1.78966 | 10.8117 | 0.491985 | 15.5359 | 1.92476 | 11.2888 |

-continued

| D = 2.5 C = 0.6 | | D = 10 C = 0.6 | | D = 2.5 C = 1 | | D = 10 C = 1 | |
| --- | --- | --- | --- | --- | --- | --- | --- |
| 0.502825 | 13.475 | 1.89057 | 10.8231 | 0.500198 | 15.5544 | 2.02583 | 11.3097 |
| 0.51407 | 13.4914 | 1.89492 | 10.8236 | 0.534678 | 15.6306 | 2.12426 | 11.3316 |
| 0.545206 | 13.547 | 1.99755 | 10.8361 | 0.536544 | 15.635 | 2.22018 | 11.3543 |
| 0.559684 | 13.5778 | 2.0975 | 10.8495 | 0.578819 | 15.7485 | 2.31369 | 11.3783 |
| 0.584142 | 13.6314 | 2.19485 | 10.8638 | 0.580078 | 15.7524 | 2.40486 | 11.4038 |
| 0.620666 | 13.722 | 2.28967 | 10.8788 | 0.621545 | 15.8855 | 2.49374 | 11.4307 |
| 0.625943 | 13.7346 | 2.38203 | 10.8944 | 0.631222 | 15.9177 | 2.5804 | 11.4588 |
| 0.651944 | 13.7944 | 2.47201 | 10.9109 | 0.66015 | 16.0178 | 2.66487 | 11.4881 |
| 0.680251 | 13.8664 | 2.55961 | 10.9288 | 0.68037 | 16.0937 | 2.74722 | 11.5188 |
| 0.713146 | 13.9664 | 2.64478 | 10.9476 | 0.693675 | 16.1446 | 2.82752 | 11.5511 |
| 0.718332 | 13.9844 | 2.72744 | 10.9669 | 0.723469 | 16.2669 | 2.90582 | 11.5849 |
| 0.758074 | 14.1218 | 2.80754 | 10.9872 | 0.730425 | 16.2987 | 2.98213 | 11.6197 |
| 0.760385 | 14.13 | 2.88533 | 11.0087 | 0.751347 | 16.3944 | 3.05642 | 11.656 |
| 0.791103 | 14.2412 | 2.9613 | 11.0311 | 0.778894 | 16.536 | 3.12879 | 11.6942 |
| 0.827727 | 14.4134 | 3.03594 | 11.0549 | 0.794168 | 16.622 | 3.17621 | 11.7212 |
| 0.849826 | 14.5368 | 3.10935 | 11.0802 | 0.806275 | 16.6894 | 3.19943 | 11.7344 |
| 0.861933 | 14.6033 | 3.18107 | 11.1073 | 0.833254 | 16.8529 | 3.26847 | 11.776 |
| 0.891541 | 14.7673 | 3.25017 | 11.1353 | 0.859599 | 17.0282 | 3.33585 | 11.8188 |
| 0.916661 | 14.9249 | 3.31682 | 11.1638 | 0.873914 | 17.1316 | 3.40156 | 11.8636 |
| 0.938159 | 15.077 | 3.3821 | 11.1945 | 0.88506 | 17.2105 | 3.46574 | 11.9108 |
| 0.9404 | 15.0948 | 3.4474 | 11.2288 | 0.909771 | 17.4063 | 3.52852 | 11.9602 |
| 0.958035 | 15.2298 | 3.45471 | 11.233 | 0.933467 | 17.6197 | 3.58953 | 12.0114 |
| 0.970659 | 15.3158 | 3.51431 | 11.2662 | 0.956142 | 17.8449 | 3.64795 | 12.0636 |
| 0.981854 | 15.4055 | 3.58433 | 11.3083 | 0.977829 | 18.0788 | 3.70337 | 12.1166 |
| 0.992127 | 15.4929 | 3.65663 | 11.3573 | 0.9986 | 18.3211 | 3.72315 | 12.1367 |
| 1.01731 | 15.7638 | 3.68286 | 11.3776 | 1.01337 | 18.5082 | 3.75617 | 12.1701 |
| 1.04246 | 16.072 | 3.72642 | 11.4104 | 1.01856 | 18.5732 | 3.80634 | 12.2236 |
| 1.06415 | 16.3494 | 3.75507 | 11.4352 | 1.0378 | 18.8395 | 3.85617 | 12.2792 |
| 1.08396 | 16.6412 | 3.79788 | 11.4721 | 1.05637 | 19.1277 | 3.90934 | 12.3421 |
| 1.10252 | 16.9513 | 3.85384 | 11.5239 | 1.0743 | 19.4365 | 3.97012 | 12.4255 |
| 1.12023 | 17.2826 | 3.86851 | 11.5379 | 1.09163 | 19.7615 | 4.02874 | 12.5205 |
| 1.1344 | 17.581 | 3.93089 | 11.6023 | 1.1084 | 20.1036 | 4.03779 | 12.5331 |
| 1.13735 | 17.6419 | 3.93749 | 11.6095 | 1.12462 | 20.4661 | 4.0794 | 12.59 |
| 1.15401 | 18.0338 | 3.99886 | 11.6803 | 1.14031 | 20.8522 | 4.09699 | 12.6195 |
| 1.17009 | 18.4646 | 4.00272 | 11.685 | 1.15551 | 21.264 | 4.14541 | 12.7075 |
| 1.18554 | 18.9356 | 4.06096 | 11.7608 | 1.17023 | 21.7049 | 4.15003 | 12.7154 |
| 1.20031 | 19.4523 | 4.0622 | 11.7625 | 1.18446 | 22.1761 | 4.20294 | 12.8129 |
| 1.21444 | 20.0292 | 4.1122 | 11.8358 | 1.19822 | 22.6824 | 4.21031 | 12.8279 |
| 1.22804 | 20.6968 | 4.12789 | 11.861 | 1.21158 | 23.2238 | 4.25078 | 12.9107 |
| 1.23349 | 21.0149 | 4.16034 | 11.9137 | 1.21723 | 23.4904 | 4.28672 | 12.9932 |
| 1.24127 | 21.4399 | 4.19897 | 11.9818 | 1.22471 | 23.8364 | 4.2975 | 13.0181 |
| 1.25 | 21.6202 | 4.20882 | 11.9991 | 1.23778 | 24.5393 | 4.34581 | 13.1476 |
| ) | | 4.25894 | 12.0977 | 1.25 | 24.9805 | 4.36126 | 13.1894 |
| | | 4.2678 | 12.1168) | | | 4.38709 | 13.2589 |
| | | 4.31084 | 12.2144 | | | 4.41821 | 13.3439 |
| | | 4.32793 | 12.2566 | | | 4.4326 | 13.3888 |
| | | 4.36265 | 12.3454 | | | 4.44769 | 13.4362 |
| | | 4.38113 | 12.3966 | | | 4.47666 | 13.5375 |
| | | 4.41206 | 12.4857 | | | 4.50365 | 13.6352 |
| | | 4.42939 | 12.5396 | | | 4.52927 | 13.734 |
| | | 4.45816 | 12.6333 | | | 4.55414 | 13.8371 |
| | | 4.47381 | 12.6883 | | | 4.57845 | 13.9458 |
| | | 4.50104 | 12.7886 | | | 4.60232 | 14.0613 |
| | | 4.51482 | 12.843 | | | 4.62583 | 14.1813 |
| | | 4.54095 | 12.9511 | | | 4.6489 | 14.309 |
| | | 4.55283 | 13.0035 | | | 4.65571 | 14.3507 |
| | | 4.57827 | 13.1209 | | | 4.67086 | 14.4437 |
| | | 4.5884 | 13.1707 | | | 4.69123 | 14.5751 |
| | | 4.61343 | 13.2997 | | | 4.71059 | 14.7075 |
| | | 4.62212 | 13.3474 | | | 4.72948 | 14.8461 |
| | | 4.64666 | 13.4887 | | | 4.74802 | 14.9933 |
| | | 4.65459 | 13.5371 | | | 4.76617 | 15.1491 |
| | | 4.67806 | 13.6876 | | | 4.78388 | 15.3134 |
| | | 4.68645 | 13.7452 | | | 4.80113 | 15.4862 |
| | | 4.70793 | 13.9003 | | | 4.81791 | 15.6678 |
| | | 4.71844 | 13.9811 | | | 4.8342 | 15.8584 |
| | | 4.7375 | 14.1335 | | | 4.85002 | 16.0586 |
| | | 4.75043 | 14.2456 | | | 4.86534 | 16.2684 |
| | | 4.77019 | 14.4429 | | | 4.88015 | 16.488 |
| | | 4.77844 | 14.5239 | | | 4.89446 | 16.7173 |
| | | 4.80123 | 14.7635 | | | 4.90837 | 16.9596 |
| | | 4.80939 | 14.8595 | | | 4.92225 | 17.2152 |
| | | 4.82066 | 14.9912 | | | 4.93661 | 17.5168 |
| | | 4.83762 | 15.2078 | | | 4.95122 | 17.8565 |
| | | 4.85239 | 15.4087 | | | 4.9653 | 18.2127 |
| | | 4.86027 | 15.5228 | | | 4.97881 | 18.5922 |
| | | 4.86645 | 15.6112 | | | 4.99183 | 18.9971 |

-continued

| D = 2.5<br>C = 0.6 | D = 10<br>C = 0.6 | D = 2.5<br>C = 1 | D = 10<br>C = 1 |
|---|---|---|---|
|  | 4.88128   15.8477 | 5 | 19.2709 |
|  | 4.88162   15.8534 |  |  |
|  | 4.89752   16.1243 |  |  |
|  | 4.91623   16.5221 |  |  |
|  | 4.92571   16.7576 |  |  |
|  | 4.93424   16.9562 |  |  |
|  | 4.94519   17.1952 |  |  |
|  | 4.95434   17.3904 |  |  |
|  | 4.96741   17.7651 |  |  |
|  | 4.98184   18.2561 |  |  |
|  | 4.99527   18.7337 |  |  |
|  | 5          18.9259 |  |  |

An interesting question is whether one is better off with a surrounding ring that adds, for example, 30 cm. on each side of a 2.5-meter blade diameter, with an extra 30 cm of blade length to make a blade diameter of 2.8 meters? A gain in the available wind power of 68% can be obtained without a surrounding ring if the blades' diameter is increased to 2.97 m (since (2.97/2.5)^31.68), so the present surrounding ring with improvements of well over 100 percent in the same space is a better solution.

SUMMARY OF THE INVENTION

According to the present invention there are provided several devices and methods of enhancing the production of electrical energy from wind energy.

The various inventions described here can be made to work together in different embodiments and situations.

It is now disclosed for the first time a flow deflection system, comprising:
a. an energy capture machine with an energy capture component facing a flow of fluid in an x-axis, (1), b. a flow deflection device (FDD) (3 or 4) placed functionally adjacent to the energy capture component, c. the central axis of the FDD is substantially-perpendicular to the direction of fluid flow. This invention is mostly relevant to larger turbines, but can be for any. According to some embodiments, it applies where the FDD has height in the y-axis of at least 0.1 meter or at least 5 meters. These embodiments emphasize that height is an important part of the FDD, no matter what its shape is. According to some embodiments, the flow of fluid is a gas, liquid, wind, water, or steam. According to some embodiments, the FDD is a ring of 360 degrees, a partial ring of less than 360 degrees (16) or an interrupted ring. (23) Many other types of ring can be used in conjunction with this system, such as outlines, foil shapes, convex shapes, etc. The use of the term x-axis is for orientation. In one embodiment, the x-axis is vertical to the earth's surface.

It is now disclosed for the first time a flow deflection system, comprising:
a. an energy capture machine with an energy capture component facing a flow of fluid in an x-axis, (1) b. a flow deflection device (FDD) (3 or 4) placed functionally adjacent to the energy capture component, c. said energy capture machine is a wind turbine of at least 10 meters blade diameter. In one embodiment, said energy capture machine is a wind turbine of at least 30 meters blade diameter. This emphasizes that FDDs of any kind, whether x-axis or y-axis FDDs, have not been used with larger turbines.

It is now disclosed for the first time a flow deflection system, comprising:
a. an energy capture machine with an energy capture component (1) facing a flow of fluid in an x-axis, b. a support structure (2) for the energy capture machine, c. an FDD (3) in at least a partial ring surrounding at least part of the support structure and functionally adjacent to the energy capture component of said machine. The phrase "at least a partial ring" means anything that could be involved in surrounding the support structure from minimal size to 360 degrees. This is most relevant to a turbine that rotates on a y-axis and is maintained substantially above the surface, so in one embodiment, the support structure is substantially in a y axis. According to some embodiments, the fluid is wind or water. According to some embodiments, the FDD is at least partially attached to said support structure, at least partially attached to the ground, or at least partially attached to a separate structure other than the support structure. The use of the term x-axis is for orientation. In one embodiment, the x-axis is vertical to the earth's surface. In one embodiment, the FDD has height of at least 0.1 meter in a y-axis. In one embodiment, the ring surrounds only the support structure. This means that it does not block the flow into the turbine. According to some embodiments, the FDD is at least 2.5 or 5 meters from the energy capture component It is now disclosed for the first time a flow deflection system, comprising:
a. an energy capture machine with an energy capture component (1) facing a flow of fluid in an x-axis, b. at least two FDDs functionally adjacent to the energy capture component. (3 and 4) It is possible for two separate FDDs to work together to create a greater effect of increasing flow velocity. The primary application is for the outer doughnut and inner doughnut for a large wind turbine. According to some embodiments, one FDD precedes the other in x-axis position, each FDD has a different lower elevation in the y-axis, each FDD has a different higher elevation in the y-axis, each FDD has a substantially similar axis, each FDD has a substantially similar shape, one FDD precedes the other in x-axis position and each FDD has a different elevation in the y-axis, each FDD has a different axis, each FDD has a different diameter, each FDD has a substantially different shape, the FDDs comprise at least one obstacle type and at least one circulation type, the FDDs are functionally adjacent to each other, at least one FDD is a complete ring (28, 29, 30), at least one FDD is an interrupted shape, at least one FDD is a foil shape, at least one FDD is an incomplete foil shape, at least one FDD is an outline shape, at least one FDD is an outline foil, at least one FDD is a non-ring, at least one FDD is an uninterrupted shape, at least one FDD is a convex shape (28, 29, 30), or at least one FDD is at least 5 meters from the energy capture component. According to some embodiments, the fluid is a gas, liquid, or wind. According to some embodiments, the flow of fluid is underwater, steam or a wave.

It is now disclosed for the first time a flow deflection system, comprising: a. an energy capture machine with an energy capture component facing a flow of fluid in an x-axis, (134) b. a flow deflection device (FDD) (133) placed functionally adjacent to the energy capture component c. the central axis of the FDD is substantially parallel to the direction of fluid flow. This is most commonly envisaged for small wind turbines, but can be used for any. The use of FDD is emphasized, as noted earlier, to exclude Venturi tube-type shrouds. According to some embodiments, the flow of fluid is gas, liquid, wind, underwater, or steam. According to some embodiments, the FDD at least partially surrounds the energy capture component, the FDD is a complete ring, an interrupted shape, a foil shape, an incomplete foil shape, an outline shape, an outline foil, a non-ring, an interrupted shape, or a convex shape. The use of the term x-axis is for orientation. In one embodiment, the x-axis is vertical to the earth's surface.

It is now disclosed for the first time a flow deflection system, comprising: a. an energy capture machine with an energy capture component (1) facing a flow of fluid in an x-axis, b. at least one obstacle-type FDD functionally adjacent to the energy capture component. (3) According to some embodiments, the flow is a gas, a liquid, wind, underwater, or steam. According to some embodiments, the FDD is a ring of 360 degrees, a rig of less than 360 degrees, (16) or an interrupted ring. The use of the term x-axis is for orientation. In one embodiment, the x-axis is vertical to the earth's surface.

It is now disclosed for the first time a flow deflection system, comprising: a. an energy capture machine with an energy capture component (1) facing a flow of fluid in an x-axis, b. at least one circulation-type FDD (4) functionally adjacent to the energy capture component. (4) According to some embodiments, the flow of fluid is a gas, a liquid, wind, underwater, or steam. According to some embodiments, the FDD is a ring of 360 degrees (67), a ring of less than 360 degrees (69), or an interrupted ring. (68) The use of the term x-axis is for orientation. In one embodiment, the x-axis is vertical to the earth's surface.

It is now disclosed for the first time a flow deflection system, comprising: a. an energy capture machine with an energy capture component facing a flow of fluid or waves in an x-axis, b. an FDD functionally adjacent to the energy capture component, c. said FDD is at an angle of attack in a y or z axis relative to the x-axis that is an absolute value greater than zero. The importance of the angle of attack in increasing the energy available to the turbine is an important feature of the current invention. According to some embodiments, the axis of the FDD is in a y axis or in an x axis and at least partially surrounding the energy capture component. According to some embodiments, the flow is a gas, a gas other than air or a liquid. According to some embodiments, the distance from the FDD to the energy capture component is at least 2.5 meters, less than 50 centimeters, less than 20 centimeters, or less than or equal to 5 centimeters. Different types of FDD require different distances.

It is now disclosed for the first time a flow deflection system, comprising: a. an energy capture machine with an energy capture component facing a flow of fluid in an x-axis, b. an FDD functionally adjacent to the energy capture component c. said FDD is in the shape of an incomplete airfoil. (155, 158, etc.) It has been pointed out that an incomplete airfoil can include a number of shapes, such as a hollow shape or an outline shape. The feature is that it lacks something that would be present in a full airfoil. One of the important innovations of the current invention is that incomplete airfoils, whose use would generally be discouraged in aircraft, can be very useful in energy capture. According to some embodiments, the flow of fluid is a gas, a liquid, wind, underwater, steam, or a wave. According to some embodiments, the FDD is a ring of 360 degrees, an incomplete ring, an interrupted ring, at least partially hollow, at least a partial outline or a non-ring. The use of the term x-axis is for orientation. In one embodiment the x-axis is vertical to the earth's surface.

It is now disclosed for the first time a flow deflection system, comprising: a. an energy capture machine with an energy capture component facing a flow of fluid in an x-axis, b. an FDD functionally adjacent to the energy capture component, c. said FDD is an outline shape. This innovation can apply both to an incomplete foil and to other shapes, for example, the large doughnut. According to some embodiments, the flow of fluid is a gas, a liquid, wind, underwater, steam, or a wave. According to some embodiments, the FED is a ring of 360 degrees, an incomplete ring, an interrupted ring, a non-ring, or an incomplete outline shape. The use of the term x-axis is for orientation. In one embodiment, the x-axis is vertical to the earths surface.

It is now disclosed for the first time a fluid energy capture system, comprising: a. an energy capture machine with an energy capture component facing a flow of fluid in x-axis, b. an FDD) in a y-axis inferior to and functionally adjacent to the energy capture component. (3 or 4) In most cases, the doughnut FDDs will be inferior to the energy capture component, such as the blades of a wind turbine. Later, the innovation of partial blockage will be described. In one embodiment, the energy capture component is at least one propeller blade. According to some embodiments, the FDD is primarily an obstacle FDD, (3) or the FDD is primarily a circulation FDD. (4) According to some embodiments, the fluid is wind or water. In one embodiment, c. a supporting structure (2) of said machine is also present. According to some embodiments, the FDD is at least partially attached to the support structure or not attached to the support structure.

It is now disclosed for the first time a flow deflection system, comprising:

a. a wind turbine on a tower attached to the ground, b. an FDD at least partially attached to the ground and functionally adjacent to the wind turbine's energy capture component.

It is now disclosed for the first time a flow deflection system, comprising:

a. a wind turbine on a tower attached to the ground, b. an FDD at least partially attached to the wind turbine tower and functionally adjacent to the wind turbine's energy capture component.

It is now disclosed for the first time a flow deflection system, comprising:

a. an energy capture machine with an energy capture component facing a flow of fluid in an x-axis, b. an FDD, functionally adjacent to the energy capture component, that comprises an outline structure of at least part of an airfoil.

It is now disclosed for the first time a flow deflection system, comprising:

a. an energy capture machine with an energy capture component facing a flow of fluid in an x-axis, b. an FDD, functionally adjacent to the energy capture component, that comprises at least part of a partially hollow airfoil.

It is now disclosed for the first time a flow deflection system comprising:
a. an energy capture machine with an energy capture component facing a flow of fluid in an x-axis, b. an FDD, functionally adjacent to the energy capture component, that is a Farb foil. (158)

It is now disclosed for the first time a flow deflection system, comprising:
a. an energy capture machine with an energy capture component facing a flow of fluid in an x-axis, b. an FDD, functionally adjacent to the energy capture component, that is a partially hollow Farb foil. (162)

It is now disclosed for the first time a flow deflection system, comprising:
a. an energy capture machine with an energy capture component facing a flow of fluid in an x-axis, b. an FDD, functionally adjacent to the energy capture component, that is at least a partial outline of a Farb foil. (155) The Farb foil has been described earlier, and is ideally an outline structure, but it can have other shapes as well.

It is now disclosed for the first time an x-axis fluid flow energy capture system, comprising: a. An energy capture system with an energy capture component facing the x-axis, b. An FDD that is functionally adjacent to and forms at least a partial x-axis surround of any part of the energy capture system.

It is now disclosed for the first time a flow deflection system, comprising: a. An energy capture system with an energy capture component facing the x-axis, b. An FDD that is functionally adjacent to and located at the point operative to produce maximum power output of the system. According to some embodiments, the FDD is located at a point in the top 90% or 50% of power output of the system.

It is now disclosed for the first time a flow deflection system, comprising: a. pressure release means attached to an FDD. (21) According to some embodiments, the means is operative to at least partially equalize pressures from the two sides of the FDD or is drawn from the group of a valve (26), a flap (26), an opening (23), or a plug (22), or is operative to release only above a defined wind speed. According to some embodiments, the FDD has a central x axis or the FDD has a central y axis. According to some embodiments, the defined speed is over 50 or over 100 miles per hour.

It is now disclosed for the first time a shroud system, comprising: a. pressure release means attached to a shroud.

It is now disclosed for the first time a flow deflection system, comprising: a. a support structure to an energy capture machine, b. an FDD, placed exclusively on the support structure. In one embodiment, the support structure is a wind tower.

It is now disclosed for the first time a flow deflection system, comprising: a. a support structure to an energy capture machine, b. an FDD, placed exclusively on surrounding structures and grounds. (72, 74, 75)

It is now disclosed for the first time a flow deflection system, comprising: a. a support structure to an energy capture machine, b. an FDD, placed on the support structure and on surrounding structures and grounds. (79, 80, 81)

It is now disclosed for the first time a flow deflection system, comprising: a. an energy capture machine with an energy capture component facing a flow of fluid in an x-axis, (1) b. a flow deflection device (FDD) placed functionally adjacent to the energy capture component, c. said FDD has height in the y-axis which partially blocks the flow into the energy capture component. (107) It was previously discussed that this innovative concept can lead to a very large power output increase when used in the correct configuration. In one embodiment, the FDD blocks less than one-half of the y-axis height of the energy capture component. In one embodiment, the energy capture machine is a wind turbine.

It is now disclosed for the first time a fluid flow turbine system, comprising: a. an obstruction-type FDD that forms at least a partial surround of any part of the turbine system in any axis and is functionally adjacent to the turbine system.

It is now disclosed for the first time a flow deflection system, comprising: a. an energy capture machine with an energy capture component facing a fluid flow, b. an FDD, functionally adjacent to the energy capture component of the energy capture machine, that is an interrupted shape. (23, 68, 118, 122) In one embodiment, the interrupted shape completely surrounds the energy capture component.

It is now disclosed for the first time a flow deflection system, comprising: a. an energy capture machine with an energy capture component facing a fluid flow, b. an FDD, functionally adjacent to the energy capture component, that is a hybrid of at least two shapes in one structure. (28, 29, 30) (88, 89, 90)

It is now disclosed for the first time a flow deflection system, comprising: a. an energy capture machine with an energy capture component facing a fluid flow, b. an FDD, functionally adjacent to the energy capture component, that is a tense structure. (59) In one embodiment, the system her comprises a frame for the tense structure. (58)

It is now disclosed for the first time a flow deflection system, comprising: a, an energy capture machine with an energy capture component facing a fluid flow, b. an FDD, functionally adjacent to the energy capture component, that has means to move in coordination with the energy capture component. In this manner, it is not necessary for the FDD to statically surround the machine or support structure.

It is now disclosed for the first time a flow deflection system, comprising: a. an energy capture machine with an energy capture component facing a fluid flow, b. an FDD, functionally adjacent to the energy capture component, that has means to move in coordination with the direction of fluid flow.

It is now disclosed for the first time a flow deflection system, comprising:
a. an energy capture machine with an energy capture component facing a fluid flow in an x axis, b. an FDD, functionally adjacent to the energy capture component of the energy capture machine, that has a convex shape in relation to the direction of flow. (28, 29, 30) According to some embodiments, the convex shape is incomplete or an outline. (94)

It is now disclosed for the first time a flow deflection system, comprising: a. an energy capture machine with an energy capture component facing a fluid flow in an x axis, b. an FDD, frictionally adjacent to the energy capture component of the energy capture machine, that has a conical shape in relation to the direction of flow. (35, 59) According to some embodiments, the convex shape is incomplete or an outline.

It is now disclosed for the first time a flow deflection system, comprising: a, an energy capture machine with an energy capture component facing a fluid flow in an x axis, b. an FDD, functionally adjacent to the energy capture component of the energy capture machine, that has an airfoil shape of thickness 25% of the chord length or greater. According to some embodiments, the thickness is 30%, 35%, or 40% of the chord length or greater. The point is that generally thicker foils work better as FDDs and the use of thicker foils is an innovation of the current invention.

It is now disclosed for the first time a flow deflection system, comprising: a. an energy capture component of an energy capture device facing a fluid flow in an x axis, b. an FDD with an airfoil shape at least partially surrounding the energy capture machine in a y-axis. This can be the inner doughnut referred to before. In one embodiment, the FDD is at least 0.5 meters in chord length.

It is now disclosed for the first time a flow deflection system, comprising:
a. an energy capture machine with an energy capture component facing a flow of fluid in an x-axis, b. a flow deflection device (FDD), whose axis is in the x axis, placed functionally adjacent to the energy capture component, c. said FDD encircles at least a part of only the energy capture component. One purpose of this innovation is to emphasize the local nature of the invention that differentiates it from a large Venturi tube. According to some embodiments, said FDD also encircles less than 25% or 10% of the nacelle in the x-axis, or also extends anterior to the energy capture component in the x-axis or extends less than one meter total in the x-axis. According to some embodiments, the FDD is an interrupted ring, an airfoil shape, an airfoil shape at an angle of attack whose absolute value on all sides is greater than zero, at least 10, at least 20, or at least 30 degrees, an interrupted shape, a partially hollow shape, an outline shape, an incomplete airfoil shape, a convex shape, a comical shape, an obstacle FDD, a circulation FDD, an FDD with a means for the enforcement of turbulent flow, an airfoil shape with an upper and lower camber whose greatest thickness is at less than 20% or 10% of the chord line from the leading edge, or an outline foil shape.

It is now disclosed for the first time a flow deflection system, comprising: a. an energy capture machine with an energy capture component facing a flow of fluid in an x-axis, b. a flow deflection device (FDD), whose axis is in the x axis, placed functionally adjacent to the energy capture component, c. said FDD is completely anterior to the energy capture component in the x-axis. According to some embodiments, the FDD is an airfoil shape, an airfoil shape at an angle of attack whose absolute value on all sides is greater than zero, 10, or 20 degrees. According to some embodiments, the FDD is an interrupted shape, a partially hollow shape, an outline shape, an incomplete airfoil shape, a convex shape, a conical shape, an obstacle FDD, a circulation FDD, an FDD with a means for the enforcement of turbulent flow,
an airfoil shape within upper and lower camber whose greatest thickness is at less than 20% or 10% of the chord line from the leading edge, or an outline foil shape.

It is now disclosed for the first-time a flow deflection system, comprising: a. an energy capture machine with an energy capture component facing a flow of fluid in an x-axis, b. a flow deflection device (FDD), whose axis is in the x-axis, placed functionally adjacent to the energy capture component, c. said FDD encircles at least a part of the energy capture machine, d. said FDD has no connection to the machine from the inside face of the FDD. According to some embodiments, the (FDD) is an airfoil shape, an airfoil shape at an angle of attack whose absolute value on all sides is greater than zero, 10, or 20 degrees, an interrupted shape, a partially hollow shape, an outline shape, an incomplete airfoil shape, a convex shape, a conical shape, an obstacle FDD, a circulation FDD, an FDD with a means for the enforcement of turbulent flow, an airfoil shape with an upper and lower camber whose greatest thickness is at less than 20% or 10% of the chord line from the leading edge, or
an outline foil shape.

It is now disclosed for the first time a flow deflection system, comprising: a. an energy capture machine with an energy capture component facing a flow of fluid in an x-axis, b. a flow deflection device (FDD), whose axis is in the x-axis, placed functionally adjacent to the energy capture component, c. said FDD is connected to the housing of the energy capture machine. In one embodiment, the system further comprises d. a cage attached to the x-axis front surface of the FDD, front surface defined as from the superior part of the leading edge forward. In one embodiment the system further comprises e. a connection from the cage to the hub of the energy capture machine. In one embodiment, the system further comprises d. a supporting structure for the energy capture machine, e. a connection from the FDD to the supporting structure. In one embodiment, the supporting structure's connection to the FDD has means for permitting movement of the FDD in relation to the x-z plane movement of the energy capture component. According to some embodiments, where parts a, b, and c are present, the FDD is an airfoil shape, an airfoil shape at an angle of attack whose absolute value on all sides is greater than zero, 10, or 20 degrees, an interrupted shape, a partially hollow shape, an outline shape, an incomplete airfoil shape, a convex shape, a conical shape, an obstacle FDD, a circulation FDD, an FDD with a means for the enforcement of turbulent flow, an airfoil shape with an upper and lower camber whose greatest thickness is at less than 20% or 10% of the chord line from the leading edge, or an outline foil shape.

It is now disclosed for the first time a flow deflection system, comprising: a. an energy capture machine with an energy capture component facing a flow of fluid in an x-axis, b. a flow deflection device (FDD), whose axis is in the x-axis, placed functionally adjacent to the energy capture component, c. said FDD encircles at least a part of the energy capture machine, d. said FDD has no direct connection to the non-energy capture component part of the machine from the anterior 50% of the inside face of the FDD. According to some embodiments, the FDD is an airfoil shape, an airfoil shape at an angle of attack whose absolute value on all sides is greater than zero, 10, or 20 degrees, an interrupted shape, a partially hollow shape, an outline shape, an incomplete airfoil shape, a convex shape, a conical shape, an obstacle FDD, a circulation FDD, an FDD with a means for the enforcement of turbulent flow, an airfoil shape with an upper and lower camber whose greatest thickness is at less than 20% or 10% of the chord line from the leading edge, or an outline foil shape.

It is now disclosed for the first time a flow deflection system, comprising;
a. a turbine, b. an FDD in an airfoil shape with an upper and lower camber whose greatest thickness is at less than 20% of the chord line from the leading edge.

It is now disclosed for the first time a flow deflection system, comprising:
a. a turbine, b. an FDD in an airfoil shape with an upper and lower camber whose greatest thickness is at less than 10% of the chord line from the leading edge.

It is now disclosed for the first time an energy capture turbine facing a flow of fluid in an x-axis, comprising: a. at least one blade, the blades of which are widest, width defined by the y-z surface facing the flow, at the periphery. According to some embodiments, the width of the periphery is at least two times that of the smallest width of the blade, the width of the periphery tapers to the center, or the y-z surface at the periphery has an angle to the x-axis flow of up to 90 that tapers downward in number to as low as zero as it approaches the center of the blade. In one embodiment, the turbine further comprises b. an FDD. According to some embodiments, the FDD is an airfoil shape, an airfoil shape at an angle of attack whose absolute value on all sides is greater than zero, 10, or 20 degrees, an interrupted shape, a partially hollow shape, an outline shape, an incomplete airfoil shape, a convex shape, a conical shape, an obstacle FDD, a circulation FDD, an FDD with a means for the enforcement of turbulent flow, an airfoil shape with an upper and lower camber whose greatest thickness is at less than 20% or 10% of the chord line from the leading edge, or an outline foil shape.

It is now disclosed for the first time a flow deflection system, comprising:
a. an energy capture machine with an energy capture component facing a flow of fluid in an x-axis, b. a flow deflection device (FDD), whose axis is in the x-axis, placed functionally adjacent to the energy capture component, c. said FDD is placed so that the highest velocity fluid flow occurs at the energy capture component. According to some embodiments, the FDD is placed at a location causing the generation of within the greatest-10% or 95% of the highest velocity fluid flow at the energy capture component. According to some embodiments, the FDD is an airfoil shape, an airfoil shape at an angle of attack whose absolute value on all sides is greater than zero, 10, or 20 degrees, an interrupted shape, a partially hollow shape, an outline shape, an incomplete airfoil shape, a convex shape, a conical shape, an obstacle FDD, a circulation FDD, an FDD with a means for the enforcement of turbulent flow, an airfoil shape with an upper and lower camber whose greatest thickness is at less than 20% or 10% of the chord line from the leading edge, or an outline foil shape. In one embodiment, the FDD is at least a partial ring.

It is now disclosed for the first time a flow deflection system, comprising: a. an energy capture machine with an energy capture component facing a flow of fluid in an x-axis, b. a flow deflection device (FDD), whose axis is in the y-axis, placed functionally adjacent to the energy capture component, c. said FDD is placed so that the highest velocity fluid flow occurs at the energy capture component. According to some embodiments, the FDD is at least a partial ring, or the FDD is placed at a location causing the generation of within the greatest 10% or 95% of the highest velocity fluid flow at the energy capture component.

It is now disclosed for the first time a flow deflection system, comprising: a. an energy capture machine with an energy capture component and hub facing a flow of fluid in an x-axis, b. a flow deflection device (FDD), whose axis is in the x-axis and whose y-z area covers a portion of the hub in the x-axis, placed functionally adjacent to the energy capture component and anterior to the hub. (131) In one embodiment the FDD has a diameter that includes up to 30% of the diameter of the blades. In one embodiment, the system rifer comprises c. a cage connecting the FDD in front of the hub to a structure at least partially surrounding the energy capture component. (132)

It is now disclosed for the first time a flow deflection system, comprising: a. an energy capture machine with an energy capture component facing a flow of fluid in an x-axis, b. a flow deflection device (FDD), whose axis is in the x-axis placed functionally adjacent to and at least partially encircling the energy capture component from a point at or anterior in the x-axis to the energy capture component c. said FDD contains means for enforcing turbulent flow. According to some embodiments, said means is a thin structure on the inside edge of the FDD, (147) said means is a thin structure in front of the FDD, (132), said structure is a thin cage, or the fluid is wind. According to some embodiments, the FDD is an airfoil shape, an airfoil shape at an angle of attack whose absolute value on all sides is greater than zero, 10, or 20 degrees, an interrupted shape, a partially hollow shape, an outline shape, an incomplete airfoil shape, a convex shape, a conical shape, an obstacle FDD, a circulation FDD, an airfoil shape with an upper and lower camber whose greatest thickness is at less than 20% or 10% of the chord line from the leading edge, or an outline foil shape.

It is now disclosed for the first time a flow deflection system, comprising: a. an energy capture machine with an energy capture component facing a flow of fluid in an x-axis said component's center rotating in an x-axis, b. a flow deflection device (FDD) placed functionally adjacent to the energy capture component, c. said FDD encircles at least a part of the energy capture component, d. anti-collision means operative to prevent collision of the energy capture component with the FDD. (183-193) According to some embodiments, said means comprise magnet sets on the blades and the FDD, the FDD contains at least one coil operative to produce electricity from a magnet set on the blades, said means comprise a bearing set on the FDD and a track area on the blades, or said means comprise a bearing set on the blades and a track area on the FDD.

It is now disclosed for the first time a flow deflection system, comprising: a. an energy capture machine with an energy capture component facing a flow of fluid in an x-axis, said component's center rotating in an x-axis, b. a flow deflection device (FDD) placed functionally adjacent to the energy capture component, c. said FDD encircles at least a part of the energy capture component, d. said energy capture component has at least one magnet set at its periphery, e. said FDD has a coil, operative to produce electric current, that is functionally adjacent to the energy capture component.

It is now disclosed for the first time an energy capture system facing a fluid flow in an x axis, comprising: a. a first energy capture machine, (138) b. a second energy capture machine, located downstream from the first energy capture machine in an x axis direction, (139) c. a first FDD, at least partially surrounding and functionally adjacent to the first energy capture machine, (136) d. a second FDD, at least partially surrounding and functionally adjacent to the second energy capture machine. (137) According to some embodiments, the first and second machines are less than 10 meters distant, the fluid flow through the first energy capture machine also passes through the second, at least one of the energy capture machines is a blade system, the second energy capture machine has a smaller-diameter energy capture component than the first, the second FDD has a smaller diameter than the first, the fluid flow is gas, the fluid flow is liquid, the FDD has a foil shape, or the airspace between the two FDDs is at least partly open on the sides. (140)

It is now disclosed for the first time a flow deflection system, comprising: a. an energy capture machine with an energy capture component facing a flow of fluid in an x-axis, b. a flow deflection device (FDD), whose axis is in the x-axis, placed functionally adjacent to the energy capture component c. the ratio between the internal radius of the FDD at the most anterior y-z axis edge of the energy capture component, and distance from the intersection of that plane with the FDD to the most anterior point of the FDD is greater than 5 to 2 for turbines of radius up to 2.5 meters.

It is now disclosed for the first time a flow deflection system, comprising: a. an energy capture machine with an energy capture component facing a flow of fluid in an x-axis, b. a flow deflection device (FDD), whose axis is in the x-axis, placed functionally adjacent to the energy capture component, c. the ratio between the internal radius of the FDD) at the most anterior y-z axis edge of the energy capture component and distance from the intersection of that plane with the FDD to the most anterior point of the FDD is greater than 5 to 1 for a turbine of radius greater than 2.5 meters.

It is now disclosed for the first time a flow deflection device of an energy capture machine, comprising: a. a rigid frame, b. a tense covering to at least a part of said frame.

It is now disclosed for the first time a flow deflection device of an energy capture machine, comprising: a. a partially hollow rigid structure.

It is now disclosed for the first time a flow deflection device of an energy capture machine, comprising: a. a partially hollow rigid frame outline, b. a tense covering to at least a part of said frame.

It is now disclosed for the first time a flow deflection device of an energy capture machine, comprising: a. an outline rigid structure.

It is now disclosed for the first time a flow deflection device of an energy capture machine, comprising: a. an outline rigid frame, b. a tense covering to at least a part of said frame.

It is now disclosed for the first time a support structure of an energy capture machine for a flow of fluid in an x axis, comprising: a. means for rapidly adjusting the height of the support structure in a y axis. This is important for dealing with the situation of small wind turbines in high winds, especially with the velocity enhancements of the current invention, which can increase velocity and power but bring the turbine closer to its survivability limits. In one embodiment, the system further comprises b. a retractable support structure operating in a y axis, (211) c. a tightening-loosening means. (213) In one embodiment, the system further comprises b. a lower support component connected to a lower surface, (207) c. a hydraulic means, (209) d. a joint connecting the lower support component to the upper support structure. (208)

378. The structure of claim 377, wherein the hydraulic means connects the lower (207) to the upper support structure. (206) In one embodiment, the system further comprises b. a jackable means connected to the support structure. (204) According to some embodiments of part (a), the fluid is a gas or a liquid.

It is now disclosed for the first time a support structure of an energy capture machine for a flow of fluid in an x axis, comprising: a. at least one support component parallel to the surface of the earth, b. a horizontal plate attached to and extending to the sides of said support component in an x-z axis. According to some embodiments, the plate rests on the surface of the ear the fluid is a gas or a liquid, or the plate is underneath the surface of the earth. In one embodiment, the system her comprises c. at least one weight placed above the horizontal plate.

It is now disclosed for the first time a flow deflection device, comprising:
a. a partially hollow airfoil shape.

It is now disclosed for the first time a flow deflection device, comprising:
a. at least a partial ring in the shape of an airfoil around a wind tower.

It is now disclosed for the first time a flow deflection device, comprising:
a. an outline shape of an incomplete foil.

It is now disclosed for the first time a outline airfoil, comprising:
a. a foil's leading edge and one full side edge. In one embodiment, the foil is symmetrical. In one embodiment, the system further comprises b. a hook on the leading edge's other side, said hook consisting of a smooth turn towards the trailing edge or b. an extension to the leading edge of the airfoil that does not make a sharp turn to point to the trailing edge.

It is now disclosed for the first time a outline airfoil, comprising: a. a foil's leading edge and one full side edge and a continuous portion of the second side edge from the leading edge that stops before connecting to the trailing edge. In one embodiment, the foil is symmetrical.

It is now disclosed for the first time an airfoil, comprising:
a. an interruption in the airfoil's outline on one side of the airfoil. According to some embodiments, the foil is symmetrical or has an angle of attack. In one embodiment, said airfoil is adjustable, or, further, adjustable to a flatter airfoil shape.

It is now disclosed for the first time a flow deflection device, comprising:
two separate shapes adjacent to and continuous with each other. According to some embodiments, one shape is hollowly cylindrical and the second is a convex, partial dome surface continuously extending from the outside of the cylindrical shape or hollowly cylindrical and the second is a conical surface continuously extending from the outside of the cylindrical shape, in which conical means either circular or composed of at least 1 linear external side in the shape of a cone and the cylindrical shape is adjusted to have a continuous exterior with it.

It is now disclosed for the first time an energy capture system, comprising: a. an energy capture component of an energy capture machine, b. an FDD foil-like surrounding ring, c. said energy capture component is located in the x-axis direction at the distance of highest total velocity. According to some embodiments, the energy capture component is centered in the x-axis at the distance of 95% of highest total velocity, or the energy capture component is centered in the x-axis at the distance of 15-30% of chord length from the leading edge.

It is now disclosed for the first time an FDD for an energy capture machine, comprising: a. a surrounding ring with at least one gap in its shape. As explained earlier, the surrounding ring refers to the FDD that mostly surrounds, in most cases, a turbine.

It is now disclosed for the first time an incomplete airfoil, comprising: a. an airfoil shape with at least part of the total airfoil shape missing.

It is now disclosed for the first time an FDD, comprising: a. a height of at least 5 meters.

It is now disclosed for the first time an FDD, comprising: a. a width of at least 5 meters.

It is now disclosed for the first time an FDD, comprising: an internal diameter of at least 5 meters. According to some embodiments, the internal diameter is at least 10 meters, the FDD axis is substantially in an x axis, or the FDD axis is substantially in a y axis.

It is now disclosed for the first time an FDD, comprising: a. an incomplete obstruction FDD.

It is now disclosed for the first time an FDD, comprising: a. an outline obstruction FDD. In one embodiment, at least part of one side is open.

It is now disclosed for the first time a wind tower base, comprising: a. multiple first level extensions to the side (194), each extension having holes for inserting bolts and screws (197, 198) operative to be connected to a grounding. In one embodiment, the system further comprises b. extendable second-level extensions (196) connected to the first level extensions. The purpose of these inventions is to broaden the base of the installation to make it easier to install without expensive equipment and more durable due to a wider base.

It is now disclosed for the first time a wind tower base, comprising: a. multiple first level extensions to the side (194), each extension having attachments for insertion of inferior screws (199) operative to be connected to the ground or to cement. In one embodiment, the system further comprises b. extendable second-level extensions (196) connected to the first level extensions.

It is now disclosed for the first time a wind tower base, comprising: a. a single central tower, (195) b. at least three side extensions from the base of said tower, (194) c. means for attaching the side extensions inferiorly. (199) In one embodiment, the system further comprises d. means for attaching the central tower inferiorly.

It is now disclosed for the first time an FDD system, comprising:
an incomplete foil functionally adjacent to an energy capture machine.

It is now disclosed for the first time an aircraft or watercraft, comprising:
an incomplete foil attached to the body of the aircraft or watercraft. In one embodiment, the incomplete foil is a Farb foil.

It is now disclosed for the first time an aircraft or watercraft, comprising:
a. a wing with an adjustable foil shape. According to some embodiments, one of the shapes is a Farb foil or the shape has means to change its thickness.

It is now disclosed for the first time a flow deflection system, comprising: a. an energy capture machine with an energy capture component, b. an airfoil shape, whose thickness is at least 20% of the chord length, functionally adjacent to the energy capture component. In one embodiment, the thickness is at least 30%.

It is now disclosed for the first time a flow deflection system, comprising:
a. a vertical axis turbine, b. an FDD, functionally adjacent to said turbine. (240, 241) According to some embodiments, the turbine is a wind turbine, the turbine is a water turbine, the FDD is a foil shape, or the FDD is a convex shape.

It is now disclosed for the first time a flow deflection system, comprising:
a. a energy capture component of an energy capture machine, b. a foil-shaped surrounding ring at an angle of attack of 20-40 degrees, functionally adjacent to said component, c. said component's center is placed downstream of the leading edge by 15-45% of the foil chord length.

It is now disclosed for the first time a flow deflection system, comprising:
a. a vertical axis turbine with an energy capture component, facing a flow of fluid in an x axis, b. an FDD, functionally adjacent to the energy capture component. According to some embodiments, the fluid is a gas or a liquid. According to some embodiments, the FDD is inferior in the y axis to the energy capture component, at least a partial y axis ring, superior in the y axis to the energy capture component, on the sides of the energy capture component in the y axis, an airfoil shape, at least a partial x axis ring, an outline airfoil shape, an airfoil shape at an angle of attack whose absolute value on all sides is greater than zero, 10, or 20 degrees, an interrupted shape, a partially hollow shape, an outline shape, an incomplete airfoil shape, a convex shape, a conical shape, an obstacle FDD, a circulation FDD, an FDD with a means for the enforcement of turbulent flow, or an airfoil shape with an upper and lower camber whose greatest thickness is at less than 20% or 10% of the chord line from the leading edge.

The current invention clearly differentiates itself from shrouds; however, some innovative points of the current invention can apply to shrouds.

It is now disclosed for the first time a shroud system facing a fluid flow in an x axis, comprising: a. a shroud encircling an x axis, b. an energy capture machine with an energy capture component located within the shroud and functionally adjacent to the shroud, c. said shroud is incomplete.

It is now disclosed for the first time a shroud system facing a fluid flow in an x axis, comprising: a. a shroud encircling an x axis, b. an energy capture machine with an energy capture component located within the shroud and functionally adjacent to the shroud, c. means to enforce turbulent flow inside the shroud. According to some embodiments, the means are at least one wire on the inside of the shroud or at least one wire anterior to the shroud in the x axis.

It is now disclosed for the first time a shroud system facing a fluid flow in an x axis, comprising: a. a shroud encircling an x axis, b. an energy capture machine with an energy capture component located within the shroud and fictionally adjacent to the shroud, c. said shroud has pressure release means.

It is now disclosed for the first time a shroud system facing a fluid flow in an x axis, comprising: a. a shroud encircling an x axis, b. an energy capture machine with an energy capture component located within the shroud and functionally adjacent to the shroud, c said shroud has an anterior cage.

It is now disclosed for the first time a flow deflection system, comprising:
a. an energy capture machine with an energy capture component facing a flow of fluid in an x-axis, b. a flow deflection device (FDD), whose axis is in the x-axis, placed functionally adjacent to the energy capture component c. an adjustable wind tower.

It is now disclosed for the first time a wind turbine system, comprising: a. a wind turbine, b. a tower for the wind turbine, c. said tower has automatic means for decreasing the height of the turbine in winds of a defined speed. In one embodiment, the automatic means are a sensor and electronic controller. In one embodiment, the system further comprises d. an FDD functionally adjacent to the energy capture component of the wind turbine.

It is now disclosed for the first time a device for constructing a velocity percentage increase output of a fluid enclosed at least partially in a surrounding ring, comprising: a. a computer readable medium comprising program instructions, wherein when executed the program instructions are operable to produce a first output in numerical or graphical format of flow velocities adjacent to a shape on the inside face of the surrounding ring, b. a computer readable medium comprising program instructions, wherein when executed the program instructions are operable to produce a second output in numerical or graphical format of flow velocities adjacent to a shape at 180 degrees from the first output, c. a computer readable medium comprising program instructions, wherein when executed the program instructions are operable to produce a third output combining the first and second outputs. In one embodiment, the output is at a position of the fastest fluid flow. In one embodiment, the system further comprises d, a screen for display of the said outputs.

It is now disclosed for the first time a device for calculating the placement of an FDD in relation to an energy capture machine, comprising: a. a computer readable medium comprising program instructions, wherein when executed the program instructions are operable to produce an FDD shape on the memory of a microprocessor, b. a computer readable medium comprising program instructions, wherein when executed the program instructions are operable to run software on the microprocessor that calculates the velocity increases around the FDD, c. a computer readable medium comprising program instructions, wherein when executed the program instructions are operable to calculate the velocity increase for at least one point in the x-axis of fluid flow. In one embodiment the method further comprises d. a computer readable medium comprising program instructions, wherein when executed the program instructions are operable to determine the location of the greatest velocity increase for a set of points in the x-axis of fluid flow. According to some embodiments, the software is FLUENT, the FDD has a y axis center in relation to an x axis fluid flow, or the FDD has an x axis center in relation to an x axis fluid flow.

It is now disclosed for the first time a device for calculating flow velocities for an energy capture machine with an FDD, comprising: a. a computer readable medium comprising program instructions, wherein when executed the program instructions are operable to produce a representation of an FDD on software in memory on a microprocessor, b. a computer readable medium comprising program instructions, wherein when executed the program instructions are operable to write instructions onto said microprocessor to calculate flow velocities around the FDD, c. a computer readable medium comprising program instructions, wherein when executed the program instructions are operable to write instructions onto said microprocessor to determine the point of maximal total velocity of the fluid in the x-s of fluid flow in relation to the FDD. According to some embodiments, the FDD has a y axis center in relation to an x axis fluid flow, or the FDD has an x axis center in relation to an x axis fluid flow.

It is now disclosed for the first time a flow deflection system for an energy capture machine, comprising: a. an FDD capable of movement b. a sensor of the direction of fluid flow, c. a control mechanism to control the FDD according to executable instructions that include input from said sensor.

It is now disclosed for the first time a flow deflection system, comprising:
a. an energy capture component of an energy capture machine for a fluid flow in an x axis, b. an FDD, functionally adjacent to said component, with a chord length of less than or equal to 1 meter in a surrounding ring in an x axis around the energy capture component, at an angle of attack of an absolute value of 20 degrees or higher, c. said energy capture component is located in an x axis direction from the leading edge of the FDD at a distance of 20-30% of chord length.

It is now disclosed for the first time a flow deflection system, comprising:
a. an energy capture component of an energy capture machine for a fluid flow in an x axis, b. a shroud, functionally adjacent to said component and surrounding said component with an axis in the x axis, said shroud having a curved anterior edge.

It is now disclosed for the first time a method of constructing a radial velocity percentage increase output of a fluid enclosed at least partially in a surrounding ring comprising: a. producing on a microprocessor a first output in numerical or graphical format of flow velocities adjacent to a shape on the inside face of the surrounding ring, b. producing on a microprocessor a second output in numerical or graphical format of flow velocities adjacent to a shape at 180 degrees from the first output, c. producing a third output of the sums of the first and second outputs. In one embodiment, the third output is at an x position of the overall fastest fluid flow.

It is now disclosed for the first time a method of manufacturing an energy capture component enclosed at least partially in a surrounding ring, comprising:
a. widening the component from center to periphery in proportion to the velocity of the regions swept by the component. According to some embodiments, the component is a set of blades or paddles.

It is now disclosed for the first time a method of manufacturing an energy capture component enclosed at least partially in a surrounding ring, comprising:
a. twisting the component from center to periphery in proportion to the velocity mapping of the regions of the area swept by the component. According to some embodiments, the component is a set of blades or paddles, or the twisting is according to the ratio of the rotational and axial velocity.

It is now disclosed for the first time a method of manufacture of an energy capture machine, comprising: a. placing an FDD and an energy capture component of said machine at the point in the x-axis of fluid flow where the total velocity of the fluid (70) is highest. In one embodiment, the point in the x axis is within the area of the highest 50% of velocity.

It is now disclosed for the first time a method of determining the best location of an FDD in relation to an energy capture machine, comprising: a. providing an FDD shape on the memory of a microprocessor, b. running software on the microprocessor that calculates the velocity increases around the FDD for at least two points in the x-axis of fluid flow, c. rung software on the microprocessor operative to determine the overall velocity increase in the area swept by the energy capture component of an energy capture machine for each point. In one embodiment, the method filer comprises d. determining the location of the greatest velocity increase. In one embodiment, the method further comprises e. placement of the FDD and the energy capture machine so that the energy capture component of the energy capture machine operates in the upper 50% of flow velocity. In one embodiment, the software in (b) is FLUENT.

It is now disclosed for the first time a method of fixing of a turbine in a specific direction, comprising: a. providing a data processing unit operative to compute readings of time-related flow velocities, b. providing a data processing unit operative to compute readings of time-related flow directions, c. providing a data processing unit operative to compute the best combination of velocity and direction over a year, d. fixing the turbine in the direction of maximal power output, e. providing an FDD in a location operative to increase the velocity of flow of fluid into the turbine.

It is now disclosed for the first time a method of manufacturing a flow deflection system, comprising: a. providing an energy capture system with an energy capture component, b. providing an FDD that is functionally adjacent to and located at the point operative to produce maximum power output of the system. According to some embodiments, the FDD is located at a point in the top 90% or 50% of power output of the system.

It is now disclosed for the first time a method of manufacture of an FDD, comprising: a. providing size parameters of the turbine, drawn at least from the group of size of the supporting structure, size of the energy capture component, distance of the energy capture component from the supporting structure and from the ground, b. providing a shape, size, angle of attack, and distance from the energy capture component for the FDD on a program running on a microprocessor, c. executing a program generating velocity data based on the FDD and turbine information in a software program written to the memory of a microprocessor, d. generating data on the expected velocity for at least one configuration, e. manufacturing the FDD for the increased velocity.

It is now disclosed for the first time a method of making a flow deflection system, comprising: a. providing an energy capture component of an energy capture machine facing a flow in an x-axis, b. providing an FDD, c. placing the FDD functionally adjacent to the energy capture component at a position operative to maximize within the upper 50% the energy output of the system. According to some embodiments, the inner diameter of the FDD is adjusted to increase power output. (42, 47, 48, 49, 50), the position is operative to maximize within the upper 90%, the FDD is at least part of a surrounding ring, the FDD is at least part of a ring with an axis in the y-axis, the shape of the FDD is adjusted to increase power output, (51, 52)

the height of the FDD is adjusted to increase power output, (53, 54) the width of the FDD is adjusted to increase power output (53, 54) or the inclination angle of the FDD is adjusted to increase power output. (55, 56, 57)

It is now disclosed for the first time a method of constructing an energy farm, comprising: a. placing at least one turbine and supporting structure, b. placing at least one FDD functionally adjacent to the turbine's energy capture component. According to some embodiments, the FDD is operative to maximize within the upper 90% or 50% of the maximum power output for that shape.

It is now disclosed for the first time a method of increasing the power from a turbine facing an x axis with an FDD in a y axis; comprising: a. Adjusting and calculating on computer executable media at least one parameter from any of the following group: height, width, size, internal diameter, convexity of shape, FDD angle of incidence, angle of attack, width of leading edge, internal area including both areas of the FDD and the uncovered areas in the center. According to some embodiments, at least two or three of the said parameters are adjusted. In one embodiment, the method further comprises b. providing said physical turbine and FDD.

It is now disclosed for the first time a method of manufacture of a turbine, comprising: a. adjusting the shape of the blade according to the velocity distribution caused by the FDD.

It is now disclosed for the first time a method of manufacturing an FDD system, comprising: a. fixing parts of an FDD system onto the tower and/or housing during manufacture.

It is now disclosed for the first time a method of manufacturing an FDD system, comprising: a. fixing parts of an FDD system onto the tower and/or housing after manufacture.

It is now disclosed for the first time a method of increasing the power output of a turbine facing a fluid flow in an x axis with an FDD with a y axis center, comprising: a. increasing internal diameter (Din) as height and width are increased.

It is now disclosed for the first time a method of calculating the power output for a wind turbine facing an x axis fluid flow, said turbine having an FDD, comprising: a. calculating velocities over the area of a specific x axis point, b. cubing the velocity increase and adjusting for area swept by the blades.

It is now disclosed for the first time a method of building a wind energy farm of at least one turbine with an FDD that increases power output, comprising: a. providing inputs of turbine and tower parameters, b. providing information on the physical layout of the turbine location, c. providing information on wind speed and direction on a yearly basis. In one embodiment, the method further comprises d. providing inputs of turbine maximum output, cost of FDD, and rate of electricity payment, e. providing the customer with an estimate of the return on investment from FDD options.

It is now disclosed for the first time a method of engineering an FDD and a turbine, comprising: a. adjusting the placement of the FDD to create fictional contiguity to the turbine blades while leaving sufficient space between the FDD and the turbine blades to avoid contacting them at wind speeds of below 50 miles per hour. In one embodiment, the wind speed is over 50 miles per hour.

It is now disclosed for the first time a method of manufacturing a flow deflection system, comprising: a. placing an FDD in functional contiguity to the energy capture component of an energy capture machine facing an x axis of flow. According to some embodiments, the FDD is directed in an x axis, the FDD is directed in an y axis, or the FDD is an incomplete foil shape.

What is claimed:

1. A fluid flow to mechanical energy conversion system, comprising
    a. An energy capture machine, defined as comprising but not limited to a turbine that produces electrical energy, with an energy capture component, defined as blades, cups, or other object responding to a fluid flow, in an x-axis fluid flow, wherein "x-axis" is a reference to orientation and not necessarily horizontal,
    b. A means, located in the direction of fluid flow towards the energy capture component, operative to increase the velocity of the fluid flow delivered to the energy capture component, wherein the greatest increase in velocity is delivered to a periphery of the energy capture component, and wherein said increased fluid velocity increases the power output of said energy capture machine, said means being placed in at least a partial ring around the energy capture component in any axis.

2. The system of claim 1, wherein said means for increasing the velocity of the fluid flow is an FDD, defined as a foil with an external defective area, said defective area lacking a completely smoothly curved external continuity of a traditional foil shape, exclusive of the pointed tail of a traditional foil shape, said area comprising at least one additional pointed area or at least one straight area or at least one hollow area.

3. The system of claim 2, wherein the central axis of the FDD is substantially perpendicular to the fluid flow.

4. The system of claim 2, wherein said FDD height from its lowest to highest part in the y-axis is at least 10 meters.

5. The system of claim 2, wherein the FDD begins above a ground surface.

6. The system of claim 2, wherein the FDD internal diameter is at least 10 meters.

7. The system of claim 2, wherein said energy capture machine is a turbine of at least 10 meters blade diameter.

8. The system of claim 2, wherein the FDD is a hybrid of at least an externally substantially vertical disc-type shape and a superior non-concave shape that continues from the outside of the disc-type shape.

9. The system of claim 2, wherein said FDD is at least partially a tense structure.

10. The system of claim 2, wherein the line of the points connecting the maximal velocity at any radial distance from the hub of a horizontal axis energy capture component is approximately in the plane of the energy capture component's field of movement.

11. The system of claim 2, wherein the energy capture machine is a vertical axis turbine.

12. The system of claim 11, wherein said FDD is vertically adjacent to at least one vertical edge of the blades in the y-axis.

13. The system of claim 2, wherein the incomplete FDD area is on the external area away from the energy capture component.

14. The system of claim 13, wherein the shape of the FDD is defined as follows: A "C" FDD, comprising approximately a line drawn through the following relative coordinate points in an x-y axis in any proportional size and any angle of attack: X, Y; 1.732050808, 1; 1.693643087, 0.874364124; 1.646368289, 0.761206475; 1.542617362, 0.546668353; 1.427110653, 0.347651841; 1.29972529, 0.165009761; 1.159575723, 0.000955932; 1.004940323, −0.140607698; 0.824000258, −0.251170312; 0.72335477, −0.288447214;

0.614950141, −0.310804889; 0.497740627, −0.315152056; 0.369386895, −0.29535687; 0.299593086, −0.272790447; 0.224224918, −0.23736895; 0.1390843, −0.179461075; 0.088459869, −0.132016988; 0, 0.

15. The system of claim 13, wherein the FDD comprises at least part of a foil's leading edge and internal side edge continuous to the trailing edge's point, and an extension on the leading edge's external side turning towards the trailing edge.

16. The system of claim 15, wherein the shape of the FDD is defined as follows: A "Farb" FDD, comprising approximately a line drawn through the following relative coordinate points in an x-y axis in any proportional size and any angle of attack: X, Y; 0.057, 0.420; 0.020, 0.391; 0.000, 0.356; 0.007, 0.311; 0.038, 0.250; 0.073, 0.191; 0.106, 0.149; 0.144, 0.104; 0.180, 0.072; 0.227, 0.035; 0.268, 0.011; 0.316, 0.000; 0.362, 0.007; 0.411, 0.019; 0.464, 0.043; 0.515, 0.080; 0.571, 0.121; 0.630, 0.171; 0.674, 0.221; 0.727, 0.278; 0.774, 0.340; 0.816, 0.402; 0.857, 0.468; 0.889, 0.523; 0.944, 0.633.

17. The system of claim 13, wherein the FDD is at an angle of attack of at least 20 degrees.

18. The system of claim 13, wherein the angle of attack is at least 30 degrees.

19. The system of claim 13, wherein said energy capture component is centered in an x axis direction from the leading edge of an x-axis FDD at a distance of 20-30% of chord length.

20. The system of claim 13, wherein the distance from the FDD to the energy capture component is no more than 5 centimeters.

21. The system of claim 13, wherein the FDD's greatest cross-sectional thickness is 25% of the chord length or greater.

22. The system of claim 13, further comprising:
c. A means, upstream of the energy capture component, for the enforcement of turbulent flow around the FDD.

23. The system of claim 22, wherein the means is a raised structure on the surface of the side of the FDD facing the energy capture component.

24. The system of claim 13, further comprising:
c. A mesh, attached to the FDD upstream from the energy capture component.

25. The system of claim 13, wherein said FDD is a foil shape whose greatest thickness is located at less than 10% of the chord length from the leading edge.

26. The system of claim 13, wherein said energy capture component comprises at least one magnet set at the periphery of the blades.

27. The system of claim 13, wherein the ratio between the internal radius of the FDD at the most anterior y-z axis edge of the energy capture component, and the distance from that plane to the plane of the most anterior point of the FDD, is greater than 5 to 1.

28. The system of claim 1, further comprising:
c. A second energy capture machine, comprising at least one energy capture component, located downstream and less than 3 blade diameters from the first energy capture machine.

29. A method of improving fluid flow to mechanical energy conversion, the method comprising the steps of:
a. Providing an energy capture component, defined as blades, cups, or other object responding to a fluid flow, of an energy capture machine, said machine defined as comprising but not limited to a turbine that produces electrical energy,
b. Providing a means, located in the direction of fluid flow towards the energy capture component, operative to increase the velocity of the fluid flow delivered to the energy capture component, wherein the greatest increase in velocity is delivered to a periphery of the energy capture component, and wherein said increased fluid velocity increases the power output of said energy capture machine, said means being placed in at least a partial ring around the energy capture component in any axis.

30. The method of claim 29, wherein said means for increasing the velocity of the fluid flow is an FDD, defined as a foil with an external defective area, said area lacking a completely smoothly curved external continuity of a traditional foil shape, exclusive of the pointed tail of a traditional foil shape, said area comprising at least one additional pointed area or at least one straight area or at least one hollow area.

31. The method of claim 30, wherein said energy capture machine is a wind turbine of 10 meters blade diameter or greater.

32. The method of claim 29, wherein the means is placed according to the process of:
c. Providing input to a microprocessor of at least internal diameter, total height, height from ground or similar surface, width, and shape of an FDD, and diameter, height from the ground or similar surface, and height from ground or similar surface of an energy capture component of an energy capture machine, and the spatial relationship of the FDD and the energy capture component, wherein the FDD is placed in a position to increase the power output of the energy capture component,
d. Providing output from a microprocessor of the fluid velocities resulting from said inputs in a particular area.

33. The method of claim 29, wherein the central axis of the FDD is substantially perpendicular to the fluid flow.

* * * * *